United States Patent
Shu et al.

(10) Patent No.: US 10,827,543 B2
(45) Date of Patent: **\*Nov. 3, 2020**

(54) SERVICE CONTINUITY ENSURING METHOD, CONTROL PLANE GATEWAY, AND MOBILITY MANAGEMENT NETWORK ELEMENT

(71) Applicant: Huawei Technologies Co., Ltd., Shenzhen (CN)

(72) Inventors: Lin Shu, Shanghai (CN); Yanping Zhang, Shanghai (CN); Longyu Cao, Shanghai (CN); Runze Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,701

(22) Filed: Dec. 31, 2019

(65) Prior Publication Data

US 2020/0137813 A1  Apr. 30, 2020

Related U.S. Application Data

(63) Continuation of application No. 16/431,261, filed on Jun. 4, 2019, now Pat. No. 10,595,350, which is a
(Continued)

(51) Int. Cl.
*H04W 76/12* (2018.01)
*H04W 8/08* (2009.01)
(Continued)

(52) U.S. Cl.
CPC ............ *H04W 76/12* (2018.02); *H04W 8/08* (2013.01); *H04W 76/10* (2018.02); *H04W 88/16* (2013.01); *H04W 88/02* (2013.01); *H04W 88/08* (2013.01)

(58) Field of Classification Search
CPC ....... H04W 76/10; H04W 76/12; H04W 8/08; H04W 88/16
See application file for complete search history.

(56) References Cited

U.S. PATENT DOCUMENTS

2009/0046655 A1  2/2009 Zhao et al.
2009/0252133 A1  10/2009 Watanabe et al.
(Continued)

FOREIGN PATENT DOCUMENTS

CN  1956424 A  5/2007
CN  101188542 A  5/2008
(Continued)

OTHER PUBLICATIONS

Foreign Communication From a Counterpart Application, PCT Application No. PCT/CN2015/091242, International Search Report dated Jul. 4, 2016.
(Continued)

*Primary Examiner* — Robert C Scheibel
(74) *Attorney, Agent, or Firm* — Conley Rose, P.C.

(57) ABSTRACT

A service continuity ensuring method, a control plane gateway, and a mobility management network element, where the method includes: receiving, by a control plane gateway (C-GW), current location information of a user equipment (UE) sent by a mobility management network element; selecting, by the C-GW, at least one forwarding distributed gateway (D-GW) for the UE according to the current location information of the UE; establishing, by the C-GW for the UE, a data forwarding tunnel between a source D-GW of the UE and the forwarding D-GW, and a data forwarding tunnel between the forwarding D-GW and a target base station of the UE, where the data forwarding tunnels are used to transmit uplink user plane data and/or downlink user plane data of the UE in a moving process of the UE.

28 Claims, 15 Drawing Sheets

Related U.S. Application Data continuation of application No. 15/940,348, filed on Mar. 29, 2018, which is a continuation of application No. PCT/CN2015/091242, filed on Sep. 30, 2015.

(51) Int. Cl.
  *H04W 76/10* (2018.01)
  *H04W 88/16* (2009.01)
  *H04W 88/02* (2009.01)
  *H04W 88/08* (2009.01)

(56) References Cited

U.S. PATENT DOCUMENTS

| | | | |
|---|---|---|---|
| 2013/0058299 | A1 | 3/2013 | Watanabe et al. |
| 2014/0153674 | A1 | 6/2014 | Stratigos, Jr. |
| 2014/0321328 | A1 | 10/2014 | Zuniga et al. |
| 2015/0023176 | A1 | 1/2015 | Korja et al. |
| 2015/0055461 | A1* | 2/2015 | Hahn .............. H04W 48/20 370/230 |
| 2015/0110095 | A1 | 4/2015 | Tan et al. |
| 2015/0117408 | A1 | 4/2015 | Kedalagudde et al. |
| 2015/0189689 | A1 | 7/2015 | Wang et al. |
| 2015/0208291 | A1* | 7/2015 | Lee .............. H04W 36/0011 370/331 |
| 2015/0312806 | A1 | 10/2015 | Perras et al. |
| 2015/0319664 | A1 | 11/2015 | Perras et al. |
| 2016/0007191 | A1 | 1/2016 | Perras et al. |
| 2016/0119837 | A1 | 4/2016 | Wang et al. |
| 2016/0150448 | A1 | 5/2016 | Perras et al. |
| 2016/0295476 | A1* | 10/2016 | Bi .............. H04W 88/16 |

FOREIGN PATENT DOCUMENTS

| | | |
|---|---|---|
| CN | 102123161 A | 7/2011 |
| CN | 103636283 A | 3/2014 |
| CN | 104380834 A | 2/2015 |
| CN | 104684044 A | 6/2015 |
| CN | 104735808 A | 6/2015 |
| EP | 3076706 A1 | 10/2016 |
| JP | 201177683 A | 4/2011 |
| JP | 5203780 B2 | 6/2013 |
| KR | 1020140143434 A | 12/2014 |
| KR | 1020150086620 A | 7/2015 |
| RU | 2013140162 A | 3/2015 |
| WO | 2013149637 A1 | 10/2013 |
| WO | 2014008427 A1 | 1/2014 |

OTHER PUBLICATIONS

Foreign Communication From a Counterpart Application, PCT Application No. PCT/CN2015/091242, International Search Report dated Apr. 7, 2016.

Foreign Communication From a Counterpart Application, PCT Application No. PCT/CN2015/091242, Written Opinion dated Apr. 7, 2016.

Foreign Communication From a Counterpart Application, Korean Application No. 10/2018/7011731, Korean Office Action dated Feb. 14, 2019, 4 pages.

Foreign Communication From a Counterpart Application, Japanese Application No. 2018-516449, Japanese Office Action dated Feb. 25, 2019, 4 pages.

Foreign Communication From a Counterpart Application, Russian Application No. 2018115851, Russian Office Action dated Mar. 5, 2019, 4 pages.

Foreign Communication From a Counterpart Application, Russian Application No. 2018115851, Russian Decision on Grant dated Mar. 6, 2019, 12 pages.

Foreign Communication From a Counterpart Application, Chinese Application No. 201580028759.3, Chinese Office Action dated Apr. 18, 2019, 18 pages.

Foreign Communication From a Counterpart Application, European Application No. 15905090.5, Extended European Search Report dated Jun. 5, 2018, 9 pages.

Machine Translation and Abstract of Chinese Publication No. CN1956424, May 2, 2007, 51 pages.

Machine Translation and Abstract of Chinese Publication No. CN101188542, May 28, 2008, 39 pages.

Machine Translation and Abstract of Chinese Publication No. CN102123161, Jul. 13, 2011, 42 pages.

"3rd Generation Partnership Project; Technical Specification Group Services and System Aspects; Architecture enhancements for non-3GPP accesses (Release 11)," 3GPP TS 23.402, V11.10.0, Dec. 2014, 253 pages.

Starent, "UE location Info at PGW for LTE access," 3GPP TSG-SA WG2 Meeting #69, S2-088069, Miami, USA, Change Request 23.401 CR 0714, Current version: 8.3.0, Nov. 17, 2008, 143 pages.

Huawei, et al., "Conclusion on security across unicast and multicast modes and solving related editors notes," 3GPP TSG SA WG3 (Security) Meeting #75, S3-140774 (revision of S3-13abcd), May 12-16, 2014, Sapporo, Japan, 5 pages.

Foreign Communication From a Counterpart Application, Chinese Application No. 201580028759.3, Chinese Notice of Allowance dated Jan. 13, 2020, 6 pages.

\* cited by examiner

SERVICE CONTINUITY ENSURING METHOD, CONTROL PLANE GATEWAY, AND MOBILITY MANAGEMENT NETWORK ELEMENT

CROSS-REFERENCE TO RELATED APPLICATIONS

This application is a continuation of U.S. patent application Ser. No. 16/431,261, now U.S. Pat. No. 10,595,350, filed on Jun. 4, 2019, which is a continuation of U.S. patent application Ser. No. 15/940,348, now U.S. Pat. No. 10,638,527, filed on Mar. 29, 2018, which is a continuation of International Patent Application No. PCT/CN2015/091242, filed on Sep. 30, 2015. All of the aforementioned applications are hereby incorporated by reference in their entireties.

TECHNICAL FIELD

The present disclosure relates to the communications field, and more specifically, to a service continuity ensuring method, a control plane gateway, and a mobility management network element.

BACKGROUND

A distributed gateway (DGW) architecture is an enhanced network architecture proposed on the basis of an existing evolved packet system (EPS) network architecture according to an idea of separating a network control plane function from a user plane function. The DGW architecture includes a control plane gateway (C-GW) and a user plane gateway (U-GW).

The C-GW is a centralized control plane gateway, and may have two forms: (1) a single network element obtained after a control plane function of a serving gateway (S-GW) and a control plane function of a packet data network gateway (P-GW) in an existing 3$^{rd}$ Generation Partnership Project (3GPP) EPS network are integrated, and (2) two independent network elements that separately implement a control plane function of an existing S-GW (Control Plane S-GW) and a control plane function of an existing P-GW (Control Plane P-GW). The C-GW is specially configured to process control plane signaling in the 3GPP EPS network, including signaling related to functions such as mobility management, session management, address management, path management, and accounting management. The C-GW interacts with the U-GW to implement control and management on user plane data processing.

The U-GW is a distributed user plane gateway. Corresponding to the two forms of the C-GW, the U-GW may also have two forms: (1) a single network element obtained after a user plane function of the S-GW and a user plane function of the P-GW in the existing 3GPP EPS network are integrated, and (2) two independent network elements that separately implement a user plane function of the existing S-GW (User Plane S-GW) and a user plane function of the existing P-GW (User Plane P-GW). The U-GW is specially configured to process user plane data in the 3GPP EPS network, including functions such as routing and forwarding, data packet check, data packet counting, and quality of service enforcement. The U-GW processes user plane data under control and management of the C-GW. In consideration of a feature that the U-GW can be deployed in a distributed manner, the U-GW may also be referred to as a D-GW.

In the existing EPS network architecture, service continuity is implemented by means of an anchor function of the P-GW. That is, in a moving process of a user equipment (UE) in a connected mode that performs a user plane service, user plane data of the UE is always exchanged between the current P-GW and an external data network. Because the P-GW does not change in the moving process, it is ensured that a user plane IP address does not change, to further ensure continuity of the user plane service.

The U-GW (or the D-GW) in the DGW architecture may be deployed in a distributed manner according to a service requirement, to implement local access of a user, further shorten a round trip time (RTT) of user plane data, and improve user experience. During deployment, the U-GW may be moved downwards to a metropolitan area network closer to the user and even to a base station controller. With downward movement of the U-GW, a service range of the U-GW is far smaller than a service range of the S-GW/P-GW deployed in a centralized manner in the EPS network. Therefore, a probability that the serving U-GW changes in the moving process of the UE increases.

It may be learned that in the DGW architecture, how to ensure service continuity in the moving process of the UE is a prominent problem.

SUMMARY

Embodiments of the present disclosure provide a service continuity ensuring method, a control plane gateway, and a mobility management network element, to establish, for a UE, a data forwarding tunnel between a forwarding U-GW and a source U-GW, and a data forwarding tunnel between the forwarding U-GW and a target base station of the UE, in order to ensure service continuity in a moving process of the UE, and improve user service experience.

According to a first aspect, a service continuity ensuring method is proposed, and the method includes: receiving, by a control plane gateway, current location information of a user equipment sent by a mobility management network element for the user equipment; selecting, by the control plane gateway, at least one forwarding user plane gateway for the user equipment according to the current location information of the user equipment; and establishing, by the control plane gateway for the user equipment, a data forwarding tunnel between a source user plane gateway serving the user equipment and the forwarding user plane gateway, and a data forwarding tunnel between the forwarding user plane gateway and a target base station of the user equipment, where the data forwarding tunnels are used to transmit uplink user plane data and/or downlink user plane data of the user equipment in a moving process of the user equipment.

According to a second aspect, a service continuity ensuring method is proposed, and the method includes: receiving, by a target mobility management network element, a forwarding relocation request sent by a source mobility management network element serving a user equipment, where the forwarding relocation request carries current location information of the user equipment; selecting, by the target mobility management network element, a target control plane gateway of the user equipment according to the current location information of the user equipment; sending, by the target mobility management network element, the current location information of the user equipment to the target control plane gateway, such that the target control plane gateway determines a forwarding user plane gateway of the user equipment according to the current location information of the user equipment; and sending, by the target mobility management network element, a data forwarding tunnel establishment request to the target control plane gateway, where the data forwarding tunnel establishment request is used to request the target control plane gateway to establish, for the user equipment, a data forwarding tunnel between the forwarding user plane gateway and a source user plane gateway serving the user equipment, and a data forwarding tunnel between the forwarding user plane gateway and a target base station serving the user equipment.

According to a third aspect, a service continuity ensuring method is proposed, and the method includes: receiving, by a control plane gateway, current location information of a user equipment sent by a mobility management network element; selecting, by the control plane gateway, a target user plane gateway for the user equipment according to the current location information of the user equipment; and sending, by the control plane gateway, a request message to the mobility management network element, where the request message is used to request the mobility management network element to release a first bearer context and indicate to the user equipment to send a setup request for a second bearer context, the first bearer context is a bearer context of the user equipment that is established on a source user plane gateway of the user equipment, and the second bearer context is a bearer context that is re-established by the user equipment on the target user plane gateway according to the first bearer context.

According to a fourth aspect, a control plane gateway is proposed including a memory, a processor, a receiver, and a transmitter, where the memory is configured to store a program and provide data and an instruction for the processor. The processor is configured to execute the program stored in the memory to perform the following operations: receiving, using the receiver, current location information of a user equipment sent by a mobility management network element; selecting at least one forwarding user plane gateway for the user equipment according to the current location information of the user equipment; and establishing, for the user equipment, a data forwarding tunnel between a source user plane gateway serving the user equipment and the forwarding user plane gateway, and a data forwarding tunnel between the forwarding user plane gateway and a target base station serving the user equipment, where the data forwarding tunnels are used to transmit uplink user plane data and/or downlink user plane data of the user equipment in a moving process of the user equipment.

According to an fifth aspect, a mobility management network element is proposed, including a memory, a processor, a receiver, and a transmitter, where the memory is configured to: store a program and provide data and an instruction for the processor. The processor is configured to execute the program stored in the memory to perform the following operations: receiving, using the receiver, a forwarding relocation request sent by a source mobility management network element serving a user equipment, where the forwarding relocation request carries current location information of the user equipment; selecting a target control plane gateway of the user equipment according to the current location information of the user equipment; sending the current location information of the user equipment to the target control plane gateway using the transmitter, such that the target control plane gateway determines a forwarding user plane gateway of the user equipment according to the current location information of the user equipment; and sending a data forwarding tunnel establishment request to the target control plane gateway using the transmitter, where the data forwarding tunnel establishment request is used to request the target control plane gateway to establish, for the user equipment, a data forwarding tunnel between the forwarding user plane gateway and a source user plane gateway serving the user equipment, and a data forwarding tunnel between the forwarding user plane gateway and a target base station serving the user equipment.

According to a sixth aspect, a control plane gateway is proposed including a memory, a processor, a receiver, and a transmitter, where the memory is configured to store a program and provide data and an instruction for the processor. The processor is configured to execute the program stored in the memory to perform the following operations: receiving, using the receiver, current location information of a user equipment sent by a mobility management network element; selecting a target user plane gateway for the user equipment according to the current location information of the user equipment; and sending a request message to the mobility management network element using the transmitter, where the request message is used to request the mobility management network element to release a first bearer context and indicate to the user equipment to send a setup request for a second bearer context, the first bearer context is a bearer context of the user equipment that is established on a source user plane gateway of the user equipment, and the second bearer context is a bearer context that is re-established by the user equipment on the target user plane gateway according to the first bearer context.

According to the service continuity ensuring method, the control plane gateway, and the mobility management network element in the embodiments of the present disclosure, the control plane gateway selects the forwarding U-GW for a UE, and establishes, for the UE, the data forwarding tunnel between the forwarding U-GW and the source U-GW, and the data forwarding tunnel between the forwarding U-GW and the target base station of the UE, in order to ensure service continuity in a moving process of the UE, and improve user service experience.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
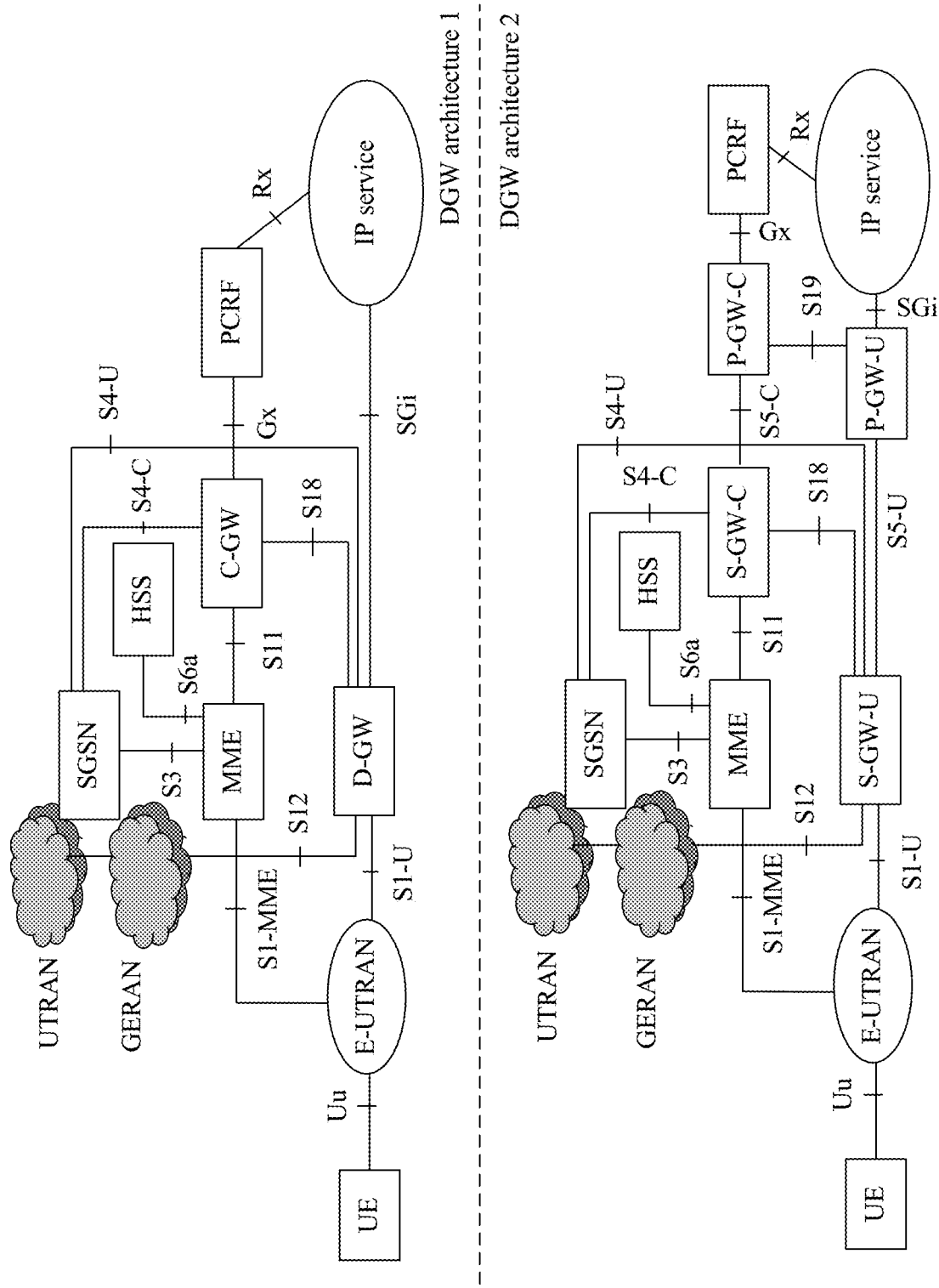
FIG. 1 is a schematic diagram of two distributed gateway network architectures according to an embodiment of the present disclosure.

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as a Global system for mobile communications (GSM), a Code Division Multiple Access (CDMA) system, a Wideband Code Division Multiple Access (WCDMA), a general packet radio service (GPRS), Long Term Evolution (LTE), and a $5^{th}$ Generation (5G) network.

In the embodiments of the present disclosure, a user equipment (UE) may also be referred to as a mobile terminal, and may be any one of the following types. The user equipment may be static, mobile, portable, pocket-sized, handheld, computer built-in, or in-vehicle. The user equipment may include but is not limited to a station, a mobile station, a subscriber unit, a personal computer, a laptop computer, a tablet computer, a netbook, a cellular phone, a handheld device, a cordless phone, a personal digital assistant (PDA), a data card, a Universal Serial Bus (USB) plug-in device, a mobile WiFi hotspot device (MiFi Devices), wearable devices such as a smartwatch/smart glasses, a wireless modem, a wireless router, and a wireless local loop (WLL) station. The user equipment may be distributed in an entire wireless network, and communicate with one or more core networks using a wireless access network.

A base station may be a base transceiver station (BTS) in the GSM or the CDMA, may be a NodeB in the WCDMA, or may be an evolved NodeB (eNB or e-NodeB) in the LTE. This is not limited in the present disclosure. However, for ease of description, description is provided using the eNB as an example in the following embodiments.

A C-GW may have two forms: (1) a single network element obtained after a control plane function of a S-GW and a control plane function of a P-GW in an existing 3GPP EPS network are integrated, and (2) two independent network elements that separately implement a control plane function of an existing S-GW (Control Plane S-GW) and a control plane function of an existing P-GW (Control Plane P-GW). This is not limited in the present disclosure.

Corresponding to the two forms of the C-GW, a U-GW may also have two forms: (1) a single network element obtained after a user plane function of the S-GW and a user plane function of the P-GW in the existing 3GPP EPS network are integrated, and (2) two independent network elements that separately implement a user plane function of the existing S-GW (User Plane S-GW) and a user plane function of the existing P-GW (User Plane P-GW). This is not limited in the present disclosure. In consideration of a feature that the U-GW can be deployed in a distributed manner, the U-GW may also be referred to as a D-GW.

Multiple U-GWs in a same service area may form one U-GW resource pool. U-GWs in one U-GW resource pool can directly communicate with each other. One default U-GW may be configured in each U-GW resource pool, to implement communication with a U-GW in another U-GW resource pool.

FIG. 1 is a schematic diagram of two DGW network architectures according to an embodiment of the present disclosure. A DGW architecture 1 is above a dashed line, and a DGW architecture 2 is beneath the dashed line.

In the DGW architecture 1, all control plane functions of an S-GW and a P-GW in an existing EPS network architecture are integrated into a C-GW, and all user plane functions of the S-GW and the P-GW in the existing EPS network architecture are integrated into a U-GW. A new interface is introduced between the two network elements: the C-GW and the U-GW, such as an S18 interface, to implement communication between the C-GW and the U-GW. In the network architecture, another network element and interface may reuse the existing EPS network architecture. The newly added S18 interface may reuse an interface protocol between the S-GW and the P-GW, such as the GTP, or another interface protocol, or a newly defined protocol. This is not limited in this embodiment of the present disclosure.

In the DGW architecture 2, the S-GW and the P-GW in the existing EPS network architecture are separately split into an independent control plane functional network element and an independent user plane functional element (an S-GW-C and an S-GW-U, and a P-GW-C and a P-GW-U). The S-GW-C and the P-GW-C may be collectively referred to as a C-GW, and the S-GW-U and the P-GW-U may be collectively referred to as a U-GW. An existing interface between the S-GW and the P-GW is also split into a control plane interface and a user plane interface, such as an S5-C interface and an S5-U interface in the DGW architecture 2. A new interface is introduced between the two network elements: the S-GW-C and the S-GW-U, such as an S18 interface, to implement communication between the S-GW-C and the S-GW-U. A new interface is introduced between the two network elements: the P-GW-C and the P-GW-U, such as an S19 interface, to implement communication between the P-GW-C and the P-GW-U. In the network architecture, another network element and interface may reuse the existing EPS network architecture. The newly added S18 and S19 interface may reuse an interface protocol between the S-GW and the P-GW, such as the GTP, or another interface protocol, or a newly defined protocol. This is not limited in this embodiment of the present disclosure.

A method and an apparatus in the embodiments of the present disclosure may be applied to a communications system shown in the DGW architecture 1 or the DGW architecture 2 in FIG. 1. For ease of description, the communications system shown in the DGW architecture 1 is used as an example in the embodiments of the present disclosure. For the communications system shown in the DGW architecture 2, in this embodiment of the present disclosure, the C-GW is equivalent to an integrated network element of the S-GW-C and the P-GW-C in the DGW architecture 2, and the U-GW is equivalent to an integrated network element of the S-GW-U and the P-GW-U in the DGW architecture 2.

Figure 2:
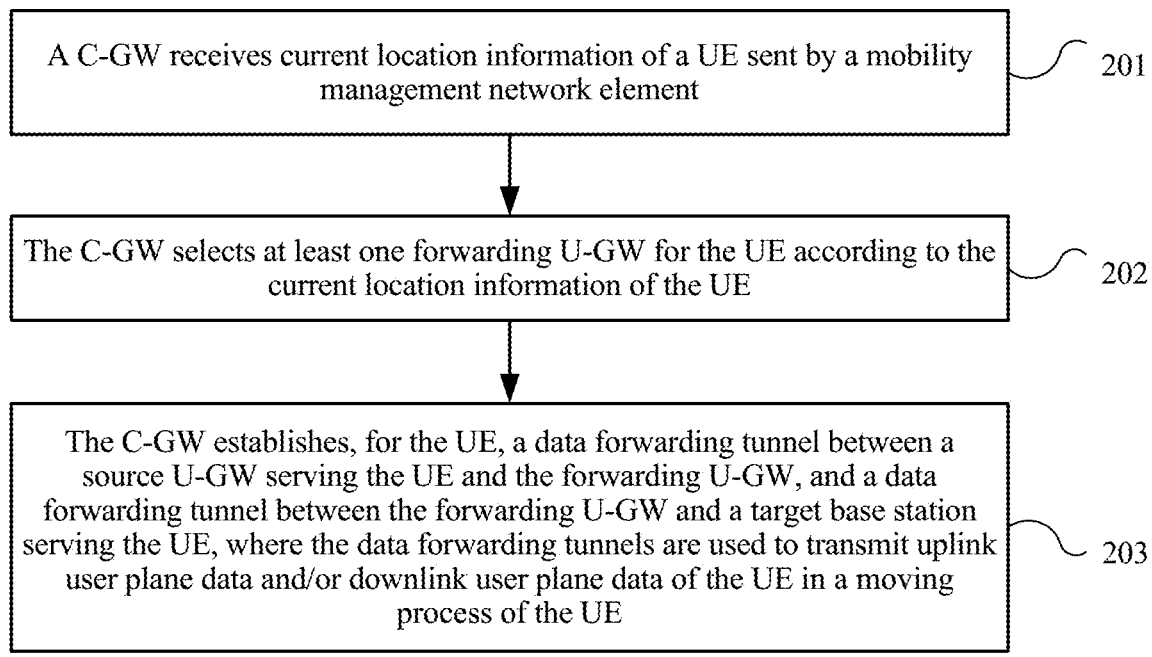
FIG. 2 is a flowchart of a service continuity ensuring method according to an embodiment of the present disclosure.

FIG. 2 is a flowchart of a service continuity ensuring method according to an embodiment of the present disclosure. The method in FIG. 2 is performed by a control plane gateway. The method includes the following steps.

201. The C-GW receives current location information of a UE sent by a mobility management network element.

This embodiment of the present disclosure is applicable to any one of the following application scenarios: (1) During user plane data transmission, the connected-mode UE is moved, and a location area after the movement falls beyond a service range of a source base station; and after sensing that the UE is moved out of the service range of the source base station, the source base station determines to initiate a connected-mode user plane data service switchover procedure. The source base station is a serving base station used before the UE is moved to the current location area. (2) When uplink user plane data needs to be transmitted, the idle-mode UE is moved out of a current registered location area, such as a current registered tracking area (TA), and the UE initiates a location update procedure, such as a tracking area update (TAU) procedure. (3) When uplink user plane data needs to be transmitted, the idle-mode UE is moved out of a service area of a current serving base station but is not moved out of a current registered location area, such as a current registered TA, and the UE initiates a service request procedure.

In the application scenario (1), after receiving a user plane data switchover request sent by the source base station, the mobility management network element may send a service switchover notification to the serving C-GW of the UE. It should be understood that the mobility management network element may be a mobile management entity (MME) or another network element that has a mobility management function of an MME. In an application, the mobility management network element may send the service switchover notification using an existing message such as a create session request message, a modify bearer request message, or a modify access bearer request message; or the mobility management network element may send the service switchover notification using a newly created message. A specific message used for sending the service switchover notification is not limited in the present disclosure.

In the application scenario (2), after receiving a location update request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

In the application scenario (3), after receiving a service request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

The current location information of the UE includes a tracking area identity (TAI) corresponding to the current location area of the UE, serving base station information corresponding to the current location area of the UE, and/or the like. The corresponding TAI used when the UE is moved to the current location area is a target TAI of the UE. The corresponding serving base station information used after the UE is moved to the current location area is target base station information of the UE. The target base station information may be a target base station identity (ID), a target cell identifier (CI), or the like. It may be understood that the current location area of the UE is also referred to as a target location area of the UE, that is, a location area of the UE after the UE is moved out of the service range of the source serving base station. Similarly, the current location information of the UE is also referred to as target location information of the UE.

202. The C-GW selects at least one forwarding U-GW for the UE according to the current location information of the UE.

In this embodiment of the present disclosure, the current location area of the UE falls beyond a service range of a current serving U-GW of the UE, and the C-GW needs to select an appropriate forwarding U-GW for the UE according to the current location area of the UE.

203. The C-GW establishes, for the UE, a data forwarding tunnel between a source U-GW serving the UE and the forwarding U-GW, and a data forwarding tunnel between the forwarding U-GW and a target base station serving the UE.

The data forwarding tunnels are used to transmit uplink user plane data and/or downlink user plane data of the UE in a moving process of the UE.

It should be understood that the moving process of the UE includes procedures occurring in the foregoing three application scenarios, including: the service switchover procedure in the application scenario (1), the location update procedure in the application scenario (2), and the service request procedure in the application scenario (3).

It should be understood that the target base station of the UE is a base station that provides an access service for the UE after the UE is moved to the current location area.

It should be understood that the data forwarding tunnels are implemented by creating a user plane bearer context between the source U-GW serving the UE and the forwarding U-GW, and a user plane bearer context between the forwarding U-GW and the target base station of the UE. The user plane bearer contexts include routing information required for forwarding user plane data. Specifically, a user plane bearer context created on the source U-GW includes routing information of the forwarding U-GW and routing information of the source base station serving the UE, a user plane bearer context created on the forwarding U-GW includes routing information of the source U-GW and routing information of the target base station, and a user plane bearer context created on the target base station includes the routing information of the forwarding U-GW. Further, the routing information may include an address (typically, an Internet Protocol (IP) address) and tunnel endpoint information (typically, if a GPRS tunneling protocol (GTP) is used, the tunnel endpoint information is a GTP tunnel endpoint identifier (TED)).

It should be understood that the forwarding U-GW is the at least one forwarding U-GW mentioned in step 202. The data forwarding tunnels that are established by the C-GW for the UE between the source U-GW serving the UE and the forwarding U-GW, and between the forwarding U-GW and the target base station of the UE are a communication path established by the C-GW between the source U-GW, the at least one forwarding U-GW, and the target base station, in order to establish a data forwarding tunnel between the two network elements from the source C-GW to the target base station.

For example, when the at least one forwarding U-GW includes only one U-GW: a U-GW 1, an established data forwarding tunnel path is: the source U-GW-43 the U-GW 1→the target base station. When the at least one forwarding U-GW includes two U-GWs: a U-GW 1 and a U-GW 2, where the U-GW 1 can communicate with the source U-GW, and the U-GW 2 can communicate with the target base station, an established data forwarding tunnel path is: the source U-GW→the U-GW 1→the U-GW 2→the target base station. When the at least one forwarding U-GW includes three or more U-GWs that include a U-GW 1 that can communicate with the source U-GW, and a U-GW 2 that can communicate with the target base station, an established data forwarding tunnel path is: the source U-GW→the U-GW 1→ . . . → the U-GW 2→the target base station. Data forwarding tunnels indicated by the U-GW 1→ . . . → the U-GW 2 are data forwarding tunnels between the at least one forwarding U-GW.

In this embodiment of the present disclosure, the C-GW determines the appropriate forwarding U-GW for the UE according to the current location information after the movement, and establishes the data forwarding tunnel between the forwarding U-GW and the source U-GW, and the data forwarding tunnel between the forwarding U-GW and the target base station of the UE, in order to ensure service continuity in a moving process of the UE, and improve user service experience.

Optionally, in an embodiment, the at least one forwarding U-GW includes only one U-GW: a first U-GW, the C-GW is a serving C-GW used after the UE is moved to the current location area, the C-GW is the same as a serving C-GW used before the UE is moved to the current location area, and the mobility management network element is a serving mobility management network element used after the UE is moved to the current location area. In this case, step 203 is implemented as follows: receiving, by the C-GW, a first request sent by the mobility management network element, where the first request carries routing information of the target base station of the UE; sending, by the C-GW, a second request to the first U-GW, where the second request is used to request the first U-GW to establish the data forwarding tunnel between the first U-GW and the target base station, and the data forwarding tunnel between the first U-GW and the source U-GW, and the second request carries the routing information of the target base station and routing information of the source U-GW; and sending, by the C-GW, a third request to the source U-GW, where the third request is used to request the source U-GW to establish the data forwarding tunnel between the source U-GW and the first U-GW, and the third request carries routing information of the first U-GW.

It should be understood that in this embodiment, the C-GW is the same as the serving C-GW used before the UE is moved to the current location area, that is, the serving C-GW does not change in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Certainly, it should be understood that the C-GW further receives a second response sent by the first U-GW according to the second request, and a third response sent by the source U-GW according to the third request. The second response is used to acknowledge that the first U-GW allows establishment of the data forwarding tunnel between the first U-GW and the target base station, and the data forwarding tunnel between the first U-GW and the source U-GW. Optionally, the second response may carry the routing information of the first U-GW, such as an IP address and TED information, and the third response is used to acknowledge that the source U-GW allows establishment of the data forwarding tunnel between the source U-GW and the first U-GW. After receiving the second response and the third response, the C-GW may send a first response of the first request to the mobility management network element.

It should be noted that the first request, the second request, or the third request in this embodiment may be sent using an existing message such as a create indirect data forwarding tunnel request, or a newly defined message. This is not limited in the present disclosure. Further, the first response, the second response, or the third response in this embodiment may be sent using an existing message such as a create indirect data forwarding tunnel response, or a newly defined message. This is not limited in the present disclosure.

In addition, it should be understood that physical implementation of a tunnel is a bearer context, and the bearer context includes routing information of a peer end of the tunnel. A control plane gateway needs to separately send requests to two user plane gateways, to separately create bearer contexts, and the bearer contexts include routing information of a peer end. In this way, a tunnel is established between the two user plane gateways.

Optionally, in another embodiment, the at least one forwarding U-GW includes a second U-GW and a third U-GW, the C-GW is a serving C-GW used after the UE is moved to the current location area, the C-GW is the same as a serving C-GW used before the UE is moved to the current location area, the mobility management network element is a serving mobility management network element used after the UE is moved to the current location area, and the mobility management network element is the same as or different from a serving mobility management network element used before the UE is moved to the current location area. In this case, step 203 is implemented as follows: receiving, by the C-GW, a first request sent by the mobility management network element, where the first request carries routing information of the target base station of the UE; sending, by the C-GW, a second request to the second U-GW, where the second request is used to request the second U-GW to establish a data forwarding tunnel between the second U-GW and the target base station, and a data forwarding tunnel between the second U-GW and the third U-GW, and the second request carries the routing information of the target base station and routing information of the third U-GW; sending, by the C-GW, a third request to the third U-GW, where the third request is used to request the third U-GW to establish the data forwarding tunnel between the third U-GW and the second U-GW, and a data forwarding tunnel between the third U-GW and the source U-GW, and the third request carries routing information of the second U-GW and routing information of the source U-GW; and sending, by the C-GW, a fourth request to the source U-GW, where the fourth request is used to request the source U-GW to establish the data forwarding tunnel between the source U-GW and the third U-GW, and the fourth request carries the routing information of the third U-GW.

It should be understood that in this embodiment, the C-GW is the same as the serving C-GW used before the UE is moved to the current location area, that is, the serving C-GW does not change in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the C-GW further receives a second response sent by the second U-GW according to the second request, a third response sent by the third U-GW according to the third request, and a fourth response sent by the source U-GW according to the fourth request. The second response is used to acknowledge that the second U-GW allows establishment of the data forwarding tunnel between the second U-GW and the target base station, and the data forwarding tunnel between the second U-GW and the third U-GW. Optionally, the second response may carry the routing information of the second U-GW, such as an IP address and TEID information. The third response is used to acknowledge that the third U-GW allows establishment of the data forwarding tunnel between the third U-GW and the second U-GW, and the data forwarding tunnel between the third U-GW and the source U-GW. Optionally, the third response may carry the routing information of the third U-GW, such as an IP address and TEID information. The fourth response is used to acknowledge that the source U-GW allows establishment of the data forwarding tunnel between the source U-GW and the third U-GW. After receiving the second response, the third response, and the fourth response, the C-GW may send a first response of the first request to the mobility management network element.

It should be noted that the first request, the second request, the third request, or the fourth request in this embodiment may be sent using an existing message such as a create indirect data forwarding tunnel request, or a newly defined message. This is not limited in the present disclosure. Further, the first response, the second response, the third response, or the fourth response in this embodiment may be sent using an existing message such as a create indirect data forwarding tunnel response, or a newly defined message. This is not limited in the present disclosure.

The at least one forwarding U-GW determined by the C-GW may be three or more forwarding U-GWs. The C-GW sends a data forwarding tunnel establishment request to each forwarding U-GW, to establish data forwarding tunnels between the source U-GW, the at least one forwarding U-GW, and the target base station. For example, the at least one forwarding U-GW includes a U-GW 1, a U-GW 2, and a U-GW 3. The U-GW 1 can communicate with the source U-GW, the U-GW 3 can communicate with a target U-GW, and an established forwarding tunnel path is: the source U-GW→the U-GW 1→the U-GW 2→the U-GW 3→the target U-GW.

Optionally, in still another embodiment, the C-GW further receives routing information of the source U-GW of the UE that is sent by the mobility management network element. The at least one forwarding U-GW includes only one U-GW: a first U-GW, the C-GW is a serving C-GW used after the UE is moved to the current location area, the C-GW is different from a serving C-GW used before the UE is moved to the current location area, the mobility management network element is a serving mobility management network element used after the UE is moved to the current location area, and the mobility management network element is the same as or different from a serving mobility management network element used before the UE is moved to the current location area. In this case, step 203 is implemented as follows: receiving, by the C-GW, a first request sent by the mobility management network element, where the first request carries routing information of the target base station of the UE; and sending, by the C-GW, a second request to the first U-GW, where the second request is used to request the first U-GW to establish the data forwarding tunnel between the first U-GW and the target base station, and the data forwarding tunnel between the first U-GW and the source U-GW, and the second request carries the routing information of the target base station and the routing information of the source U-GW.

It should be understood that in this embodiment, the C-GW is different from the serving C-GW used before the UE is moved to the current location area, that is, the serving C-GW changes in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the C-GW further receives a second response sent by the first U-GW according to the second request. The second response is used to acknowledge that the first U-GW allows establishment of the data forwarding tunnel between the first U-GW and the target base station, and the data forwarding tunnel between the first U-GW and the source U-GW. Optionally, the second response may carry routing information of the first U-GW, such as an IP address and TED information. After receiving the second response, the C-GW may send a first response of the first request to the mobility management network element.

Certainly, it should be understood that in this embodiment of the present disclosure, because the serving C-GW of the UE in this embodiment changes in the moving process of the UE, step 203 in this embodiment is performed by a target C-GW, that is, the serving C-GW used after the UE is moved to the current location area. Further, the target C-GW should further indicate to a source C-GW via the mobility management network element, to send a data forwarding tunnel establishment request to the source U-GW; and send the routing information of the first U-GW to the source U-GW. The source C-GW is a serving C-GW used before the UE is moved to the current location area, and the source U-GW is a serving U-GW used before the UE is moved to the current location area.

It should be noted that the first request or the second request in this embodiment may be sent using an existing message such as a create indirect data forwarding tunnel request, or a newly defined message. This is not limited in the present disclosure. Further, the first response or the second response in this embodiment may be sent using an existing message such as a create indirect data forwarding tunnel response, or a newly defined message. This is not limited in the present disclosure.

Optionally, in still another embodiment, the C-GW further receives routing information of the source U-GW of the UE that is sent by the mobility management network element. The at least one forwarding U-GW includes a second U-GW and a third U-GW, the C-GW is a serving C-GW used after the UE is moved to the current location area, the C-GW is different from a serving C-GW used before the UE is moved to the current location area, the mobility management network element is a serving mobility management network element used after the UE is moved to the current location area, and the mobility management network element is the same as or different from a serving mobility management network element used before the UE is moved to the current location area. In this case, step 203 is implemented as follows: receiving, by the C-GW, a first request sent by the mobility management network element, where the first request carries routing information of the target base station of the UE; sending, by the C-GW, a second request to the second U-GW, where the second request is used to request the second U-GW to establish a data forwarding tunnel between the second U-GW and the target base station, and a data forwarding tunnel between the second U-GW and the third U-GW, and the second request carries the routing information of the target base station and routing information of the third U-GW; and sending, by the C-GW, a third request to the third U-GW, where the third request is used to request the third U-GW to establish the data forwarding tunnel between the third U-GW and the second U-GW, and a data forwarding tunnel between the third U-GW and the source U-GW, and the third request carries routing information of the second U-GW and the routing information of the source U-GW.

It should be understood that in this embodiment, the C-GW is different from the serving C-GW used before the UE is moved to the current location area, that is, the serving C-GW changes in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the C-GW further receives a second response sent by the second U-GW according to the second request, and a third response sent by the third U-GW according to the third request. The second response is used to acknowledge that the second U-GW allows establishment of the data forwarding tunnel between the second U-GW and the target base station, and the data forwarding tunnel between the second U-GW and the third U-GW. Optionally, the second response may carry the routing information of the second U-GW, such as an IP address and TEID information. The third response is used to acknowledge that the third U-GW allows establishment of the data forwarding tunnel between the third U-GW and the second U-GW, and the data forwarding tunnel between the third U-GW and the source U-GW. Optionally, the third response may carry the routing information of the third U-GW, such as an IP address and TEID information. After receiving the second response and the third response, the C-GW may send a first response of the first request to the mobility management network element.

Certainly, it should be understood that in this embodiment of the present disclosure, because the serving C-GW of the UE in this embodiment changes in the moving process of the UE, step 203 in this embodiment is performed by a target C-GW, that is, the serving C-GW used after the UE is moved to the current location area. Further, the target C-GW should further indicate to a source C-GW via the mobility management network element, to send a data forwarding tunnel establishment request to the source U-GW, and send the routing information of the third U-GW to the source U-GW. The source C-GW is a serving C-GW used before the UE is moved to the current location area, and the source U-GW is a serving U-GW used before the UE is moved to the current location area.

It should be noted that the first request, the second request, or the third request in this embodiment may be sent using an existing message such as a create indirect data forwarding tunnel request, or a newly defined message. This is not limited in the present disclosure. Further, the first response, the second response, or the third response in this embodiment may be sent using an existing message such as a create indirect data forwarding tunnel response, or a newly defined message. This is not limited in the present disclosure.

Optionally, in the foregoing four embodiments of FIG. 2, when the at least one forwarding U-GW is the first U-GW, the method further includes: sending, by the C-GW, the routing information of the first U-GW to the target base station via the mobility management network element.

Alternatively, in the foregoing four embodiments of FIG. 2, when the at least one forwarding U-GW is the second U-GW and the third U-GW, the method further includes: sending, by the C-GW, the routing information of the second U-GW to the target base station via the mobility management network element.

Optionally, in the foregoing four embodiments of FIG. 2, the method may further include: sending, by the C-GW, a create session request to the target U-GW, where the create session request is used to create, on the target U-GW for the UE, a bearer context for user plane data transmission, each created bearer context includes routing information (such as an IP address and TED information) of the target U-GW, and the target U-GW is a serving U-GW corresponding to the current location area of the UE. It may be understood that the target U-GW is generally a serving U-GW that provides an optimal data transmission path for the UE in the current location area. Further, the C-GW sends the routing information of the target U-GW to the target base station via the mobility management network element.

Optionally, in the foregoing four embodiments of FIG. 2, when the at least one forwarding U-GW is the first U-GW, the first U-GW may be further a serving U-GW selected by the C-GW for the UE according to the current location information of the UE. That is, the first U-GW is a target U-GW. In this case, the target D-GW can directly communicate with the source D-GW, that is, the target U-GW also plays a role of the forwarding U-GW. It may be understood that, when the target U-GW cannot directly communicate with the source D-GW, the forwarding U-GW selected by the C-GW is different from the target U-GW.

The following further describes the method in the embodiments of the present disclosure with reference to example embodiments. For ease of description, an MME is used as a mobility management network element in the following embodiment. Certainly, in an application, the mobility management network element may be alternatively another device that has a mobility management network element function. This is not limited in this embodiment of the present disclosure.

Figure 3:
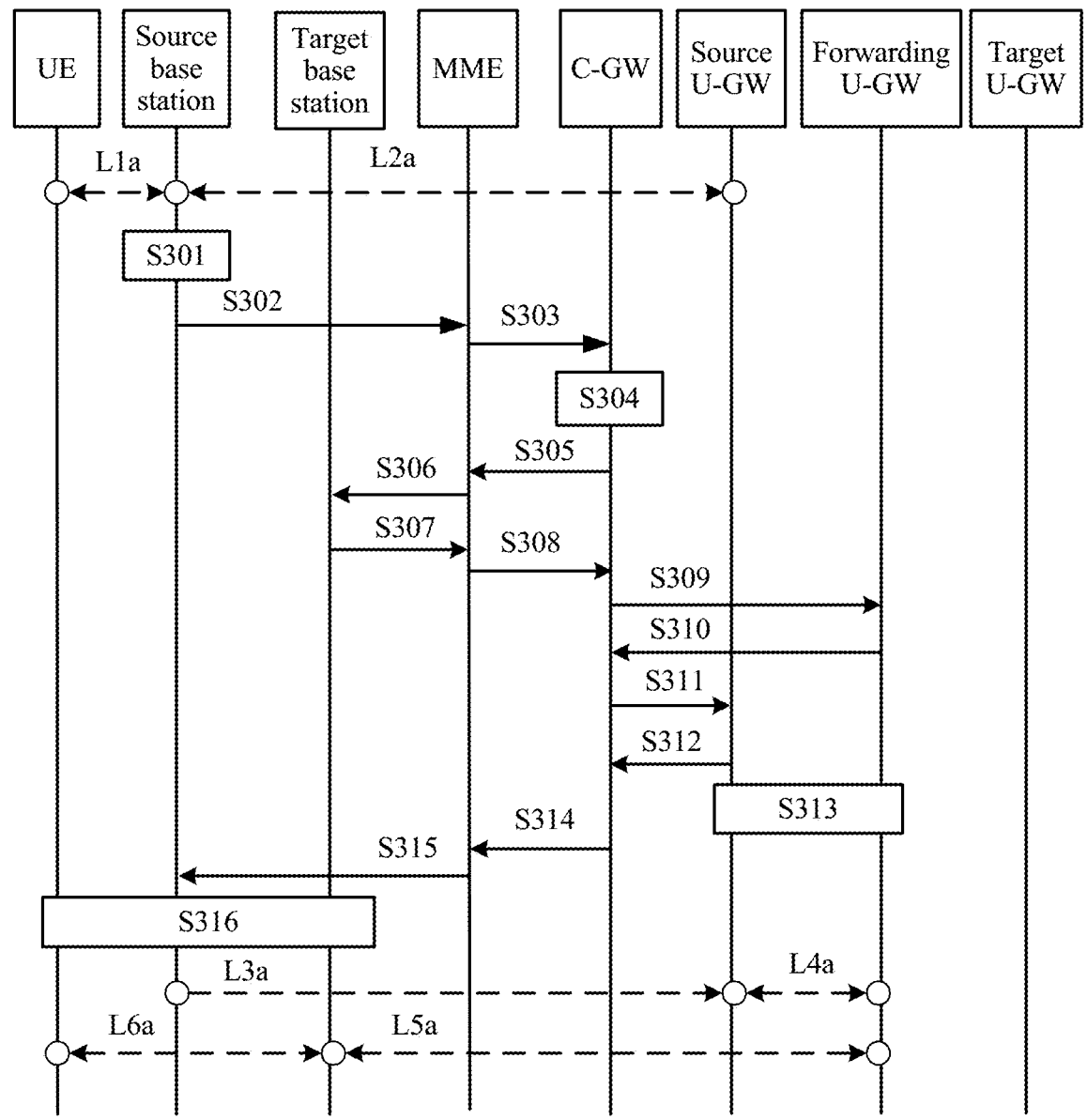
FIG. 3 is an interaction flowchart of ensuring service continuity according to an embodiment of the present disclosure.

FIG. 3 is an interaction flowchart of ensuring service continuity according to an embodiment of the present disclosure. In FIG. 3, a source base station is a serving base station used before UE is moved to a current location area. A target base station is a serving base station used after the UE is moved to the current location area. A serving MME and a serving C-GW of the UE remain unchanged before and after movement of the UE. A source U-GW is a serving U-GW used before the UE is moved to the current location area. A target U-GW is a U-GW used after the UE is moved to the current location area. A forwarding U-GW is a U-GW that is used after the UE is moved to the current location area and used for data service switchover. Before the service switchover, an uplink/downlink user plane data transmission path is: the UE ↔ the source base station ↔ the source U-GW, that is, transmission paths indicated by a dashed line L1a and a dashed line L2a in FIG. 3.

A specific service switchover procedure in this embodiment of the present disclosure is as follows.

S301. The source base station initiates a user plane data switchover procedure of the connected-mode UE.

When the source base station of the UE senses that the UE is moved out of a service range of the source base station, and the UE is performing a user plane data service, the source base station may determine to initiate a connected-mode user plane data service switchover procedure.

S302. The source base station sends a service switchover request message to the MME.

To be distinguished from a service switchover request message in another step in this embodiment of the present disclosure, the service switchover request message sent by the source base station to the MME is referred to as a service switchover request message 1.

The source base station sends the service switchover request message 1 to the current serving MME (that is, an MME in FIG. 3), and adds current location information of the UE to the message. The current location information of the UE includes a TAI corresponding to the current location area of the UE, serving base station information corresponding to the current location area of the UE, and/or the like. The corresponding TAI used when the UE is moved to the current location area is a target TAI of the UE. The corresponding serving base station information used after the UE is moved to the current location area is target base station information of the UE. The target base station information may be a target base station ID, a target CI, or the like. The current location area of the UE is also referred to as a target location area of the UE, that is, a location area of the UE after the UE is moved out of the service range of the source serving base station. Similarly, the current location information of the UE is also referred to as target location information of the UE.

S303. The MME sends a service switchover notification message to the C-GW.

After receiving the service switchover request message 1, the serving MME of the UE learns that the UE is moved out of the service range of the current base station (the source base station), and then sends the service switchover notification message to the current serving C-GW. The service switchover notification message carries the current location information of the UE. The service switchover notification message is used to notify the C-GW that the UE needs to be handed over to a new target location area. The MME may reuse an existing message such as a create session request message, a modify bearer request message, or a modify access bearer request message, and add the current location information of the UE to the message. Alternatively, the MME may define a new message to send the service switchover notification message. This is not limited in this embodiment of the present disclosure.

S304. The C-GW determines the target U-GW and the forwarding U-GW.

After receiving the service switchover notification message sent by the MME, the C-GW may determine, according to the current location information of the UE, whether a current serving U-GW (a source U-GW) of the UE needs to be reallocated, that is, whether the UE is moved out of a service range of the source U-GW. It should be noted that because the C-GW stores, in real time, service area information of each U-GW in a service range of the C-GW, the C-GW may determine, according to the current location information of the UE (such as a target TAI or a target base station ID), whether the UE is moved out the service range of the source U-GW.

If the UE is not moved out of the service range of the source U-GW, data service switchover of the UE may be implemented in the source U-GW. For an implementation, refer to other approaches of a method for switching a data service over by a U-GW or a P-GW. Details are not described in this embodiment of the present disclosure.

If the C-GW determines that a serving U-GW of the UE needs to be reallocated, the C-GW selects, according to the current location information of the UE, an appropriate target U-GW, to ensure that the target U-GW can provide an optimal data transmission path in the current location area for the UE, and to reduce a transmission RTT of user plane data as much as possible.

Further, the C-GW needs to check whether the target U-GW can directly communicate with the source U-GW. If the target U-GW can directly communicate with the source U-GW, the target U-GW is a forwarding U-GW, that is, sending performed to the forwarding U-GW in all subsequent steps is sending performed to the target U-GW. If the target U-GW cannot directly communicate with the source U-GW, a U-GW that can directly communicate with the source U-GW is selected as a forwarding U-GW according to the target location information of the UE. Manners of determining the target U-GW and the forwarding U-GW in FIG. 4 to FIG. 6A and FIG. 6B are similar to this manner.

It should be noted that to ensure service continuity in a special scenario, there may be more than one forwarding U-GW. Typically, if the UE is moved to a neighboring U-GW pool, the C-GW selects a default U-GW in the neighboring U-GW pool as a forwarding U-GW (which may be referred to as a target forwarding U-GW) that communicates with the target U-GW. If the default U-GW cannot directly communicate with the source U-GW either, further, the C-GW may select, as a forwarding U-GW (which may be referred as a source forwarding U-GW) that communicates with the source U-GW, a default U-GW in a U-GW pool in which the source U-GW is located, and two forwarding U-GWs are used to ensure service continuity in the moving process of the UE.

S305. The C-GW returns a switchover notification acknowledgment message to the MME.

The C-GW returns the switchover notification acknowledgment message to the MME, and adds, to the message, an address and tunnel endpoint information of the forwarding U-GW selected by the C-GW.

For example, the address of the forwarding U-GW may be an IP address of the forwarding U-GW. The tunnel endpoint information of the forwarding U-GW may vary according to protocols used between the MME and the C-GW. For example, when the GTP is used between the MME and the C-GW, the tunnel endpoint information of the forwarding U-GW may be a GTP TED.

In addition, if multiple forwarding U-GWs are determined in step S304, for example, the source forwarding U-GW and the target forwarding U-GW, the C-GW may add, to the switchover notification acknowledgment message, an address and tunnel endpoint information of the target forwarding U-GW located in the target location area of the UE. It should be noted that, when the switchover notification acknowledgment message is returned to the MME, an existing message may be reused, such as a create session response message, a modify bearer response message, or a modify access bearers response message, or a new message may be defined. This is not limited in this embodiment of the present disclosure.

S306. The MME sends a service switchover request message to the target base station.

To be distinguished from a service switchover request message in another step in this embodiment of the present disclosure, the service switchover request message sent by the MME to the target base station is referred to as a service switchover request message 2.

The MME sends the service switchover request message 2 to the target base station, and forwards, to the target base station, the address and the tunnel endpoint information of the forwarding U-GW that are sent by the C-GW, such that an uplink data transmission path is subsequently handed over to the forwarding U-GW. The address and the tunnel endpoint information of the forwarding U-GW may be sent using the service switchover request message 2, or may be independently sent.

S307. The target base station returns a switchover request acknowledgment message to the MME.

To be distinguished from a switchover request acknowledgment message in another step in this embodiment of the present disclosure, and to match a corresponding numeral identifier with that of the service switchover request message corresponding to the switchover request acknowledgment message, the switchover request acknowledgment message sent by the target base station to the MME is referred to as a switchover request acknowledgment message 2.

After receiving the service switchover request message 2 sent by the MME, the target base station may return the switchover request acknowledgment message 2 to the MME, and send an address (such as an IP address) and tunnel endpoint information (such as a GTP TED) of the target base station to the MME. Similarly, the address and the tunnel endpoint information of the target base station may be sent using the switchover request acknowledgment message 2, or may be independently sent.

S308. The MME sends a data forwarding tunnel establishment request to the C-GW.

To be distinguished from a data forwarding tunnel establishment request in another step in this embodiment of the present disclosure, the data forwarding tunnel establishment request sent by the MME to the C-GW is referred to as a data forwarding tunnel establishment request 1.

The MME sends the data forwarding tunnel establishment request 1 to the C-GW, and sends the address and the tunnel endpoint information of the target base station to the C-GW, such that a downlink data transmission path is subsequently handed over to the target base station.

It should be noted that the data forwarding tunnel establishment request may be sent by reusing an existing message such as a create indirect data forwarding tunnel request message or a modify bearer request message, or a newly defined message. This is not limited in the present disclosure. The description is applicable to all the embodiments of the present disclosure.

S309. The C-GW sends a data forwarding tunnel establishment request to the forwarding U-GW.

To be distinguished from a data forwarding tunnel establishment request in another step in this embodiment of the present disclosure, and to match a corresponding numeral identifier with that of the data forwarding tunnel establishment request corresponding to the data forwarding tunnel establishment request, the data forwarding tunnel establishment request sent by the C-GW to the forwarding U-GW is referred to as a data forwarding tunnel establishment request 2.

The C-GW sends the data forwarding tunnel establishment request 2 to the forwarding U-GW, and sends the address and the tunnel endpoint information of the target base station and an address and tunnel endpoint information of the source U-GW to the forwarding U-GW.

In addition, if multiple forwarding U-GWs are required in step S304, for example, the source forwarding U-GW (that is, the third U-GW mentioned above) and the target forwarding U-GW (that is, the second U-GW mentioned above), the C-GW should send a data forwarding tunnel establishment request to each forwarding U-GW, and the request carries an address and tunnel endpoint information of a peer network element. For example, a data forwarding tunnel establishment request sent to the source forwarding U-GW carries the address and the tunnel endpoint information of the source U-GW and the target forwarding U-GW, and a data forwarding tunnel establishment request sent to the target forwarding U-GW carries an address and tunnel endpoint information of the source forwarding U-GW and the address and the tunnel endpoint information of the target base station.

S310. The forwarding U-GW returns a data forwarding tunnel establishment response to the C-GW.

To be distinguished from a data forwarding tunnel establishment response in another step in this embodiment of the present disclosure, and to match a corresponding numeral identifier with that of the data forwarding tunnel establishment request corresponding to the data forwarding tunnel establishment response, the data forwarding tunnel establishment response sent by the forwarding U-GW to the C-GW is referred to as a data forwarding tunnel establishment response 2.

The forwarding U-GW returns the data forwarding tunnel establishment response 2 to the C-GW, to respond to the data forwarding tunnel establishment request 2 sent by the C-GW, and determines that establishment of a data forwarding tunnel between the target base station and the forwarding U-GW and establishment of a data forwarding tunnel between the source U-GW and the forwarding U-GW are allowed. Optionally, the data forwarding tunnel establishment response 2 may carry the address and the tunnel endpoint information of the forwarding U-GW.

If multiple forwarding U-GWs are required in step S304, the C-GW should send a data forwarding tunnel establishment request to each forwarding U-GW, and correspondingly, each forwarding U-GW should return a data forwarding tunnel establishment response, to indicate that establishment of a data forwarding tunnel is allowed.

It should be understood that responses to data forwarding tunnel establishment requests in the present disclosure all indicate that establishment of data forwarding tunnels is allowed. If there is a response indicating that establishment of a data forwarding tunnel is not allowed, the method in this embodiment of the present disclosure is no longer performed. This is applicable to the following.

It should be noted that the data forwarding tunnel establishment response may be sent by reusing an existing message such as a create indirect data forwarding tunnel response message or a modify bearer response message, or a newly defined message. This is not limited in the present disclosure. The description is applicable to all the embodiments of the present disclosure.

S311. The C-GW sends a data forwarding tunnel establishment request to the source U-GW.

To be distinguished from a data forwarding tunnel establishment request in another step in this embodiment of the present disclosure, the data forwarding tunnel establishment request sent by the C-GW to the source U-GW is referred to as a data forwarding tunnel establishment request 3.

The C-GW sends the data forwarding tunnel establishment request 3 to the source U-GW, and sends the address and the tunnel endpoint information of the forwarding U-GW to the source U-GW.

If multiple forwarding U-GWs are determined in step S304, the C-GW sends, to the source U-GW, an address and tunnel endpoint information of the source forwarding U-GW located in the current location area of the UE.

S312. The source U-GW returns a data forwarding tunnel establishment response to the C-GW.

To be distinguished from a data forwarding tunnel establishment response in another step in this embodiment of the present disclosure, and to match a corresponding numeral identifier with that of the data forwarding tunnel establishment request corresponding to the data forwarding tunnel establishment response, the data forwarding tunnel establishment response sent by the source U-GW to the C-GW is referred to as a data forwarding tunnel establishment response 3.

The source U-GW returns the data forwarding tunnel establishment response 3 to the C-GW, to respond to the data forwarding tunnel establishment request 3 sent by the C-GW, and determines that establishment of the data forwarding tunnel between the forwarding U-GW and the source U-GW is allowed.

S313. Establish a data forwarding tunnel between the source U-GW and the forwarding U-GW.

After an address and tunnel endpoint information of a peer U-GW are obtained, the data forwarding tunnel between the source U-GW and the forwarding U-GW is established.

Certainly, it should be understood that if multiple forwarding U-GWs are determined in step S304, for example, the source forwarding U-GW and the target forwarding U-GW, a data forwarding tunnel between the source U-GW and the source forwarding U-GW, and a data forwarding tunnel between the source forwarding U-GW and the target forwarding U-GW are correspondingly established.

S314. The C-GW returns a data forwarding tunnel establishment response to the MME.

To be distinguished from a data forwarding tunnel establishment response in another step in this embodiment of the present disclosure, and to match a corresponding numeral identifier with that of the data forwarding tunnel establishment request corresponding to the data forwarding tunnel establishment response, the data forwarding tunnel establishment response sent by the C-GW to the MME is referred to as a data forwarding tunnel establishment response 1.

After the data forwarding tunnel is established between the source U-GW and the forwarding U-GW, the C-GW returns the data forwarding tunnel establishment response 1 to the MME to notify the MME that the data forwarding tunnel has been established and service switchover can be performed.

S315. The MME sends a switchover command to the source base station.

The MME sends the switchover command to the source base station, and the command carries the address and the tunnel endpoint information of the forwarding U-GW. If multiple forwarding U-GWs are required, for example, the source forwarding U-GW and the target forwarding U-GW, the command carries an address and tunnel endpoint information of the source forwarding U-GW located in a source location area of the UE.

S316. The source base station performs a data switchover procedure.

The source base station continues to perform the existing data switchover procedure, hands over the UE to a target cell, and indicates to the UE to access the target cell, and can reuse the existing switchover procedure in a subsequent step to implement complete handover of the UE to a target location.

In a switchover process and after the switchover is completed, an uplink/downlink user plane data transmission path changes to: the UE 4↔ the target base station 4↔ the forwarding U-GW ↔ the source U-GW, that is, transmission paths indicated by a dashed line L3a, a dashed line L4a, a dashed line L5a, and a dashed line L6a in FIG. 3. It should be noted that before, during, and after the switchover, the uplink/downlink user plane data transmission path passes through the source U-GW. However, considering that both the source U-GW and the forwarding U-GW have been moved downwards to locations closer to the UE, the source U-GW is also very close to the forwarding U-GW, and therefore, an RTT of user plane data does not significantly increase. When the C-GW determines that two or more U-GWs are used as forwarding U-GWs, data forwarding tunnel paths of the forwarding U-GWs pass through all the forwarding U-GWs. For example, if the forwarding U-GW includes the target forwarding U-GW and the source forwarding U-GW, transmission paths change to: the UE ↔ the target base station ↔ the target forwarding U-GW ↔ the source forwarding U-GW ↔ the source U-GW.

It should be understood that the data forwarding tunnels established in this embodiment of the present disclosure are implemented by creating a user plane bearer context between the source U-GW serving the UE and the forwarding U-GW, and a user plane bearer context between the forwarding U-GW and the target base station of the UE. The user plane bearer contexts include routing information (for example, an address and tunnel endpoint information) required for forwarding user plane data, including routing information of the source U-GW, routing information of the forwarding U-GW, and routing information of the target base station. This is also applicable to another embodiment of the present disclosure.

In this embodiment of the present disclosure, the C-GW determines the forwarding U-GW according to the current location information of the UE. The data forwarding tunnel is established between the source U-GW and the forwarding U-GW, to ensure service continuity in a moving process of the UE, and ensure user service experience.

Figure 4:
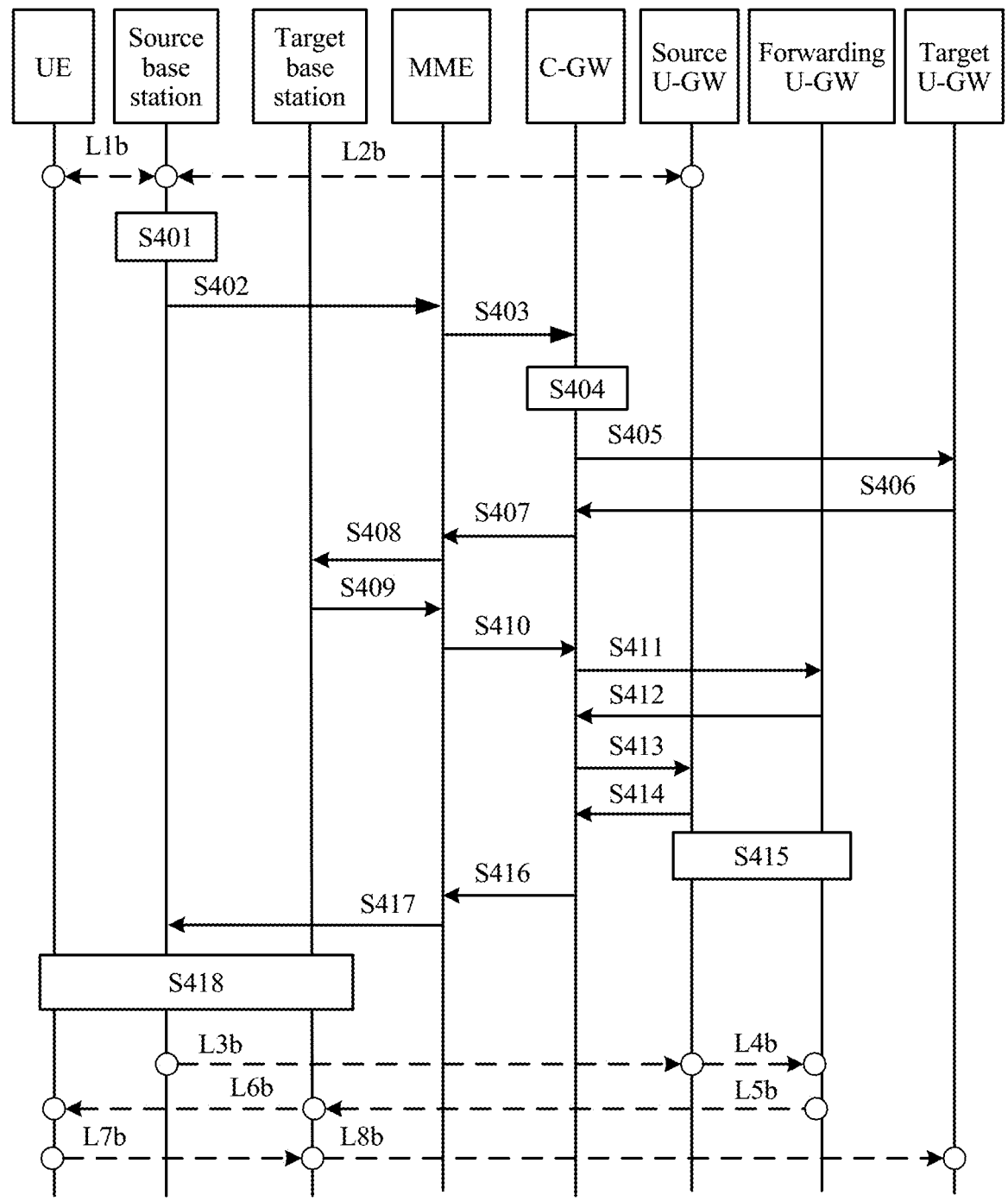
FIG. 4 is another interaction flowchart of ensuring service continuity according to an embodiment of the present disclosure.

FIG. 4 is another interaction flowchart of ensuring service continuity according to an embodiment of the present disclosure. In FIG. 4, a source base station is a serving base station used before UE is moved to a current location area. A target base station is a serving base station used after the UE is moved to the current location area. A serving MME and a serving C-GW of the UE remain unchanged before and after the movement of the UE. A source U-GW is a serving U-GW used before the UE is moved to the current location area. A target U-GW is a U-GW used after the UE is moved to the current location area. A forwarding U-GW is a U-GW that is used after the UE is moved to the current location area and used for data service switchover. Before the service switchover, an uplink/downlink user plane data transmission path is: the UE ↔ the source base station ↔ the source U-GW, that is, transmission paths indicated by a dashed line L1b and a dashed line L2b in FIG. 4.

S401. The source base station initiates a user plane data switchover procedure of the connected-mode UE.

S402. The source base station sends a service switchover request message to the MME.

S403. The MME sends a service switchover notification message to the C-GW.

S404. The C-GW determines the target U-GW and the forwarding U-GW.

For an implementation of steps S401 to S404, refer to steps S301 to S304 in FIG. 3.

S405. The C-GW sends a create session request to the target U-GW.

After selecting an appropriate target U-GW, the C-GW may initiate the create session request to the target U-GW, in order to create, on the target U-GW for the UE, a bearer context for user plane data transmission.

S406. The target U-GW sends a create session response to the C-GW.

The target U-GW creates, for the UE according to the create session request, the bearer context for user plane data transmission of the UE. Each created bearer context includes an address (such as an IP address) and tunnel endpoint information (such as a GTP TED) of the target U-GW.

After the bearer context creation is completed, the target U-GW may send the create session response to the C-GW.

S407. The C-GW returns a switchover notification acknowledgment message to the MME.

The C-GW returns the switchover notification acknowledgment message to the MME, and adds, to the message, the address and the tunnel endpoint information of the target U-GW selected by the C-GW.

S408. The MME sends a service switchover request message to the target base station.

The MME sends the service switchover request message to the target base station, and the message carries the address and the tunnel endpoint information of the target U-GW that are sent by the C-GW.

S409. The target base station returns a switchover request acknowledgment message to the MME.

After receiving the service switchover request message sent by the MME, the target base station may return the switchover request acknowledgment message to the MME, and send an address (such as an IP address) and tunnel endpoint information (such as a GTP TED) of the target base station to the MME. Similarly, the address and the tunnel endpoint information of the target base station may be sent using the switchover request acknowledgment message, or may be independently sent.

S410. The MME sends a data forwarding tunnel establishment request to the C-GW.

S411. The C-GW sends a data forwarding tunnel establishment request to the forwarding U-GW.

S412. The forwarding U-GW returns a data forwarding tunnel establishment response to the C-GW.

S413. The C-GW sends a data forwarding tunnel establishment request to the source U-GW.

S414. The source U-GW returns a data forwarding tunnel establishment response to the C-GW.

S415. Establish a data forwarding tunnel between the source U-GW and the forwarding U-GW.

S416. The C-GW returns a data forwarding tunnel establishment response to the MME.

S417. The MME sends a switchover command to the source base station.

For an implementation of steps S410 to S417, refer to steps S308 to S315 in FIG. 3.

S418. The source base station performs a data switchover procedure.

The source base station continues to perform the existing data switchover procedure, hands over the UE to a target cell, and indicates to the UE to access the target cell, and can reuse the existing switchover procedure in a subsequent step to implement complete handover of the UE to a target location.

In a switchover process and after the switchover is completed, a downlink user plane data transmission path is: the source base station ↔ the source U-GW ↔ the forwarding U-GW ↔ the target base station ↔ the UE, that is, transmission paths indicated by a dashed line L3b, a dashed line L4b, a dashed line L5b, and a dashed line L6b in FIG. 4. In the switchover process and after the switchover is completed, an uplink user plane data transmission path is: the UE ↔ the target base station ↔ the target U-GW, that is, transmission paths indicated by a dashed line L7b and a dashed line L8b in FIG. 4.

In this embodiment of the present disclosure, the C-GW determines, according to the current location information of the UE, whether to change a serving U-GW, and selects the forwarding U-GW according to whether the selected target U-GW can directly communicate with the source U-GW. The data forwarding tunnel is established between the source U-GW and the forwarding U-GW, to ensure service continuity in a moving process of the UE, and ensure user service experience. In addition, the C-GW directly initiates a bearer context setup request of the target U-GW, and notifies the target base station of routing information of the target U-GW via the MME, such that uplink data can be directly sent from the target base station to the target U-GW without passing through the forwarding U-GW and the source U-GW, implementing routing optimization of uplink data transmission.

It should be understood that interaction procedures in the embodiments shown in FIG. 3 and FIG. 4 are applicable to a scenario in which a serving MME and a serving C-GW of a UE remain unchanged before and after movement of the UE. If the serving MME of the UE changes but the serving C-GW does not change before and after the movement of the UE, it only requires that signaling interworking is increased between a source MME and a target MME on the basis of the solutions in the embodiments of the present disclosure. The signaling interworking process belongs to the existing technology, and details are not described in the present disclosure.

Figure 5:
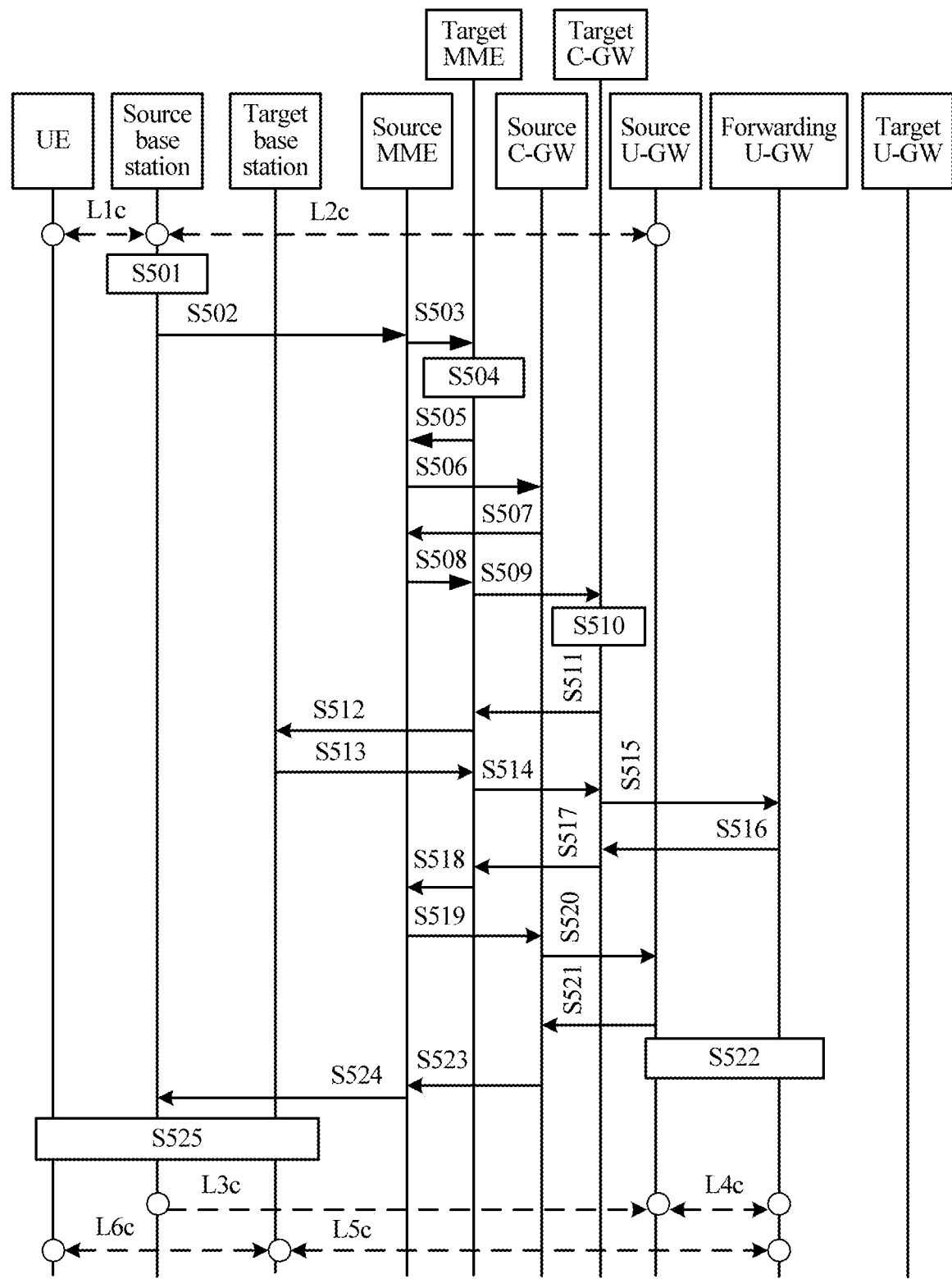
FIG. 5 is still another interaction flowchart of ensuring service continuity according to an embodiment of the present disclosure.

FIG. 5 is still another interaction flowchart of ensuring service continuity according to an embodiment of the present disclosure. In FIG. 5, a source base station is a serving base station used before a UE is moved to a current location area. A target base station is a serving base station used after the UE is moved to the current location area. A source MME is a serving MME used before the UE is moved to the current location area. A target MME is a serving MME used after the UE is moved to the current location area. A source C-GW is a serving C-GW used before the UE is moved to the current location area. A target C-GW is a serving C-GW used after the UE is moved to the current location area. A source U-GW is a serving U-GW used before the UE is moved to the current location area. A target U-GW is a U-GW used after the UE is moved to the current location area. A forwarding U-GW is a U-GW that is used after the UE is moved to the current location area and used for data service switchover. Before service switchover, an uplink/downlink user plane data transmission path is: the UE ↔ the source base station ↔ the source U-GW, that is, transmission paths indicated by a dashed line L1c and a dashed line L2c in FIG. 5.

A specific service switchover procedure in this embodiment of the present disclosure is as follows.

S501. The source base station initiates a user plane data switchover procedure of the connected-mode UE.

When the source base station of the UE senses that the UE is moved out of a service range of the source base station, and the UE is performing a user plane data service, the source base station may determine to initiate a connected-mode user plane data service switchover procedure.

S502. The source base station sends a service switchover request message to the source MME.

To be distinguished from a service switchover request message in another step in this embodiment of the present disclosure, the service switchover request message sent by the source base station to the source MME is referred to as a service switchover request message 1.

The source base station sends the service switchover request message 1 to the current serving MME (that is, a source MME in FIG. 5), and adds current location information of the UE to the message. The current location information of the UE includes a TAI corresponding to the current location area of the UE, serving base station information corresponding to the current location area of the UE, and/or the like. The corresponding TAI used when the UE is moved to the current location area is a target TAI of the UE. The corresponding serving base station information used after the UE is moved to the current location area is target base station information of the UE. The target base station information may be a target base station ID, a target CI, or the like. It may be understood that the current location area of the UE is also referred to as a target location area of the UE, that is, a location area of the UE after the UE is moved out of the service range of the source serving base station. Similarly, the current location information of the UE is also referred to as target location information of the UE.

S503. The source MME sends a forwarding relocation request message to the target MME.

The source MME determines, according to the current location information of the UE, whether the UE is moved out of a service range of the source MME. If the UE is moved out of the service range of the source MME, the source MME selects an appropriate target MME according to the current location information of the UE, and sends a forwarding relocation request message to the target MME, and the message carries the current location information of the UE. The target MME is an MME that serves the UE after the UE is moved to the current location area.

S504. The target MME determines the target C-GW.

The target MME determines, according to the current location information of the UE, whether a current serving C-GW of the UE needs to be reallocated, that is, whether the UE is moved out of a service range of the source C-GW. If the serving C-GW needs to be reallocated, the target MME selects an appropriate target C-GW according to the current location information of the UE.

S505. The target MME sends a serving C-GW change notification message to the source MME.

The target MME sends the serving C-GW change notification message to the source MME, in order to notify the source MME that the serving C-GW of the UE needs to change. When the serving C-GW change notification message is sent to the source MME, an existing message may be reused, for example, a change notification request message, and new indication information is added to the message; or a new message may be defined. This is not limited in this embodiment of the present disclosure.

S506. The source MME sends a service switchover notification message to the source C-GW.

To be distinguished from a service switchover notification message in another step in this embodiment of the present disclosure, the service switchover notification message sent by the source MME to the source C-GW is referred to as a service switchover notification message 1.

After receiving the service switchover request message 1, the serving MME (the source MME) of the UE learns that the UE is moved out of the service range of the current base station (the source base station), and then sends the service switchover notification message 1 to the current serving C-GW (the source C-GW). The message carries serving C-GW change indication information. The source MME may reuse an existing message such as a create session request message, a modify bearer request message, or a modify access bearer request message, to send the service switchover notification message 1, and add the current location information of the UE to the message. Alternatively, the source MME may define a new message to send the service switchover notification message 1. This is not limited in this embodiment of the present disclosure.

S507. The source C-GW sends a switchover notification acknowledgment to the source MME.

To be distinguished from a switchover request acknowledgment message in another step in this embodiment of the present disclosure, and to match a corresponding numeral identifier with that of the service switchover request message corresponding to the switchover notification acknowledgment message, the switchover request acknowledgment message sent by the source C-GW to the source MME is referred to as a switchover notification acknowledgment message 1.

After receiving the service switchover notification message 1 sent by the source MME, the source C-GW may return the switchover notification acknowledgment message 1 to the source MME, and the message carries an address (such as an IP address) and tunnel endpoint information (such as a GTP TED) of the source U-GW.

S508. The source MME returns a C-GW change notification acknowledgment to the target MME.

The source MME returns the C-GW change notification acknowledgment to the target MME, and the acknowledgment carries the address (such as an IP address) and the tunnel endpoint information (such as a GTP TED) of the source U-GW.

S509. The target MME sends a service switchover notification message to the target C-GW.

To be distinguished from a service switchover notification message in another step in this embodiment of the present disclosure, the service switchover notification message sent by the target MME to the target C-GW is referred to as a service switchover notification message 2.

The target MME sends the service switchover notification message 2 to the target C-GW. The service switchover notification message 2 carries the current location information of the UE, including the target TAI, the target base station information (the base station ID), and the like. It should be noted that the service switchover notification message is used to notify the C-GW that the UE needs to be handed over to a new target location area (that is, the current location area of the UE). The target MME may reuse an existing message such as a create session request message, a modify bearer request message, or a modify access bearer request message, to send the service switchover notification message 2, and add the target location information of the UE to the message. Alternatively, the target MME may define a new message to send the service switchover notification message 2. This is not limited in this embodiment of the present disclosure.

S510. The target C-GW determines the target U-GW and the forwarding U-GW.

After learning of a switchover request, the target C-GW selects an appropriate target U-GW according to the current location information of the UE, to ensure that the target U-GW can provide an optimal data transmission path in the target location for the UE, and to reduce a transmission RTT of user plane data as much as possible.

In addition, the target C-GW needs to check whether the target U-GW can directly communicate with the source U-GW. If the target U-GW can directly communicate with the source U-GW, the target U-GW is a forwarding U-GW, that is, sending performed to the forwarding U-GW in all subsequent steps is sending performed to the target U-GW. If the target U-GW cannot directly communicate with the source U-GW, the target C-GW selects, as a forwarding U-GW according to the current location information of the UE, a U-GW that can directly communicate with the source U-GW.

It should be noted that to ensure service continuity in a special scenario, there may be more than one forwarding U-GW. Typically, if the UE is moved to a neighboring U-GW pool, the target C-GW selects a default U-GW in the neighboring U-GW pool as a target forwarding U-GW. If the default U-GW cannot directly communicate with the source U-GW either, further, the target C-GW may select, as a source forwarding U-GW, a default U-GW in a U-GW pool in which the source U-GW is located, and two forwarding U-GWs are used to ensure service continuity in the moving process of the UE.

S511. The target C-GW sends a switchover notification acknowledgment message to the target MME.

To be distinguished from a switchover request acknowledgment message in another step in this embodiment of the present disclosure, and to match a corresponding numeral identifier with that of the service switchover request message corresponding to the switchover notification acknowledgment message, the switchover request acknowledgment message sent by the target C-GW to the target MME is referred to as a switchover notification acknowledgment message 2.

After determining the forwarding U-GW, the target C-GW may return the switchover notification acknowledgment message 2 to the target MME according to the service switchover notification message 2 of the target MME, and add, to the message, an address (such as an IP address) and tunnel endpoint information (such as a GTP TEID) of the forwarding U-GW selected by the target C-GW.

If there are multiple forwarding U-GWs, for example, the source forwarding U-GW and the target forwarding U-GW, the target C-GW may add, to the switchover notification acknowledgment message, an address and tunnel endpoint information of the target forwarding U-GW located in the current location area of the UE. When sending the switchover notification acknowledgment message to the target MME, the target C-GW may reuse an existing message such as a create session response message, a modify bearer response message, or a modify access bearers response message, or may define a new message, to send the switchover notification acknowledgment message 2. This is not limited in this embodiment of the present disclosure.

S512. The target MME sends a service switchover request message to the target base station.

To be distinguished from a service switchover request message in another step in this embodiment of the present disclosure, the service switchover request message sent by the target MME to the target base station is referred to as a service switchover request message 2.

The target MME sends the service switchover request message 2 to the target base station, and sends the address and the tunnel endpoint information of the forwarding U-GW to the target base station, such that an uplink data transmission path is subsequently handed over to the forwarding U-GW.

S513. The target base station sends a switchover request acknowledgment message to the target MME.

To be distinguished from a switchover request acknowledgment message in another step in this embodiment of the present disclosure, and to match a corresponding numeral identifier with that of the service switchover request message corresponding to the switchover request acknowledgment message, the switchover request acknowledgment message sent by the target base station to the target MME is referred to as a switchover request acknowledgment message 2.

The target base station returns the switchover request acknowledgment message 2, and sends an address (such as an IP address) and tunnel endpoint information (such as a GTP TED) of the target base station to the target MME.

S514. The target MME sends a data forwarding tunnel establishment request to the target C-GW.

To be distinguished from a data forwarding tunnel establishment request in another step in this embodiment of the present disclosure, the data forwarding tunnel establishment request sent by the target MME to the target C-GW is referred to as a data forwarding tunnel establishment request 1.

The target MME sends the data forwarding tunnel establishment request 1 to the target C-GW, and sends the address and the tunnel endpoint information of the target base station to the C-GW, such that a downlink data transmission path is subsequently handed over to the target base station.

S515. The target C-GW sends a data forwarding tunnel establishment request to the forwarding U-GW.

To be distinguished from a data forwarding tunnel establishment request in another step in this embodiment of the present disclosure, the data forwarding tunnel establishment request sent by the target C-GW to the forwarding U-GW is referred to as a data forwarding tunnel establishment request 2.

The target C-GW sends the data forwarding tunnel establishment request 2 to the forwarding U-GW, and sends the address and the tunnel endpoint information of the target base station and the address and the tunnel endpoint information of the source U-GW to the forwarding U-GW.

If multiple forwarding U-GWs are required, the target C-GW should send a data forwarding tunnel establishment request to each forwarding U-GW, and the request carries an address and tunnel endpoint information of a peer network element.

S516. The forwarding U-GW returns a data forwarding tunnel establishment response to the target C-GW.

To be distinguished from a data forwarding tunnel establishment response in another step in this embodiment of the present disclosure, and to correspond to the data forwarding tunnel establishment request corresponding to the data forwarding tunnel establishment response, the data forwarding tunnel establishment response sent by the forwarding U-GW to the target C-GW is referred to as a data forwarding tunnel establishment response 2.

The forwarding U-GW returns the data forwarding tunnel establishment response 2 to the target C-GW, to respond to the data forwarding tunnel establishment request 2 sent by the target C-GW, and determines that establishment of a data forwarding tunnel between the target base station and the forwarding U-GW and establishment of a data forwarding tunnel between the source U-GW and the forwarding U-GW are allowed. Optionally, the data forwarding tunnel establishment response 2 may carry the address and the tunnel endpoint information of the forwarding U-GW.

If multiple forwarding D-GWs are required in step S510, the C-GW should send a data forwarding tunnel establishment request to each forwarding D-GW, and correspondingly, each forwarding D-GW should return a data forwarding tunnel establishment response, to indicate that establishment of a data forwarding tunnel is allowed.

S517. The target C-GW returns a data forwarding tunnel establishment response to the target MME.

To be distinguished from a data forwarding tunnel establishment response in another step in this embodiment of the present disclosure, and to match a corresponding numeral identifier with that of the data forwarding tunnel establishment request corresponding to the data forwarding tunnel establishment response, the data forwarding tunnel establishment response sent by the target C-GW to the target MME is referred to as a data forwarding tunnel establishment response 1.

After receiving the data forwarding tunnel establishment response 2, the target C-GW returns the data forwarding tunnel establishment response 1 to the target MME, and determines that establishment of the data forwarding tunnel between the target base station and the forwarding U-GW is allowed.

S518. The target MME sends a forwarding relocation response to the source MME.

After determining that the data forwarding tunnel between the target base station and the forwarding U-GW can be established, the target MME may send the forwarding relocation response to the source MME, and the response carries the address and the tunnel endpoint information of the forwarding U-GW.

S519. The source MME sends a data forwarding tunnel establishment request to the source C-GW.

To be distinguished from a data forwarding tunnel establishment request in another step in this embodiment of the present disclosure, the data forwarding tunnel establishment request sent by the source MME to the source C-GW is referred to as a data forwarding tunnel establishment request 3.

The source MME sends the data forwarding tunnel establishment request 3 to the source C-GW, and sends the address and the tunnel endpoint information of the forwarding U-GW to the source C-GW.

S520. The source C-GW sends a data forwarding tunnel establishment request to the source U-GW.

To be distinguished from a data forwarding tunnel establishment request in another step in this embodiment of the present disclosure, the data forwarding tunnel establishment request sent by the source C-GW to the source U-GW is referred to as a data forwarding tunnel establishment request 4.

The source C-GW sends the data forwarding tunnel establishment request 4 to the source U-GW, and sends the address and the tunnel endpoint information of the forwarding U-GW to the source U-GW.

S521. The source U-GW sends a data forwarding tunnel establishment response to the source C-GW.

To be distinguished from a data forwarding tunnel establishment response in another step in this embodiment of the present disclosure, and to match a corresponding numeral identifier with that of the data forwarding tunnel establishment request corresponding to the data forwarding tunnel establishment response, the data forwarding tunnel establishment response sent by the source U-GW to the source C-GW is referred to as a data forwarding tunnel establishment response 4.

After receiving the data forwarding tunnel establishment request 4 sent by the source C-GW, the source U-GW may return the data forwarding tunnel establishment response 4, and determine that establishment of the data forwarding tunnel between the forwarding U-GW and the source U-GW is allowed.

S522. Establish a data forwarding tunnel between the source U-GW and the forwarding U-GW.

After an address and tunnel endpoint information of a peer U-GW are obtained, the data forwarding tunnel between the source U-GW and the forwarding U-GW is established.

Certainly, it should be understood that if multiple forwarding U-GWs are determined in step S510, for example, the source forwarding U-GW and the target forwarding U-GW, a data forwarding tunnel between the source U-GW and the source forwarding U-GW, and a data forwarding tunnel between the source forwarding U-GW and the target forwarding U-GW are correspondingly established.

S523. The source C-GW sends a data forwarding tunnel establishment response to the source MME.

To be distinguished from a data forwarding tunnel establishment response in another step in this embodiment of the present disclosure, and to match a corresponding numeral identifier with that of the data forwarding tunnel establishment request corresponding to the data forwarding tunnel establishment response, the data forwarding tunnel establishment response sent by the source C-GW to the source MME is referred to as a data forwarding tunnel establishment response 3.

After receiving the data forwarding tunnel establishment response 4, the source C-GW may send the data forwarding tunnel establishment response 3 to the source MME, and determine that establishment of the data forwarding tunnel between the forwarding U-GW and the source U-GW is allowed.

S524. The source MME sends a switchover command to the source base station.

The source MME sends the switchover command to the source base station, and the command carries the address and the tunnel endpoint information of the forwarding U-GW.

If multiple forwarding U-GWs are required, an address and tunnel endpoint information of the source forwarding U-GW located in a source location area of the UE are carried in the switchover command.

S525. The source base station continues to perform an existing data switchover procedure, hands over the UE to a target cell, and indicates to the UE to access the target cell; and subsequently reuses the existing switchover procedure to implement complete handover of the UE to a target location.

In a switchover process and after the switchover is completed, an uplink/downlink user plane data transmission path changes to: the UE ↔ the target base station ↔ the forwarding U-GW ↔ the source U-GW, that is, transmission paths indicated by a dashed line L3c, a dashed line L4c, a dashed line L5c, and a dashed line L6c in FIG. 5. It should be noted that before, during, and after the switchover, the uplink/downlink user plane data transmission path passes through the source U-GW. However, considering that both the source U-GW and the forwarding U-GW have been moved downwards to locations closer to the UE, the source U-GW is also very close to the forwarding U-GW, and therefore, an RTT of user plane data does not significantly increase.

In this embodiment of the present disclosure, the target C-GW determines the forwarding U-GW according to the current location information of the UE, and establishes the data forwarding tunnel between the source U-GW and the forwarding U-GW, to ensure service continuity in a moving process of the UE, and ensure user service experience.

Figure 6A:
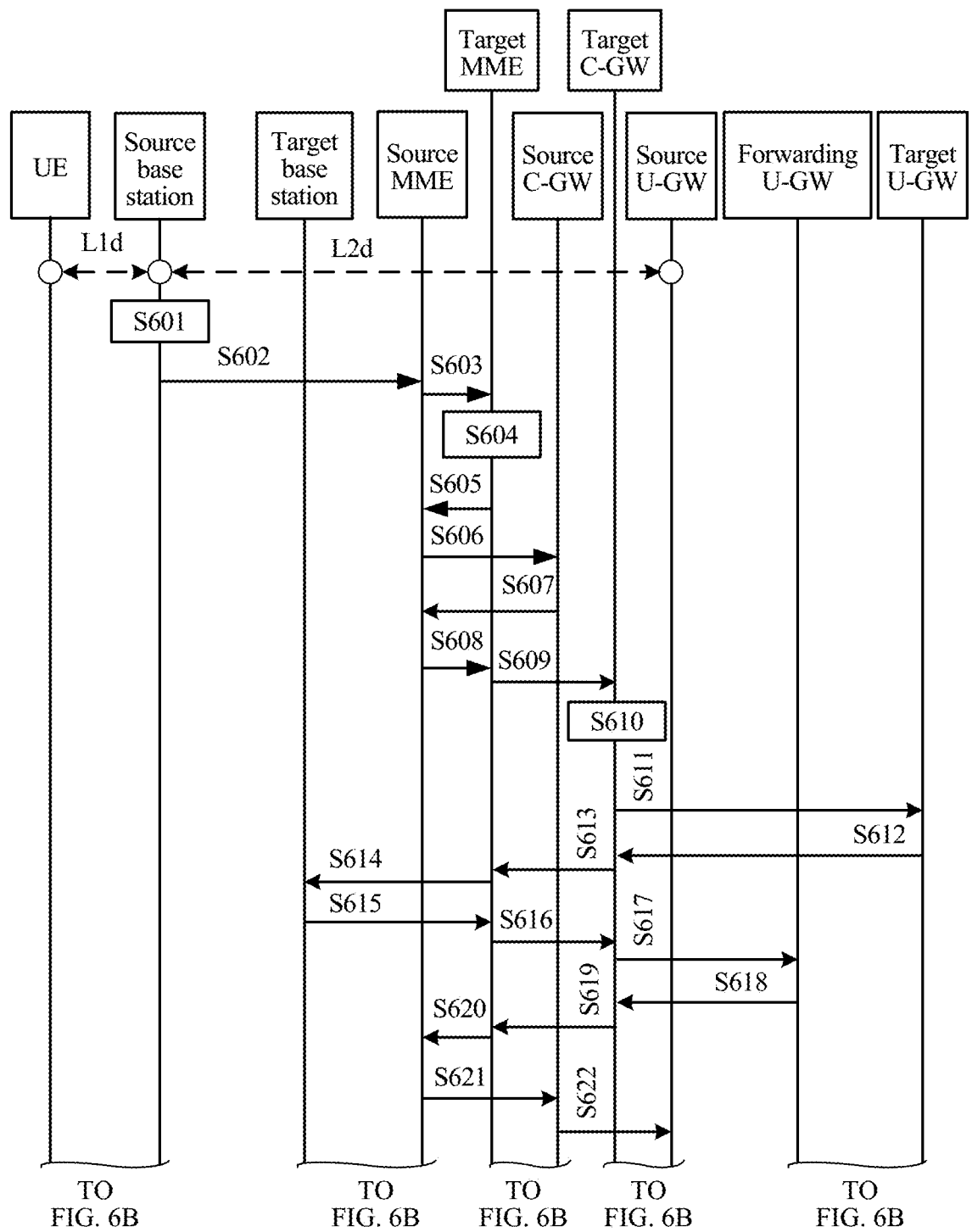
FIG. 6A and FIG. 6B are still another interaction flowchart of ensuring service continuity according to an embodiment of the present disclosure.
Figure 6B:
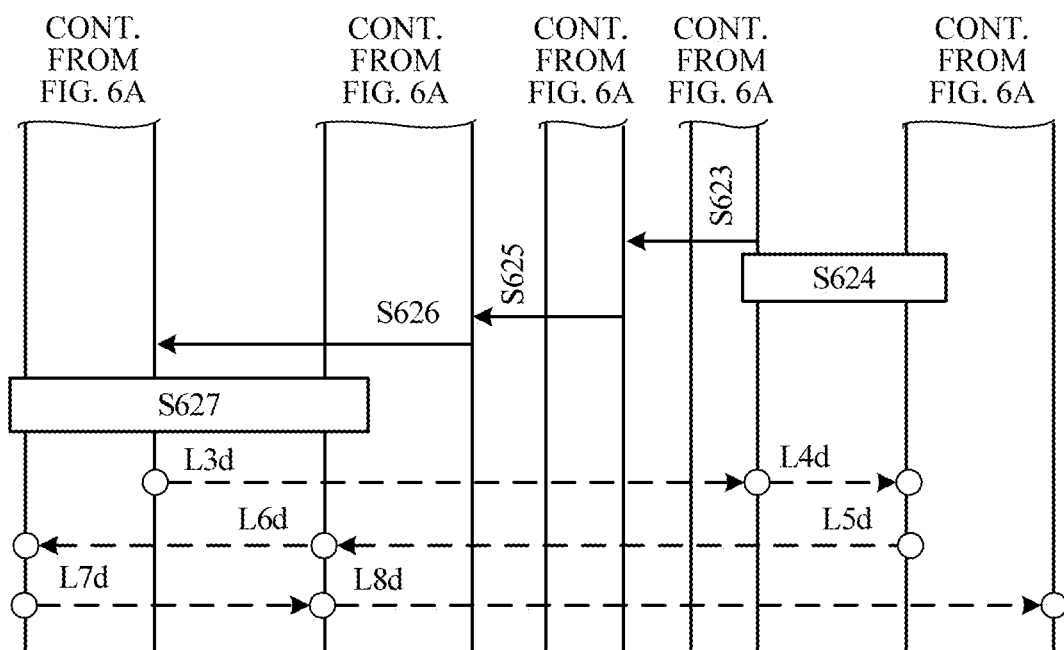

FIG. 6A and FIG. 6B are still another interaction flowchart of ensuring service continuity according to an embodiment of the present disclosure. In FIG. 6A and FIG. 6B, a source base station is a serving base station used before a UE is moved to a current location area. A target base station is a serving base station used after the UE is moved to the current location area. A source MME is a serving MME used before the UE is moved to the current location area. A target MME is a serving MME used after the UE is moved to the current location area. A source C-GW is a serving C-GW used before the UE is moved to the current location area. A target C-GW is a serving C-GW used after the UE is moved to the current location area. A source U-GW is a serving U-GW used before the UE is moved to the current location area. A target U-GW is a U-GW used after the UE is moved to the current location area. A forwarding U-GW is a U-GW that is used after the UE is moved to the current location area and used for data service switchover. Before service switchover, an uplink/downlink user plane data transmission path is: the UE ↔ the source base station ↔ the source U-GW, that is, transmission paths indicated by a dashed line L1d and a dashed line L2d in FIG. 6A and FIG. 6B.

A specific service switchover procedure in this embodiment of the present disclosure is as follows.

S601. The source base station initiates a user plane data switchover procedure of the connected-mode UE.

S602. The source base station sends a service switchover request message.

S603. The source MME sends a forwarding relocation request message.

S604. The target MME determines the target C-GW.

S605. The target MME sends a serving C-GW change notification message to the source MME.

S606. The source MME sends a service switchover notification message to the source C-GW.

S607. The source C-GW sends a switchover notification acknowledgment to the source MME.

S608. The source MME returns a C-GW change notification acknowledgment to the target MME.

S609. The target MME sends a service switchover notification message to the target C-GW.

S610. The target C-GW determines the target U-GW and the forwarding U-GW.

For an implementation of steps S601 to S610, refer to steps S501 to S510 in FIG. 5.

S611. The target C-GW sends a create session request to the target U-GW.

After selecting an appropriate target U-GW, the target C-GW may initiate the create session request to the target U-GW, in order to create, on the target U-GW for the UE, a bearer context for user plane data transmission.

S612. The target U-GW sends a create session response to the target C-GW.

The target U-GW creates, for the UE according to the create session request, the bearer context for user plane data transmission of the UE. Each created bearer context includes an address (such as an IP address) and tunnel endpoint information (such as a GTP TED) of the target U-GW.

After bearer context creation is completed, the target U-GW may send the create session response to the target C-GW.

S613. The target C-GW sends a switchover notification acknowledgment message to the target MME.

To be distinguished from a switchover request acknowledgment message in another step in this embodiment of the present disclosure, and to match a corresponding numeral identifiers with that of the service switchover request message corresponding to the switchover notification acknowledgment message, the switchover request acknowledgment message sent by the target C-GW to the target MME is referred to as a switchover notification acknowledgment message 2.

After determining the forwarding U-GW, the target C-GW may return the switchover notification acknowledgment message 2 to the target MME according to the service switchover notification message 2 of the target MME, and add, to the message, an address (such as an IP address) and tunnel endpoint information (such as a GTP TED) of the target U-GW selected by the target C-GW.

S614. The target MME sends a service switchover request message to the target base station.

To be distinguished from a service switchover request message in another step in this embodiment of the present disclosure, the service switchover request message sent by the target MME to the target base station is referred to as a service switchover request message 2.

The target MME sends the service switchover request message 2 to the target base station, and the message carries the address and the tunnel endpoint information of the target U-GW that are sent by the target C-GW.

S615. The target base station sends a switchover request acknowledgment message to the target MME.

To be distinguished from a switchover request acknowledgment message in another step in this embodiment of the present disclosure, and to match a corresponding numeral identifier with that of the service switchover request message corresponding to the switchover request acknowledgment message, the switchover request acknowledgment message sent by the target base station to the target MME is referred to as a switchover request acknowledgment message 2.

The target base station returns the switchover request acknowledgment message 2, and sends an address (such as an IP address) and tunnel endpoint information (such as a GTP TED) of the target base station to the target MME.

S616. The target MME sends a data forwarding tunnel establishment request to the target C-GW.

S617. The target C-GW sends a data forwarding tunnel establishment request to the forwarding U-GW.

S618. The forwarding U-GW returns a data forwarding tunnel establishment response to the target C-GW.

S619. The target C-GW returns a data forwarding tunnel establishment response to the target MME.

S620. The target MME sends a forwarding relocation response to the source MME.

S621. The source MME sends a data forwarding tunnel establishment request to the source C-GW.

S622. The source C-GW sends a data forwarding tunnel establishment request to the source U-GW.

S623. The source U-GW sends a data forwarding tunnel establishment response to the source C-GW.

S624. Establish a data forwarding tunnel between the source U-GW and the forwarding U-GW.

S625. The source C-GW sends a data forwarding tunnel establishment response to the source MME.

S626. The source MME sends a switchover command to the source base station.

For an implementation of steps S616 to S626, refer to steps S514 to S524 in FIG. 5.

S627. The source base station continues to perform an existing data switchover procedure, hands over the UE to a target cell, and indicates to the UE to access the target cell; and subsequently reuses the existing switchover procedure to implement complete handover of the UE to a target location.

In a switchover process and after the switchover is completed, a downlink user plane data transmission path is: the source base station ↔ the source U-GW ↔ the forwarding U-GW ↔ the target base station ↔ the UE, that is, transmission paths indicated by a dashed line L3d, a dashed line L4d, a dashed line L5d, and a dashed line L6d in FIG. 6A and FIG. 6B. In a switchover process and after the switchover is completed, an uplink user plane data transmission path is: the UE ↔ the target base station ↔ the target U-GW, that is, transmission paths indicated by a dashed line L7d and a dashed line L8d in FIG. 6A and FIG. 6B.

In this embodiment of the solution of the present disclosure, the target C-GW determines, according to the current location information of the UE, whether to change a serving U-GW, and selects the forwarding U-GW according to whether the selected target U-GW can directly communicate with the source U-GW. The data forwarding tunnel is established between the source U-GW and the forwarding U-GW, to ensure service continuity in a moving process of the UE, and ensure user service experience. In addition, the C-GW directly initiates a bearer context setup request of the target U-GW, and notifies the target base station of routing information of the target U-GW via the MME, such that uplink data can be directly sent from the target base station to the target U-GW without passing through the forwarding U-GW and the source U-GW, implementing routing optimization of uplink data transmission.

It should be understood that interaction procedures in the embodiments shown in FIG. 5, FIG. 6A, and FIG. 6B are applicable to a scenario in which a serving MME and a serving C-GW of UE both change before and after the movement of the UE. If the serving C-GW of the UE changes but the serving MME does not change before and after the movement of the UE, it only requires that signaling interworking decreases between a source MME and a target MME on the basis of the solutions in the embodiments of the present disclosure. Details are not described in the present disclosure.

Figure 7:
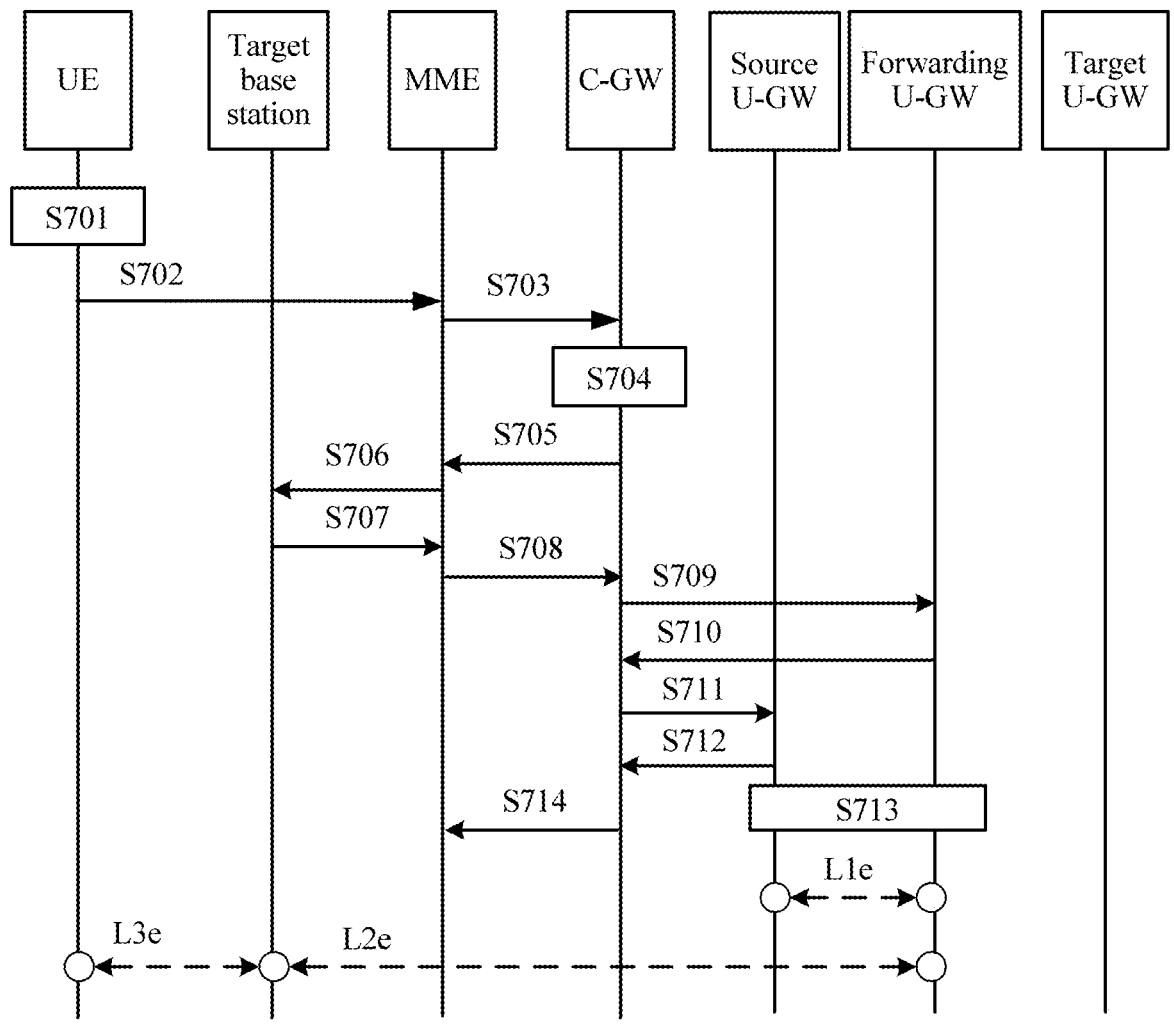
FIG. 7 is still another interaction flowchart of ensuring service continuity according to an embodiment of the present disclosure.

FIG. 7 is still another interaction flowchart of ensuring service continuity according to an embodiment of the present disclosure. In FIG. 7, a target base station is a serving base station used when a UE switches from an idle mode to a connected mode in a current location area. A source U-GW is a serving U-GW used before the UE is moved to the current location area. A target U-GW is a serving U-GW used when the UE switches from the idle mode to the connected mode in the current location area. A forwarding U-GW is a U-GW that is used after the UE is moved to the current location area and used for data service switchover. An MME is a serving MME used when the UE switches from the idle mode to the connected mode in the current location area. A C-GW is a serving C-GW used when the UE switches from the idle mode to the connected mode in the current location area.

A procedure in this embodiment of the present disclosure is as follows.

S701. The idle-mode UE needs to send uplink user plane data.

S702. The UE sends a signaling request to the MME.

If the idle-mode UE is moved out of a current registered location area (such as a current registered TA), the UE may send the signaling request to the MME to initiate a location update procedure. For example, if the location update procedure is a TAU procedure, the signaling request is a location update request message.

If the idle-mode UE is moved out of a service area of a current serving base station but is not moved out of a current registered location area (such as a current registered TA), the UE may send the signaling request to the MME to initiate a service request procedure, and the signaling request is a service request message.

Specifically, the UE may send the signaling request message to the serving MME using the target base station, and the target base station sends current location information of the UE to the MME.

The current location information of the UE includes a TAI corresponding to the current location area of the UE, serving base station information corresponding to the current location area of the UE, and/or the like. The corresponding TAI used when the UE is moved to the current location area is a target TAI of the UE. The corresponding serving base station information used when the UE is moved to the current location area is target base station information of the UE. The target base station information may be a target base station ID, a target CI, or the like. The current location area of the UE is also referred to as a target location area of the UE, that is, a location area in which the UE is located after the UE is moved out of a service range of a source serving base station. Similarly, the current location information of the UE is also referred to as target location information of the UE.

S703. The MME sends a request message to the C-GW, and adds current location information of the UE to the request message.

After receiving a location update request message or a service request message, the serving MME of the UE learns, according to the current location information of the UE, that the UE is moved out of the service range of the current base station (the source base station), the serving MME of the UE sends the request message to the current serving C-GW. The request message is used to indicate to the C-GW to move the UE to a new target location area. The MME may reuse an existing message such as a create session request message, a modify bearer request message, or a modify access bearer request message, or may define a new message. This is not limited in this embodiment of the present disclosure.

S704. The C-GW determines the target U-GW and the forwarding U-GW.

After receiving the request message sent by the MME, the C-GW may determine the target U-GW and the forwarding U-GW according to the current location information of the UE. For an implementation, refer to step S304 in the embodiment shown in FIG. 3. Details are not described herein again.

S705. The C-GW returns a request acknowledgment message to the MME.

The C-GW returns the request acknowledgment message to the MME. For an implementation, refer to step S305 in the embodiment shown in FIG. 3. Details are not described herein again.

S706. The MME sends an initial context setup request message to the target base station.

The MME sends the initial context setup request message to the target base station, and forwards, to the target base station, an address and tunnel endpoint information of the forwarding U-GW that are sent by the C-GW, such that an uplink data transmission path is subsequently handed over to the forwarding U-GW.

S707. The target base station returns an initial context setup response message to the MME.

The target base station returns the initial context setup response message to the MME, and sends an address (such as an IP address) and tunnel endpoint information (such as a GTP TED) of the target base station to the MME.

S708. The MME sends a modify bearer request message to the C-GW.

The MME sends the modify bearer request message to the C-GW, and sends the address and the tunnel endpoint information of the target base station to the C-GW, such that a downlink data transmission path is subsequently handed over to the target base station. Optionally, in this step, the MME may send, to the C-GW, a modify access bearer request message that carries the address and the tunnel endpoint information of the target base station.

S709. The C-GW sends a data forwarding tunnel establishment request to the forwarding U-GW.

S710. The forwarding U-GW returns a data forwarding tunnel establishment response to the C-GW.

S711. The C-GW sends a data forwarding tunnel establishment request to the source U-GW.

S712. The source U-GW returns a data forwarding tunnel establishment response to the C-GW.

S713. Establish a data forwarding tunnel between the source U-GW and the forwarding U-GW.

For an implementation of steps S709 to S713, refer to steps S309 to S313 in the embodiment shown in FIG. 3. Details are not described herein again.

S714. The C-GW returns a modify bearer response to the MME.

Optionally, corresponding to step S708, the C-GW may return a modify access bearers response message to the MME.

In the location update procedure or the service request procedure, an uplink/downlink user plane data transmission path changes to: the UE ↔ the target base station ↔ the forwarding U-GW ↔ the source U-GW, that is, transmission paths indicated by a dashed line L1e, a dashed line L2e, and a dashed line L3e in FIG. 7. It should be noted that the uplink/downlink user plane data transmission path passes through the source U-GW. However, considering that both the source U-GW and the forwarding U-GW have been moved downwards to locations closer to the UE, the source U-GW is also very close to the forwarding U-GW, and therefore, an RTT of user plane data does not significantly increase. When the C-GW determines that two or more U-GWs are used as forwarding U-GWs, data forwarding tunnel paths of the forwarding U-GWs pass through all the forwarding U-GWs. For example, if the forwarding U-GW includes the target forwarding U-GW and the source forwarding U-GW, transmission paths change to: the UE ↔ the target base station ↔ the target forwarding U-GW ↔ the source forwarding U-GW ↔ the source U-GW.

In this embodiment of the present disclosure, the C-GW determines the forwarding U-GW according to the current location information of the UE. The data forwarding tunnel is established between the source U-GW and the forwarding U-GW, to ensure service continuity in a moving process of the UE, and ensure user service experience.

Figure 8:
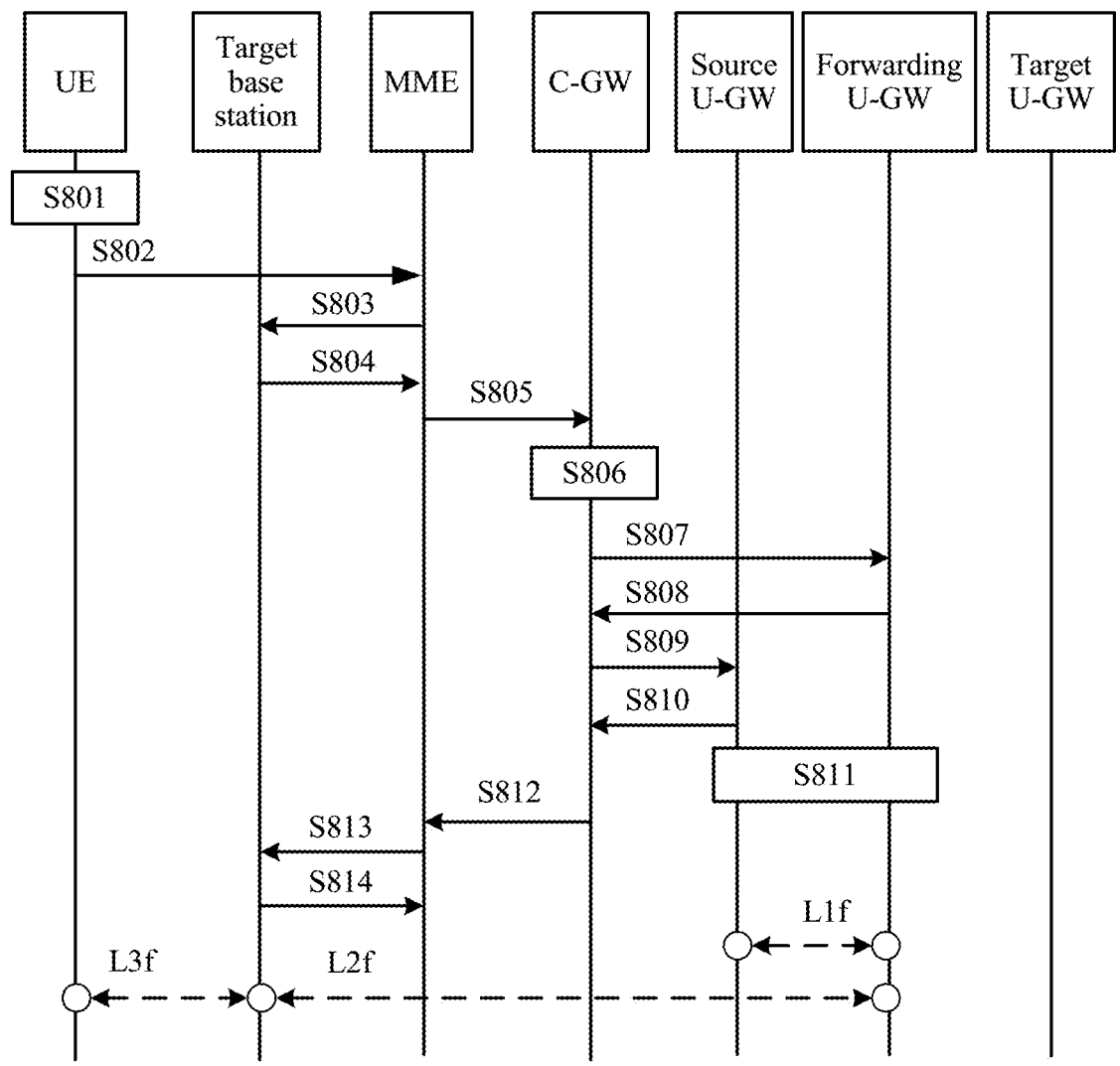
FIG. 8 is still another interaction flowchart of ensuring service continuity according to an embodiment of the present disclosure.

FIG. 8 is still another interaction flowchart of ensuring service continuity according to an embodiment of the present disclosure. In FIG. 8, a target base station is a serving base station used when a UE switches from an idle mode to a connected mode in a current location area. A source U-GW is a serving U-GW used before the UE is moved to the current location area. A target U-GW is a serving U-GW used when the UE switches from the idle mode to the connected mode in the current location area. A forwarding U-GW is a U-GW that is used after the UE is moved to the current location area and used for data service switchover. An MME is a serving MME used when the UE switches from the idle mode to the connected mode in the current location area. A C-GW is a serving C-GW used when the UE switches from the idle mode to the connected mode in the current location area.

A procedure in this embodiment of the present disclosure is as follows.

S801. The idle-mode UE needs to send uplink user plane data.

S802. The UE sends a signaling request to the MME.

For an implementation of step S802, refer to step S702 in FIG. 7. Details are not described herein again.

S803. The MME sends an initial context setup request message to the target base station.

The MME sends the initial context setup request message to the target base station. This step is an existing step in an existing location update procedure or service request procedure. Therefore, herein, the MME sends an address and tunnel endpoint information of the source U-GW to the target base station.

S804. The target base station returns an initial context setup response message to the MME.

The target base station returns the initial context setup response message to the MME, and sends an address (such as an IP address) and tunnel endpoint information (such as a GTP TEID) of the target base station to the MME.

S805. The MME sends a modify bearer request message to the C-GW.

The MME sends the modify bearer request message to the C-GW, and sends the current location information of the UE and the address and the tunnel endpoint information of the target base station to the C-GW. Optionally, in this step, the MME may send, to the C-GW, a modify access bearer request message that carries the current location information of the UE and the address and the tunnel endpoint information of the target base station.

S806. The C-GW determines the target U-GW and the forwarding U-GW.

After receiving the modify bearer request message sent by the MME, the C-GW may determine the target U-GW and the forwarding U-GW according to the current location information of the UE. For an implementation, refer to step S304 in the embodiment shown in FIG. 3. Details are not described herein again.

S807. The C-GW sends a data forwarding tunnel establishment request to the forwarding U-GW.

S808. The forwarding U-GW returns a data forwarding tunnel establishment response to the C-GW.

S809. The C-GW sends a data forwarding tunnel establishment request to the source U-GW.

S810. The source U-GW returns a data forwarding tunnel establishment response to the C-GW.

S811. Establish a data forwarding tunnel between the source U-GW and the forwarding U-GW.

For an implementation of steps S807 to S811, refer to steps S309 to S313 in the embodiment shown in FIG. 3. Details are not described herein again.

S812. The C-GW returns a modify bearer response to the MME.

The C-GW returns the modify bearer response message to the MME, and sends an address and tunnel endpoint information of the determined forwarding U-GW to the MME. Optionally, corresponding to step S805, the C-GW may return, to the MME, a modify access bearers response message, and the message carries an address and tunnel endpoint information of the forwarding U-GW.

S813. The MME sends a UE context modification request to the target base station.

The MME sends the UE context modification request message to the target base station, and adds the address and the tunnel endpoint information of the forwarding U-GW to the message, such that an uplink user plane data transmission path is subsequently handed over to the forwarding U-GW. It should be noted that this step is a newly added step to the existing location update procedure or service request procedure.

S814. The target base station returns a UE context modification response message to the MME.

The target base station returns the UE context modification response message to the MME.

In the location update procedure or the service request procedure, an uplink/downlink user plane data transmission path changes to: the UE ↔ the target base station ↔ the forwarding U-GW ↔ the source U-GW, that is, transmission paths indicated by a dashed line L1$f$, a dashed line L2$f$, and a dashed line L3$f$ in FIG. 8. It should be noted that the uplink/downlink user plane data transmission path passes through the source U-GW. However, considering that both the source U-GW and the forwarding U-GW have been moved downwards to locations closer to the UE, the source U-GW is also very close to the forwarding U-GW, and therefore, an RTT of user plane data does not significantly increase. When the C-GW determines that two or more U-GWs are used as forwarding U-GWs, data forwarding tunnel paths of the forwarding U-GWs pass through all the forwarding U-GWs. For example, if the forwarding U-GW includes the target forwarding U-GW and the source forwarding U-GW, transmission paths change to: the UE ↔ the target base station ↔ the target forwarding U-GW ↔ the source forwarding U-GW ↔ the source U-GW.

In this embodiment of the present disclosure, the C-GW determines the forwarding U-GW according to the current location information of the UE. The data forwarding tunnel is established between the source U-GW and the forwarding U-GW, to ensure service continuity in a moving process of the UE, and ensure user service experience.

Figure 9:
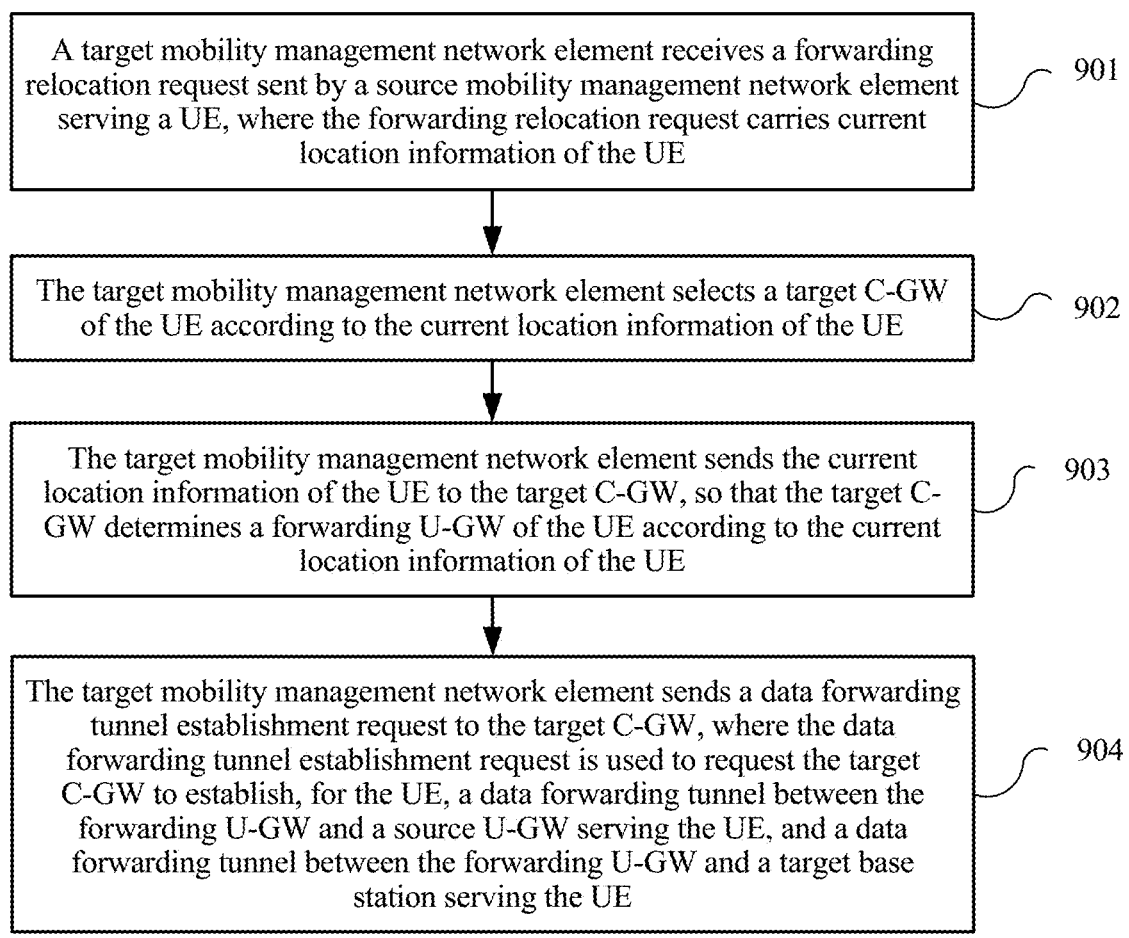
FIG. 9 is another flowchart of a service continuity ensuring method according to an embodiment of the present disclosure.

FIG. 9 is another flowchart of a service continuity ensuring method according to an embodiment of the present disclosure. The method in FIG. 9 is performed by a target mobility management network element. The method includes the following steps.

901. The target mobility management network element receives a forwarding relocation request sent by a source mobility management network element serving a UE.

The forwarding relocation request carries current location information of the UE.

For an implementation of step 901, refer to step S503 in FIG. 5 or step S603 in FIG. 6A and FIG. 6B.

In an application scenario in this embodiment of the present disclosure, when the UE performs service communication, a location area after movement falls beyond a service range of the source mobility management network element (such as an MME). The source mobility management network element is a serving mobility management network element used before the UE is moved to the current location area.

902. The target mobility management network element selects a target C-GW of the UE according to current location information of the UE.

For an implementation of step 902, refer to step S504 in FIG. 5 or step S604 in FIG. 6A and FIG. 6B.

903. The target mobility management network element sends the current location information of the UE to the target C-GW, such that the target C-GW determines a forwarding U-GW of the UE according to the current location information of the UE.

For an implementation of step 902, refer to step S509 in FIG. 5 or step S609 in FIG. 6A and FIG. 6B.

S904. The target mobility management network element sends a data forwarding tunnel establishment request to the target C-GW.

The data forwarding tunnel establishment request is used to request the target control plane gateway to establish, for the user equipment, a data forwarding tunnel between the forwarding U-GW and a source U-GW serving the user equipment, and a data forwarding tunnel between the forwarding U-GW and a target base station serving the user equipment.

For an implementation of step 904, refer to step S514 in FIG. 5 or step S616 in FIG. 6A and FIG. 6B.

In this embodiment of the present disclosure, after the UE is moved out of the service range of the source mobility management network element, the target mobility management network element determines the target C-GW of the UE according to the current location information of the UE, and further establishes a data forwarding tunnel between the source U-GW and the target base station of the UE for the UE using the target C-GW, in order to ensure service continuity in a moving process of the UE, and improve user service experience.

Optionally, in an embodiment, the target C-GW is different from a serving C-GW used before the UE is moved to the current location area (that is, the serving C-GW changes in the moving process of the UE). In this case, after step 902 and before step 903, the method may further include: sending, by the target mobility management network element, a change notification message to the source mobility management network element, where the change notification message is used to indicate that a serving C-GW of the UE changes to the target C-GW. For an implementation, refer to step S505 in FIG. 5 or step S605 in FIG. 6A and FIG. 6B.

Further, before step 903, the method may further include: receiving, by the target mobility management network element, an acknowledgment message sent by the source mobility management network element according to the change notification message, where the acknowledgment message carries routing information of the source U-GW of the UE. For an implementation, refer to step S508 in FIG. 5 or step 608 in FIG. 6A and FIG. 6B.

In this embodiment of the present disclosure, for an implementation of the mobility management network element, refer to the method performed by the target MME shown in FIG. 5 or FIG. 6A and FIG. 6B. Details are not described in this embodiment of the present disclosure again.

Figure 10:
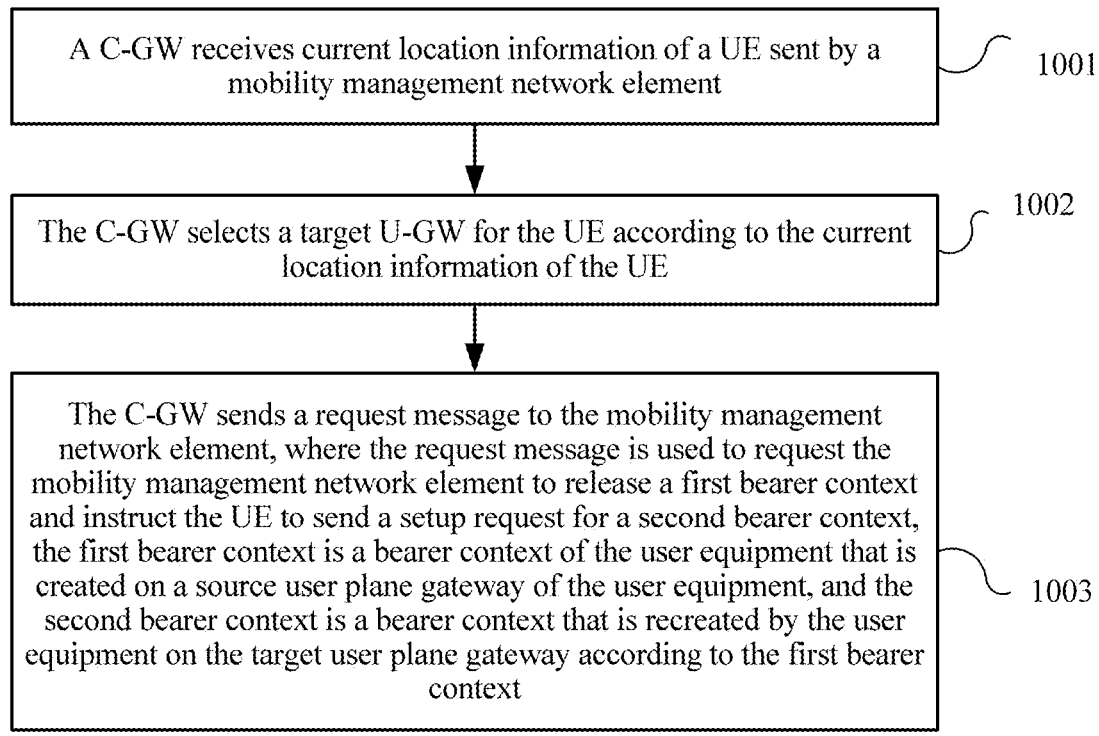
FIG. 10 is still another flowchart of a service continuity ensuring method according to an embodiment of the present disclosure.

FIG. 10 is still another flowchart of a service continuity ensuring method according to an embodiment of the present disclosure. The method in FIG. 10 is performed by a C-GW. The method includes the following steps.

1001. The C-GW receives current location information of a UE sent by a mobility management network element.

This embodiment of the present disclosure is applicable to any one of the following application scenarios.

During user plane data transmission, the connected-mode UE is moved, and a location area after the movement falls beyond a service range of a source base station; and after sensing that the UE is moved out of the service range of the source base station, the source base station determines to initiate a connected-mode user plane data service switchover procedure. The source base station is a serving base station used before the UE is moved to the current location area.

When uplink user plane data needs to be transmitted, the idle-mode UE is moved out of a current registered location area, such as a current registered TA, and the UE initiates a location update procedure, such as a TAU procedure.

When uplink user plane data needs to be transmitted, the idle-mode UE is moved out of a service area of a current serving base station but is not moved out of a current registered location area, such as a current TA, and the UE initiates a service request procedure.

In the application scenario (1), after receiving a user plane data switchover request sent by the source base station, the mobility management network element may send a service switchover notification to the serving C-GW of the UE. It should be understood that the mobility management network element may be an MME or another network element that has a mobility management function of an MME. In an application, the mobility management network element may send the service switchover notification using an existing message such as a create session request message, a modify bearer request message, or a modify access bearer request message; or the mobility management network element may send the service switchover notification using a newly created message. A specific message used for sending the service switchover notification is not limited in the present disclosure.

In the application scenario (2), after receiving a location update request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

In the application scenario (3), after receiving a service request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

It should be noted that the C-GW is a C-GW serving the UE.

It should be noted that the mobility management network element is a mobility management network element serving the UE. In an application, the mobility management network element may be an MME or another network element that has a mobility management function of an MME.

1002. The C-GW selects a target U-GW for the UE according to the current location information of the UE.

1003. The C-GW sends a request message to the mobility management network element.

The request message is used to request the mobility management network element to release a first bearer context and indicate to the UE to send a setup request for a second bearer context, the first bearer context is a bearer context of the UE that is established on a source U-GW of the UE, and the second bearer context is a bearer context that is reestablished by the UE on the target U-GW according to the first bearer context.

Optionally, in an embodiment, the request message is a delete bearer request message, the delete bearer request message carries a reactivation request indication, and the reactivation request indication is used to indicate, using the mobility management network element, to the UE to initiate the setup request for the second bearer context after the first bearer context is deleted.

It should be understood that both the MME and the UE record the first bearer context created by the UE on the source U-GW. After receiving the delete bearer request message, the MME deletes the first bearer context on the MME, and indicates to the UE to delete the first bearer context on the UE. When the delete bearer request message carries the reactivation request indication, the MME further sends the reactivation request indication to the UE, to indicate to the UE to resend a setup request for a bearer context according to content of the first bearer context after the first bearer context is deleted, and request to create the second bearer context. The second bearer context is a bearer context that is created on the target U-GW according to the first bearer context. Typically, the second bearer context includes an access point name (APN) the same as that of the first bearer context.

In this embodiment of the present disclosure, before the UE changes from an idle mode to a connected mode and sends user plane data, the C-GW determines a serving U-GW of the UE according to the current location information of the UE, triggers a bearer context deactivation procedure, and adds a reactivation request indication during the bearer context deactivation procedure to indicate to the UE to initiate a bearer context recreation procedure, to recreate bearer resources on the target U-GW, ensure service continuity of subsequent user plane data transmission, and ensure user service experience.

The following further describes the method in the embodiments of the present disclosure with reference to example embodiments.

Figure 11:
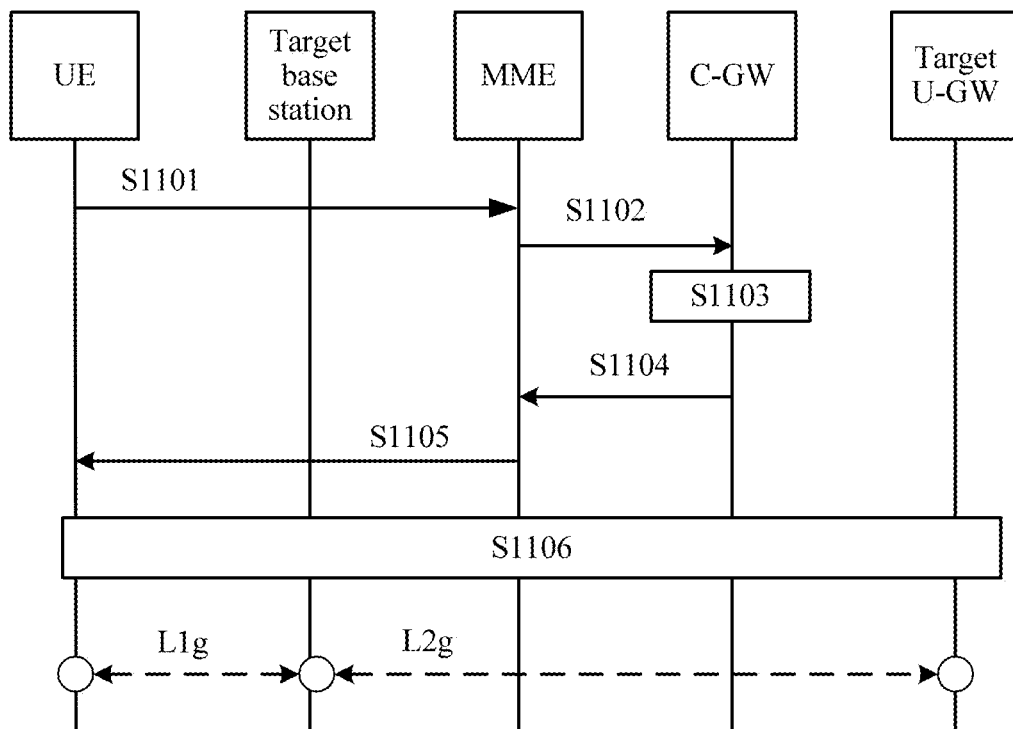
FIG. 11 is still another interaction flowchart of ensuring service continuity according to an embodiment of the present disclosure.

FIG. 11 is still another interaction flowchart of ensuring service continuity according to an embodiment of the present disclosure. In FIG. 11, a target base station is a serving base station used when a UE switches from an idle mode to a connected mode in a current location area. A target U-GW is a serving U-GW used when the UE switches from the idle mode to the connected mode in the current location area. An MME is a serving MME used when the UE switches from the idle mode to the connected mode in the current location area. A C-GW is a serving C-GW used when the UE switches from the idle mode to the connected mode in the current location area.

A procedure in this embodiment of the present disclosure is as follows.

S1101. The UE sends a signaling request to the MME.

Because the idle-mode UE needs to transmit uplink signaling or data, the idle-mode UE sends signaling to the MME, to request to switch to the connected mode. The UE initiates a service request procedure or a TAU procedure to implement switchover from the idle mode to the connected mode.

In a process of switching from the idle mode to the connected mode, the target base station, that is, a current serving base station of the UE, reports current location information of the UE to the current serving MME, and the current location information of the UE may be a current TAI and/or a current CI.

S1102. The MME sends a location update notification message to the C-GW.

After receiving the signaling request sent by the UE for switchover from the idle mode to the connected mode, for example, a service request message or a TAU request message, the MME determines, according to the current location information of the UE reported by the base station, whether a location of the UE changes.

If the location of the UE does not change, a method according to other approaches is performed. Details are not described in this embodiment of the present disclosure. If the location of the UE changes, the MME sends a location update notification message to the C-GW of the UE. Herein, the MME may determine, in the following two scenarios, whether the location of the UE changes.

(a) If the serving MME does not change, the MME may compare previously stored location information of the UE with the current location information reported by the target base station, to determine a change of the location of the UE.

(b) If the MME changes, that is, a new MME receives the signaling request in the step, the new MME may consider that the location of the UE changes.

The MME sends a location update notification message to the serving C-GW, and the notification message carries the current location information of the UE, including a current TAI, a current cell identifier, and/or the like. The location update notification message is used to notify the C-GW that the current location area of the UE changes. Therefore, the MME may reuse an existing message such as a create session request message, a modify bearer request message, or a modify access bearer request message, to carry the current location information of the UE, or may define a new message to carry the current location information of the UE. This is not limited in the present disclosure.

In addition, the MME may determine, according to the current location information of the UE, whether a serving C-GW of the UE needs to be reallocated, that is, whether the UE is moved out of a service area of the current serving C-GW. If the serving C-GW needs to be reallocated, the MME selects a new C-GW as a serving C-GW according to the current location information of the UE, and sends a location update notification message to the new C-GW. Additionally, the MME may request the new C-GW to recreate a bearer context for the UE.

S1103. The C-GW determines a U-GW.

The C-GW determines, according to the current location information of the UE, whether a current serving U-GW of the UE needs to be reallocated. If the current serving U-GW of the UE needs to be reallocated, the C-GW selects an appropriate target U-GW according to the current location information of the UE, and performs step S1104. If the C-GW is reallocated in S1102, generally, the serving U-GW also needs to be reallocated.

S1104. The C-GW sends a delete bearer request to the MME.

After sending the delete bearer request to the MME, the C-GW initiates a bearer deactivation procedure to the UE, to release all bearer context resources created by the UE on a source U-GW. In addition, the delete bearer request message carries a reactivation request indication, in order to request the UE to immediately initiate a packet data network (PDN) connection establishment request after all the bearer context resources of the source D-GW are deleted, to recreate user plane bearer resources on the target D-GW.

S1105. The MME sends a detach request or a deactivate bearer context request to the UE.

After receiving the delete bearer request of the C-GW, the MME performs different actions according to current PDN connection information of the UE.

(a) If the UE currently has only one PDN connection, the MME initiates a detach procedure to the UE, and adds a reattach (re-attach required) indication to a detach request.

(b) If the UE currently has multiple PDN connections, the MME initiates a PDN connection deactivation procedure to the UE, and adds a reactivation request (Reactivation requested) indication to a deactivate bearer context request.

S1106. The UE initiates a PDN connection establishment request.

The UE initiates the PDN connection establishment request, to recover bearer contexts that the C-GW requests to delete in step S1104. The PDN connection establishment request carries a same APN as the bearer contexts that the C-GW requests to delete in step S1104. In this procedure, the C-GW uses the selected target D-GW to create a bearer context of the UE.

If the UE receives the detach request sent by the MME in step S1105, an attach procedure is initiated, and a PDN connection establishment procedure is added to the attach procedure. For an implementation, refer to other approaches.

If the UE receives the deactivate bearer context request in step S1105 to deactivate a PDN connection, a separate PDN connection establishment procedure is initiated. For an implementation, refer to other approaches.

In the PDN connection establishment procedure, an uplink/downlink user plane data transmission path changes to: the UE ↔ the target base station ↔ the target U-GW, that is, transmission paths indicated by a dashed line L1g and a dashed line L2g in FIG. 11.

In this embodiment of the present disclosure, before the UE changes from the idle mode to the connected mode and sends user plane data, the C-GW determines, according to the current location information of the UE, whether the serving U-GW needs to change, triggers a PDN connection deactivation procedure, and adds a reactivation request indication during the PDN connection deactivation procedure to request the UE to immediately initiate a PDN connection reestablishment procedure, to recreate bearer resources on the target U-GW, ensure service continuity of subsequent user plane data transmission, and ensure user service experience.

Figure 12:
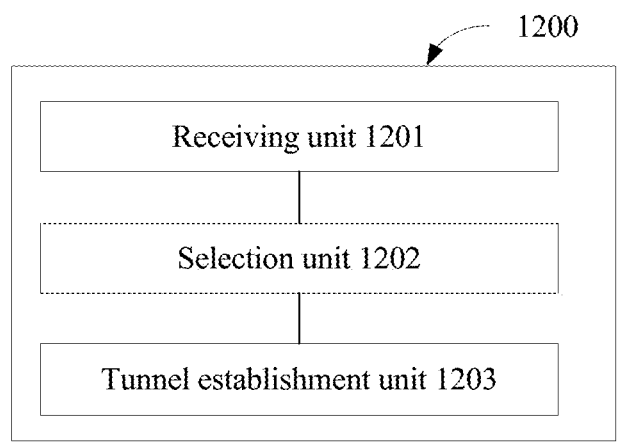
FIG. 12 is a schematic structural diagram of a control plane gateway according to an embodiment of the present disclosure.

FIG. 12 is a schematic structural diagram of a control plane gateway 1200 according to an embodiment of the present disclosure. As shown in FIG. 12, the control plane gateway 1200 may include a receiving unit 1201, a selection unit 1202, and a tunnel establishment unit 1203.

The receiving unit 1201 is configured to receive current location information of a UE sent by a mobility management network element.

The selection unit 1202 is configured to select at least one forwarding U-GW for the UE according to the current location information of the UE.

In this embodiment of the present disclosure, a current location area of the UE falls beyond a service range of a current serving U-GW of the UE, and the C-GW needs to select an appropriate forwarding U-GW for the UE according to the current location area of the UE.

The tunnel establishment unit 1203 is configured to establish, for the UE, a data forwarding tunnel between a source U-GW serving the UE and the forwarding U-GW, and a data forwarding tunnel between the forwarding U-GW and a target base station of the UE. The data forwarding tunnels are used to transmit uplink user plane data and/or downlink user plane data of the UE in a moving process of the UE.

For an applicable scenario of this embodiment of the present disclosure, refer to the application scenarios in the embodiment shown in FIG. 2.

In the application scenario (1), after receiving a user plane data switchover request sent by the source base station, the mobility management network element may send a service switchover notification to the serving C-GW of the UE. It should be understood that the mobility management network element may be an MME or another network element that has a mobility management function of an MME. In an application, the mobility management network element may send the service switchover notification using an existing message such as a create session request message, a modify bearer request message, or a modify access bearer request message; or the mobility management network element may send the service switchover notification using a newly created message. A specific message used for sending the service switchover notification is not limited in the present disclosure.

In the application scenario (2), after receiving a location update request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

In the application scenario (3), after receiving a service request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

The current location information of the UE includes tracking area information (TAI) corresponding to the current location area of the UE, serving base station information corresponding to the current location area of the UE, and/or the like. The corresponding TAI used when the UE is moved to the current location area is a target TAI of the UE. The corresponding serving base station information used when the UE is moved to the current location area is target base station information of the UE. The target base station information may be a target base station ID, a target CI, or the like. It may be understood that the current location area of the UE is also referred to as a target location area of the UE, that is, a location area of the UE after the UE is moved out of the service range of the source serving base station. Similarly, the current location information of the UE is also referred to as target location information of the UE.

It should be understood that the moving process of the UE includes procedures occurring in the foregoing three application scenarios, including: the service switchover procedure in the application scenario (1), the location update procedure in the application scenario (2), and the service request procedure in the application scenario (3).

It should be understood that the target base station of the UE is a base station that provides an access service for the UE after the UE is moved to the current location area.

It should be understood that the data forwarding tunnels are implemented by creating a user plane bearer context between the source U-GW serving the UE and the forwarding U-GW, and a user plane bearer context between the forwarding U-GW and the target base station of the UE. The user plane bearer contexts include routing information required for forwarding user plane data. Specifically, a user plane bearer context created on the source U-GW includes routing information of the forwarding U-GW and routing information of the source base station serving the UE, a user plane bearer context created on the forwarding U-GW includes routing information of the source U-GW and routing information of the target base station, and a user plane bearer context created on the target base station includes the routing information of the forwarding U-GW. Further, the routing information may include an address (typically, an IP address) and tunnel endpoint information (typically, if a GTP is used, the tunnel endpoint information is a GTP TEID).

It should be understood that the forwarding U-GW is the at least one forwarding U-GW selected by the selection unit 1202. That the tunnel establishment unit 1203 establishes, for the UE, a data forwarding tunnel between a source U-GW serving the UE and the forwarding U-GW, and a data forwarding tunnel between the forwarding U-GW and a target base station of the UE is that the tunnel establishment unit 1203 establishes a communication path between the source U-GW, the at least one forwarding U-GW, and the target base station, in order to establish a data forwarding tunnel between the two network elements from the source C-GW to the target base station.

In this embodiment of the present disclosure, the control plane gateway 1200 determines the appropriate forwarding U-GW for the UE according to the current location information after the movement, and establishes the data forwarding tunnel between the forwarding U-GW and the source U-GW, and the data forwarding tunnel between the forwarding U-GW and the target base station of the UE, in order to ensure service continuity in a moving process of the UE, and improve user service experience.

Figure 13:
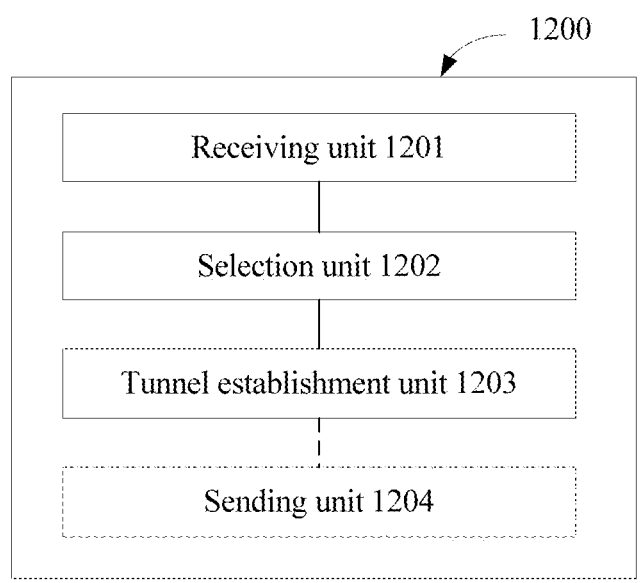
FIG. 13 is another schematic structural diagram of a control plane gateway according to an embodiment of the present disclosure.

In addition, as shown in FIG. 13, the control plane gateway may further include a sending unit 1204.

Optionally, in an embodiment, the at least one forwarding U-GW is a first U-GW, the control plane gateway is a serving control plane gateway used after the UE is moved to the current location area, and the control plane gateway is the same as a serving control plane gateway used before the UE is moved to the current location area, and the mobility management network element is a serving mobility management network element used after the UE is moved to the current location area.

The receiving unit 1201 is further configured to receive a first request sent by the mobility management network element. The first request carries the routing information of the target base station of the UE.

The tunnel establishment unit 1203 is configured to: send a second request to the first U-GW using the sending unit 1204, and send a third request to the source U-GW using the sending unit 1204. The second request is used to request the first U-GW to establish the data forwarding tunnel between the first U-GW and the target base station, and the data forwarding tunnel between the first U-GW and the source U-GW. The second request carries the routing information of the target base station and the routing information of the source U-GW. The third request is used to request the source U-GW to establish the data forwarding tunnel between the source U-GW and the first U-GW, and the third request carries the routing information of the first U-GW.

It should be understood that in this embodiment, the control plane gateway 1200 is the same as the serving C-GW used before the UE is moved to the current location area, that is, the serving C-GW does not change in a moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Certainly, it should be understood that the control plane gateway 1200 further receives a second response sent by the first U-GW according to the second request, and a third response sent by the source U-GW according to the third request. The second response is used to acknowledge that the first U-GW allows establishment of the data forwarding tunnel between the first U-GW and the target base station, and the data forwarding tunnel between the first U-GW and the source U-GW. Optionally, the second response may carry the routing information of the first U-GW, such as an IP address and TED information, and the third response is used to acknowledge that the source U-GW allows establishment of the data forwarding tunnel between the source U-GW and the first U-GW. After receiving the second response and the third response, the control plane gateway 1200 may send a first response of the first request to the mobility management network element.

It should be noted that the first request, the second request, or the third request in this embodiment may be sent using an existing message such as a create indirect data forwarding tunnel request, or a newly defined message. This is not limited in the present disclosure. Further, the first response, the second response, or the third response in this embodiment may be sent using an existing message such as a create indirect data forwarding tunnel response, or a newly defined message. This is not limited in the present disclosure.

Optionally, in another embodiment, the at least one forwarding U-GW includes a first U-GW and a second U-GW, the control plane gateway is a serving control plane gateway used after the UE is moved to the current location area, the control plane gateway is the same as a serving control plane gateway used before the UE is moved to the current location area, the mobility management network element is a serving mobility management network element used after the UE is moved to the current location area, and the mobility management network element is the same as or different from a serving mobility management network element used before the UE is moved to the current location area.

The receiving unit 1201 is further configured to receive a first request sent by the mobility management network element. The first request carries the routing information of the target base station of the UE.

The tunnel establishment unit 1203 is configured to: send a second request to the second U-GW using the sending unit 1204, send a third request to the third U-GW using the sending unit 1204, and send a fourth request to the source U-GW using the sending unit 1204. The second request is used to request the second U-GW to establish a data forwarding tunnel between the second U-GW and the target base station, and a data forwarding tunnel between the second U-GW and the third U-GW, the second request carries the routing information of the target base station and routing information of the third U-GW, the third request is used to request the third U-GW to establish the data forwarding tunnel between the third U-GW and the second U-GW, and a data forwarding tunnel between the third U-GW and the source U-GW, the third request carries routing information of the second U-GW and the routing information of the source U-GW, the fourth request is used to request the source U-GW to establish the data forwarding tunnel between the source U-GW and the third U-GW, and the fourth request carries the routing information of the third U-GW.

It should be understood that in this embodiment, the C-GW is the same as the serving C-GW used before the UE is moved to the current location area, that is, the serving C-GW does not change in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the control plane gateway 1200 further receives a second response sent by the second U-GW according to the second request, a third response sent by the third U-GW according to the third request, and a fourth response sent by the source U-GW according to the fourth request. The second response is used to acknowledge that the second U-GW allows establishment of the data forwarding tunnel between the second U-GW and the target base station, and the data forwarding tunnel between the second U-GW and the third U-GW. Optionally, the second response may carry the routing information of the second U-GW, such as an IP address and TED information. The third response is used to acknowledge that the third U-GW allows establishment of the data forwarding tunnel between the third U-GW and the second U-GW, and the data forwarding tunnel between the third U-GW and the source U-GW. Optionally, the third response may carry the routing information of the third U-GW, such as an IP address and TED information. The fourth response is used to acknowledge that the source U-GW allows establishment of the data forwarding tunnel between the source U-GW and the third U-GW. After receiving the second response, the third response, and the fourth response, the control plane gateway 1200 may send a first response of the first request to the mobility management network element.

It should be noted that the first request, the second request, the third request, or the fourth request in this embodiment may be sent using an existing message such as a create indirect data forwarding tunnel request, or a newly defined message. This is not limited in the present disclosure. Further, the first response, the second response, the third response, or the fourth response in this embodiment may be sent using an existing message such as a create indirect data forwarding tunnel response, or a newly defined message. This is not limited in the present disclosure.

Optionally, in still another embodiment, the at least one forwarding U-GW is a first U-GW, the control plane gateway is a serving control plane gateway used after the UE is moved to the current location area, the control plane gateway is different from a serving control plane gateway used before the UE is moved to the current location area, the mobility management network element is a serving mobility management network element used after the UE is moved to the current location area, and the mobility management network element is the same as or different from a serving mobility management network element used before the UE is moved to the current location area.

The receiving unit 1201 is further configured to receive the routing information of the source U-GW of the UE.

The receiving unit 1201 is further configured to receive a first request sent by the mobility management network element. The first request carries the routing information of the target base station of the UE.

The tunnel establishment unit 1203 is configured to send a second request to the first U-GW using the sending unit 1204. The second request is used to request the first U-GW to establish the data forwarding tunnel between the first U-GW and the target base station, and the data forwarding tunnel between the first U-GW and the source U-GW, and the second request carries the routing information of the target base station and the routing information of the source U-GW.

It should be understood that in this embodiment, the C-GW is different from the serving C-GW used before the UE is moved to the current location area, that is, the serving C-GW changes in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the control plane gateway 1200 further receives a second response sent by the first U-GW according to the second request, and a third response sent by the source U-GW according to the third request. The second response is used to acknowledge that the first U-GW allows establishment of the data forwarding tunnel between the first U-GW and the target base station, and the data forwarding tunnel between the first U-GW and the source U-GW. Optionally, the second response may carry the routing information of the first U-GW, such as an IP address and TED information, and the third response is used to acknowledge that the source U-GW allows establishment of the data forwarding tunnel between the source U-GW and the first U-GW. After receiving the second response and the third response, the control plane gateway 1200 may send a first response of the first request to the mobility management network element.

Certainly, it should be understood that, because the serving C-GW of the UE in this embodiment changes in the moving process of the UE, the C-GW is a target C-GW, that is, a serving C-GW used after the UE is moved to the current location area. Further, the target C-GW should further indicate to a source C-GW via the mobility management network element, to send a data forwarding tunnel establishment request to the source U-GW; and send the routing information of the first U-GW to the source U-GW. The source C-GW is a serving C-GW used before the UE is moved to the current location area, and the source U-GW is a serving U-GW used before the UE is moved to the current location area.

It should be noted that the first request or the second request in this embodiment may be sent using an existing message such as a create indirect data forwarding tunnel request, or a newly defined message. This is not limited in the present disclosure. Further, the first response or the second response in this embodiment may be sent using an existing message such as a create indirect data forwarding tunnel response, or a newly defined message. This is not limited in the present disclosure.

Optionally, in still another embodiment, the at least one forwarding U-GW includes a first U-GW and a second U-GW, the control plane gateway is a serving control plane gateway used after the UE is moved to the current location area, the control plane gateway is different from a serving control plane gateway used before the UE is moved to the current location area, the mobility management network element is a serving mobility management network element used after the UE is moved to the current location area, and the mobility management network element is the same as or different from a serving mobility management network element used before the UE is moved to the current location area.

The receiving unit 1201 is further configured to receive the routing information of the source U-GW of the UE.

The receiving unit 1201 is further configured to receive a first request sent by the mobility management network element. The first request carries the routing information of the target base station of the UE.

The tunnel establishment unit 1203 is configured to: send a second request to the second U-GW using the sending unit 1204, and send a third request to the third U-GW using the sending unit 1204. The second request is used to request the second U-GW to establish a data forwarding tunnel between the second U-GW and the target base station, and a data forwarding tunnel between the second U-GW and the third U-GW. The second request carries the routing information of the target base station and routing information of the third U-GW. The third request is used to request the third U-GW to establish the data forwarding tunnel between the third U-GW and the second U-GW, and a data forwarding tunnel between the third U-GW and the source U-GW. The third request carries routing information of the second U-GW and the routing information of the source U-GW.

It should be understood that in this embodiment, the C-GW is different from the serving C-GW used before the UE is moved to the current location area, that is, the serving C-GW changes in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the control plane gateway 1200 further receives a second response sent by the second U-GW according to the second request, a third response sent by the third U-GW according to the third request, and a fourth response sent by the source U-GW according to the fourth request. The second response is used to acknowledge that the second U-GW allows establishment of the data forwarding tunnel between the second U-GW and the target base station, and the data forwarding tunnel between the second U-GW and the third U-GW. Optionally, the second response may carry the routing information of the second U-GW, such as an IP address and TEID information. The third response is used to acknowledge that the third U-GW allows establishment of the data forwarding tunnel between the third U-GW and the second U-GW, and the data forwarding tunnel between the third U-GW and the source U-GW. Optionally, the third response may carry the routing information of the third U-GW, such as an IP address and TEID information. The fourth response is used to acknowledge that the source U-GW allows establishment of the data forwarding tunnel between the source U-GW and the third U-GW. After receiving the second response, the third response, and the fourth response, the control plane gateway 1200 may send a first response of the first request to the mobility management network element.

Certainly, it should be understood that, because the serving C-GW of the UE in this embodiment changes in the moving process of the UE, the C-GW in this embodiment is a target C-GW, that is, a serving C-GW used after the UE is moved to the current location area. Further, the target C-GW should further indicate to a source C-GW via the mobility management network element, to send a data forwarding tunnel establishment request to the source U-GW; and send the routing information of the third U-GW to the source U-GW. The source C-GW is a serving C-GW used before the UE is moved to the current location area, and the source U-GW is a serving U-GW used before the UE is moved to the current location area.

It should be noted that the first request, the second request, or the third request in this embodiment may be sent using an existing message such as a create indirect data forwarding tunnel request, or a newly defined message. This is not limited in the present disclosure. Further, the first response, the second response, or the third response in this embodiment may be sent using an existing message such as a create indirect data forwarding tunnel response, or a newly defined message. This is not limited in the present disclosure.

Optionally, in the foregoing four embodiments shown in FIG. 13, when the at least one forwarding U-GW is the first U-GW, the tunnel establishment unit 1203 is further configured to send routing information of a target U-GW to the target base station via the mobility management network element.

Optionally, in the foregoing four embodiments shown in FIG. 13, when the at least one forwarding U-GW is the first U-GW, the tunnel establishment unit 1203 is further configured to send the routing information of the first U-GW to the target base station via the mobility management network element.

Optionally, in the foregoing four embodiments shown in FIG. 13, when the at least one forwarding U-GW is the second U-GW and the third U-GW, the tunnel establishment unit 1203 is further configured to send the routing information of the second U-GW to the target base station via the mobility management network element.

Optionally, in the foregoing four embodiments shown in FIG. 13, the tunnel establishment unit 1203 is further configured to send a create session request to the target U-GW. The create session request is used to create, on the target U-GW for the UE, a bearer context for user plane data transmission. Each created bearer context includes routing information of the target U-GW, and the target U-GW is a serving U-GW corresponding to the current location area of the UE. It may be understood that the target U-GW is generally a serving U-GW that provides an optimal data transmission path for the UE in the current location area. Further, the tunnel establishment unit 1203 is further configured to send the routing information of the target U-GW to the target base station via the mobility management network element.

Optionally, in the foregoing four embodiments shown in FIG. 13, when the at least one forwarding U-GW is the first U-GW, the first U-GW is further a serving U-GW selected by the control plane gateway for the UE according to the current location information of the UE. That is, the first U-GW is a target U-GW. In this case, the target D-GW can directly communicate with the source D-GW, that is, the target U-GW also plays a role of the forwarding U-GW. It may be understood that, when the target U-GW cannot directly communicate with the source D-GW, the forwarding U-GW selected by the C-GW is different from the target U-GW.

The control plane gateway 1200 may further perform the method shown in FIG. 2, and implements the functions of the C-GW in the embodiments shown in FIG. 2 to FIG. 4, FIG. 7, and FIG. 8, and functions of the target C-GW in the embodiment shown in FIG. 5 or FIG. 6A and FIG. 6B. Details are not described in this embodiment of the present disclosure again.

Figure 14:
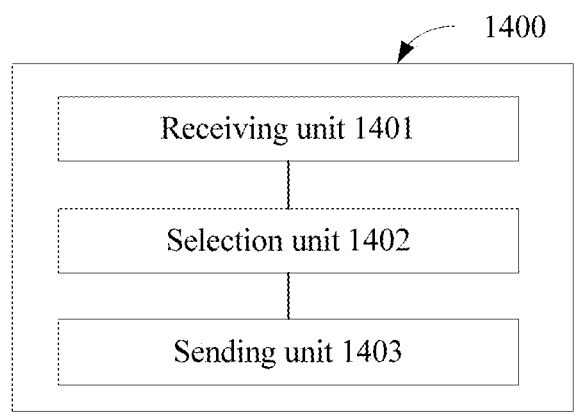
FIG. 14 is a schematic structural diagram of a mobility management network element according to an embodiment of the present disclosure.

FIG. 14 is a schematic structural diagram of a mobility management network element 1400 according to an embodiment of the present disclosure. The mobility management network element 1400 may include a receiving unit 1401, a selection unit 1402, and a sending unit 1403.

The receiving unit 1401 is configured to receive a forwarding relocation request sent by a source mobility management network element serving UE.

The forwarding relocation request carries current location information of the UE.

The selection unit 1402 is configured to select a target C-GW of the UE according to the current location information of the UE.

The sending unit 1403 is configured to send the current location information of the UE to the target C-GW, such that the target control plane gateway determines a forwarding U-GW of the UE according to the current location information of the UE.

The sending unit 1403 is further configured to send a data forwarding tunnel establishment request to the target control plane gateway.

The data forwarding tunnel establishment request is used to request the target C-GW to establish, for the UE, a data forwarding tunnel between the forwarding U-GW and a source U-GW serving the UE, and a data forwarding tunnel between the forwarding U-GW and a target base station serving the UE.

In this embodiment of the present disclosure, after the UE is moved out of a service range of the source mobility management network element, the mobility management network element 1400 determines the target C-GW of the UE according to the current location information of the UE, and further establishes a data forwarding tunnel between the source U-GW and the target base station of the UE for the UE using the target C-GW, in order to ensure service continuity in the moving process of the UE, and improve user service experience.

Optionally, the target control plane gateway is different from a serving control plane gateway used before the UE is moved to the current location area (that is, the serving C-GW changes in the moving process of the UE). The sending unit 1403 is further configured to send a change notification message to the source mobility management network element. The change notification message is used to indicate that a serving control plane gateway of the UE changes to the target control plane gateway.

Further, the receiving unit 1401 is further configured to receive an acknowledgment message sent by the source mobility management network element according to the change notification message. The acknowledgment message carries routing information of the source U-GW of the UE.

The mobility management network element 1400 may further perform the method in FIG. 9 and implement functions of the target MME in the embodiment shown in FIG. 5 or FIG. 6A and FIG. 6B. Details are not described in this embodiment of the present disclosure again.

Figure 15:
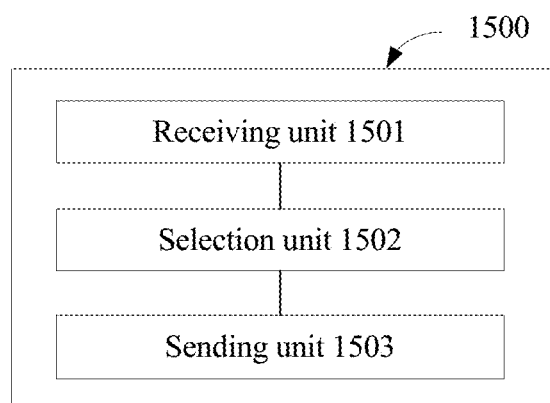
FIG. 15 is still another schematic structural diagram of a control plane gateway according to an embodiment of the present disclosure.

FIG. 15 is a schematic structural diagram of a control plane gateway 1500 according to an embodiment of the present disclosure. The control plane gateway 1500 includes: a receiving unit 1501, configured to receive current location information of the UE sent by a mobility management network element; a selection unit 1502, configured to select a target U-GW for the UE according to the current location information of the UE; and a sending unit 1503, configured to send a request message to the mobility management network element.

The request message is used to request the mobility management network element to release a first bearer context and indicate to the UE to send a setup request for a second bearer context. The first bearer context is a bearer context of the UE that is established on a source U-GW of the UE, and the second bearer context is a bearer context that is reestablished by the UE on the target U-GW according to the first bearer context.

It should be understood that in this embodiment of the present disclosure, the location update notification message is used to notify the C-GW that the current location area of the UE changes. For the location update notification, an existing message may be reused, such as a create session request message, a modify bearer request message, or a modify access bearer request message; or a new message may be defined. This is not limited in the present disclosure.

In this embodiment of the present disclosure, before the UE changes from an idle mode to a connected mode and sends user plane data, the control plane gateway 1500 determines, according to the current location information of the UE, whether the serving U-GW needs to change, triggers a bearer context deactivation procedure, and adds a reactivation request indication during the bearer context deactivation procedure to request the UE to immediately initiate a bearer context reestablishment procedure, to recreate bearer resources on the target U-GW, ensure service continuity of subsequent user plane data transmission, and ensure user service experience.

Optionally, in an embodiment, the request message is a delete bearer request message, the delete bearer request message carries a reactivation request indication, and the reactivation request indication is used to indicate, using the mobility management network element, to the UE to initiate the setup request for the second bearer context after the first bearer context is deleted.

It should be understood that both the MME and the UE record the first bearer context created by the UE on the source U-GW. After receiving the delete bearer request message, the MME deletes the first bearer context on the MME, and indicates to the UE to delete the first bearer context on the UE. When the delete bearer request message carries the reactivation request indication, the MME further sends the reactivation request indication to the UE, to indicate to the UE to resend a setup request for a bearer context according to content of the first bearer context after the first bearer context is deleted, and request to create the second bearer context. The second bearer context is a bearer context created on the target U-GW based on the first bearer context.

The control plane gateway 1500 may further perform the method in FIG. 10 and implement functions of the C-GW in the embodiment shown in FIG. 11. Details are not described in this embodiment of the present disclosure again.

Figure 16:
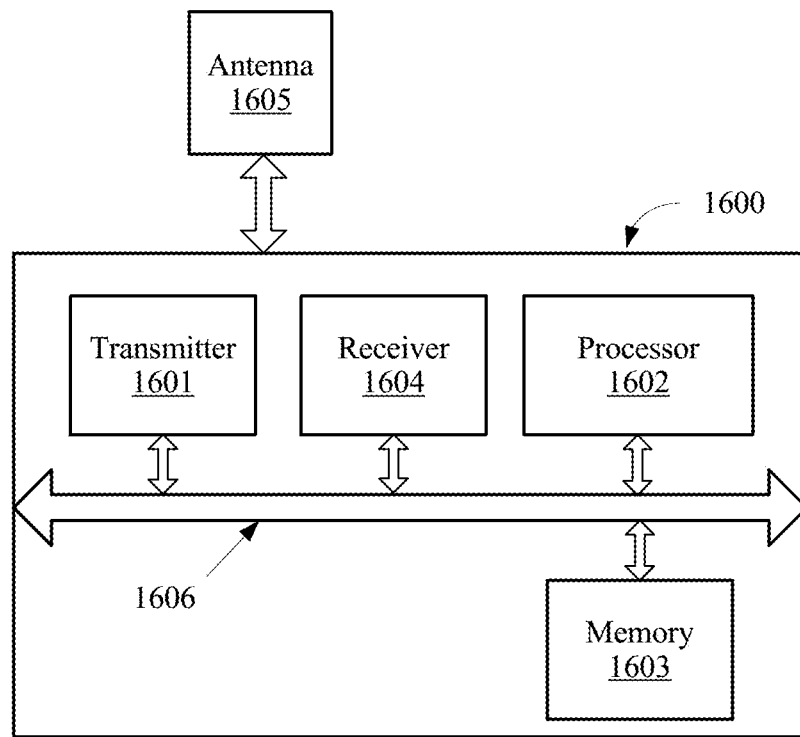
FIG. 16 is still another schematic structural diagram of a control plane gateway according to an embodiment of the present disclosure.

FIG. 16 is a schematic structural diagram of a control plane gateway 1600 according to an embodiment of the present disclosure. The control plane gateway 1600 may include a processor 1602, a memory 1603, a transmitter 1601, and a receiver 1604.

The receiver 1604, the transmitter 1601, the processor 1602, and the memory 1603 are connected to each other using a bus 1606. The bus 1606 may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For ease of representation, in FIG. 16, the bus 1606 is indicated using only one double-headed arrow. However, it does not indicate that there is only one bus or only one type of bus. In an application, the transmitter 1601 and the receiver 1604 may be coupled to an antenna 1605.

The memory 1603 is configured to store a program. Specifically, the program may include program code, and the program code includes a computer operation instruction. The memory 1603 may include a read-only memory and a random access memory, and provides an instruction and data for the processor 1602. The memory 1603 may include a high-speed RAM memory, and may further include a non-volatile memory, for example, at least one magnetic disk memory.

The processor 1602 executes the program stored in the memory 1603 and is configured to perform the following operations: receiving, using the receiver 1604, current location information of UE sent by a mobility management network element; selecting at least one forwarding U-GW for the UE according to the current location information of the UE; and establishing, using the transmitter 1601 for the UE, a data forwarding tunnel between a source U-GW serving the UE and the forwarding U-GW, and a data forwarding tunnel between the forwarding U-GW and a target base station of the UE, where the data forwarding tunnels are used to transmit uplink user plane data and/or downlink user plane data of the UE in a moving process of the UE.

For an applicable scenario in this embodiment of the present disclosure, refer to the application scenarios in the embodiment shown in FIG. 2.

In the application scenario (1), after receiving a user plane data switchover request sent by the source base station, the mobility management network element may send a service switchover notification to the serving C-GW of the UE. It should be understood that the mobility management network element may be an MME or another network element that has a mobility management function of an MME. In an application, the mobility management network element may send the service switchover notification using an existing message such as a create session request message, a modify bearer request message, or a modify access bearer request message; or the mobility management network element may send the service switchover notification using a newly created message. A specific message used for sending the service switchover notification is not limited in the present disclosure.

In the application scenario (2), after receiving a location update request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

In the application scenario (3), after receiving a service request sent by the UE, or successfully creating a radio access bearer context for the UE, the mobility management network element may send a request message to the serving C-GW of the UE. It should be understood that the mobility management network element may be an MME or another network element that has a mobility management function of an MME. In an application, the mobility management network element may send the request message using an existing message such as a create session request message, a modify bearer request message, or a modify access bearer request message; or the mobility management network element may send the request message using a newly created message. A specific message used for sending the request message is not limited in the present disclosure.

The current location information of the UE includes tracking area information (TAI) corresponding to the current location area of the UE, serving base station information corresponding to the current location area of the UE, and/or the like. The corresponding TAI used when the UE is moved to the current location area is a target TAI of the UE. The corresponding serving base station information used after the UE is moved to the current location area is target base station information of the UE. The target base station information may be a target base station ID, a target CI, or the like. It may be understood that the current location area of the UE is also referred to as a target location area of the UE, that is, a location area of the UE after the UE is moved out of the service range of the source serving base station. Similarly, the current location information of the UE is also referred to as target location information of the UE.

It should be understood that the moving process of the UE includes procedures occurring in the foregoing three application scenarios, including: the service switchover procedure in the application scenario (1), the location update procedure in the application scenario (2), and the service request procedure in the application scenario (3).

It should be understood that the target base station of the UE is a base station that provides an access service for the UE after the UE is moved to the current location area.

It should be understood that the data forwarding tunnels are implemented by creating a user plane bearer context between the source U-GW serving the UE and the forwarding U-GW, and a user plane bearer context between the forwarding U-GW and the target base station of the UE. The user plane bearer contexts include routing information required for forwarding user plane data, including routing information of the source U-GW, routing information of the forwarding U-GW, and routing information of the target base station. Specifically, the routing information may include an address (typically an IP address) and tunnel endpoint information (typically, if a GTP is used, the tunnel endpoint information is a GTP TED).

It should be understood that the forwarding U-GW is the at least one forwarding U-GW selected by the processor 1602. That the processor 1602 establishes, for the UE, a data forwarding tunnel between the source U-GW serving the UE and the forwarding U-GW, and a data forwarding tunnel between the forwarding U-GW and the target base station of the UE is that the process 1602 establishes a communication path between the source U-GW, the at least one forwarding U-GW, and the target base station, in order to establish a data forwarding tunnel between the two network elements from the source C-GW to the target base station.

The foregoing method that is performed by the C-GW disclosed in any embodiment in FIG. 2 to FIG. 4 of the present disclosure or that is performed by the target C-GW disclosed in any embodiment in FIG. 5, FIG. 6A, and FIG. 6B may be applied to the processor 1602, or may be implemented by the processor 1602. The processor 1602 may be an integrated circuit chip and has a signal processing capability. In an implementation process, the steps in the foregoing method may be completed by means of an integrated logic circuit of hardware in the processor 1602 or an instruction in a form of software. The processor 1602 may be a general purpose processor, including a central processing unit (CPU), a network processor (NP), and the like, or may be a digital signal processor (DSP), an application-specific integrated circuit (ASIC), a field programmable gate array (FPGA), another programmable logical device, a discrete gate or transistor logic device, or a discrete hardware component. The processor 1602 may implement or perform the methods, steps, and logical block diagrams disclosed in the embodiments of the present disclosure. The general purpose processor may be a microprocessor, or the processor may be any conventional processor, or the like. The steps of the method disclosed with reference to the embodiments of the present disclosure may be directly performed and completed using a hardware decoding processor, or performed and completed by combining hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1603. The processor 1602 reads information in the memory 1603, and completes the steps of the foregoing method in combination with hardware of the processor 1602.

In this embodiment of the present disclosure, the control plane gateway 1600 determines the appropriate forwarding U-GW for the UE according to the current location information after the movement, and establishes the data forwarding tunnel between the forwarding U-GW and the source U-GW, and the data forwarding tunnel between the forwarding U-GW and the target base station of the UE, in order to ensure service continuity in the moving process of the UE, and improve user service experience.

Optionally, in an embodiment, the at least one forwarding U-GW is a first U-GW, the control plane gateway is a serving control plane gateway used after the UE is moved to the current location area, the control plane gateway is the same as a serving control plane gateway used before the UE is moved to the current location area, the mobility management network element is a serving mobility management network element used after the UE is moved to the current location area, and the mobility management network element is the same as or different from a serving mobility management network element used before the UE is moved to the current location area.

The processor 1602 is further configured to receive, using the receiver 1604, a first request sent by the mobility management network element. The first request carries the routing information of the target base station of the UE.

In a process of establishing, using the transmitter 1601 for the UE, the data forwarding tunnel between the source U-GW serving the UE and the forwarding U-GW, and/or the data forwarding tunnel between the forwarding U-GW and the target base station of the UE, the processor 1602 is configured to: send a second request to the first U-GW using the transmitter 1601, and send a third request to the source U-GW using the transmitter 1601, where the second request is used to request the first U-GW to allow establishment of the data forwarding tunnel between the first U-GW and the target base station, and the data forwarding tunnel between the first U-GW and the source U-GW, the second request carries the routing information of the target base station and the routing information of the source U-GW, the third request is used to request the source U-GW to establish the data forwarding tunnel between the source U-GW and the first U-GW, and the third request carries the routing information of the first U-GW.

It should be understood that in this embodiment, the control plane gateway 1600 is the same as the serving C-GW used before the UE is moved to the current location area, that is, the serving C-GW does not change in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Certainly, it should be understood that the control plane gateway 1600 further receives a second response sent by the first U-GW according to the second request, and a third response sent by the source U-GW according to the third request. The second response is used to acknowledge that the first U-GW allows establishment of the data forwarding tunnel between the first U-GW and the target base station, and the data forwarding tunnel between the first U-GW and the source U-GW. Optionally, the second response may carry the routing information of the first U-GW, such as an IP address and TED information, and the third response is used to acknowledge that the source U-GW allows establishment of the data forwarding tunnel between the source U-GW and the first U-GW. After receiving the second response and the third response, the control plane gateway 1600 may send a first response of the first request to the mobility management network element.

It should be noted that the first request, the second request, or the third request in this embodiment may be sent using an existing message such as a create indirect data forwarding tunnel request, or a newly defined message. This is not limited in the present disclosure. Further, the first response, the second response, or the third response in this embodiment may be sent using an existing message such as a create indirect data forwarding tunnel response, or a newly defined message. This is not limited in the present disclosure.

Optionally, in another embodiment, the at least one forwarding U-GW includes a first U-GW and a second U-GW, the control plane gateway is a serving control plane gateway used after the UE is moved to the current location area, the control plane gateway is the same as a serving control plane gateway used before the UE is moved to the current location area, the mobility management network element is a serving mobility management network element used after the UE is moved to the current location area, and the mobility management network element is the same as or different from a serving mobility management network element used before the UE is moved to the current location area.

The processor 1602 is further configured to receive, using the receiver 1604, a first request sent by the mobility management network element. The first request carries the routing information of the target base station of the UE.

In a process of establishing, using the transmitter 1601 for the UE, the data forwarding tunnel between the source U-GW serving the UE and the forwarding U-GW, and the data forwarding tunnel between the forwarding U-GW and the target base station of the UE, the processor 1602 is configured to: send a second request to the second U-GW using the transmitter 1601, send a third request to the third U-GW using the transmitter 1601, and send a fourth request to the source U-GW using the transmitter 1601, where the second request is used to request the second U-GW to establish a data forwarding tunnel between the second U-GW and the target base station, and a data forwarding tunnel between the second U-GW and the third U-GW, the second request carries the routing information of the target base station and routing information of the third U-GW, the third request is used to request the third U-GW to establish the data forwarding tunnel between the third U-GW and the second U-GW, and a data forwarding tunnel between the third U-GW and the source U-GW, the third request carries routing information of the second U-GW and the routing information of the source U-GW, the fourth request is used to request the source U-GW to establish the data forwarding tunnel between the source U-GW and the third U-GW, and the fourth request carries the routing information of the third U-GW.

It should be understood that in this embodiment, the control plane gateway 1600 is the same as the serving C-GW used before the UE is moved to the current location area, that is, the serving C-GW does not change in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the control plane gateway 1600 further receives a second response sent by the second U-GW according to the second request, a third response sent by the third U-GW according to the third request, and a fourth response sent by the source U-GW according to the fourth request. The second response is used to acknowledge that the second U-GW allows establishment of the data forwarding tunnel between the second U-GW and the target base station, and the data forwarding tunnel between the second U-GW and the third U-GW. Optionally, the second response may carry the routing information of the second U-GW, such as an IP address and TEID information. The third response is used to acknowledge that the third U-GW allows establishment of the data forwarding tunnel between the third U-GW and the second U-GW, and the data forwarding tunnel between the third U-GW and the source U-GW. Optionally, the third response may carry the routing information of the third U-GW, such as an IP address and TEID information. The fourth response is used to acknowledge that the source U-GW allows establishment of the data forwarding tunnel between the source U-GW and the third U-GW. After receiving the second response, the third response, and the fourth response, the control plane gateway 1600 may send a first response of the first request to the mobility management network element.

It should be noted that the first request, the second request, the third request, or the fourth request in this embodiment may be sent using an existing message such as a create indirect data forwarding tunnel request, or a newly defined message. This is not limited in the present disclosure. Further, the first response, the second response, the third response, or the fourth response in this embodiment may be sent using an existing message such as a create indirect data forwarding tunnel response, or a newly defined message. This is not limited in the present disclosure.

Optionally, in still another embodiment, the at least one forwarding U-GW is a first U-GW, the control plane gateway is a serving control plane gateway used after the UE is moved to the current location area, the control plane gateway is different from a serving control plane gateway used before the UE is moved to the current location area, the mobility management network element is a serving mobility management network element used after the UE is moved to the current location area, and the mobility management network element is the same as or different from a serving mobility management network element used before the UE is moved to the current location area.

The processor 1602 is further configured to receive, using the receiver 1604, the routing information of the source U-GW of the UE.

The processor 1602 is further configured to receive, using the receiver 1604, a first request sent by the mobility management network element. The first request carries the routing information of the target base station of the UE.

In a process of establishing, using the transmitter 1601 for the UE, the data forwarding tunnel between the source U-GW serving the UE and the forwarding U-GW, and the data forwarding tunnel between the forwarding U-GW and the target base station of the UE, the processor 1602 is configured to: send a second request to the first U-GW using the transmitter 1601, where the second request is used to request the first U-GW to establish the data forwarding tunnel between the first U-GW and the target base station, and the data forwarding tunnel between the first U-GW and the source U-GW, and the second request carries the routing information of the target base station and the routing information of the source U-GW.

It should be understood that in this embodiment, the control plane gateway 1600 is different from the serving C-GW used before the UE is moved to the current location area, that is, the serving C-GW changes in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the control plane gateway 1600 further receives a second response sent by the first U-GW according to the second request, and a third response sent by the source U-GW according to the third request. The second response is used to acknowledge that the first U-GW allows establishment of the data forwarding tunnel between the first U-GW and the target base station, and the data forwarding tunnel between the first U-GW and the source U-GW. Optionally, the second response may carry the routing information of the first U-GW, such as an IP address and TED information, and the third response is used to acknowledge that the source U-GW allows establishment of the data forwarding tunnel between the source U-GW and the first U-GW. After receiving the second response and the third response, the control plane gateway 1600 may send a first response of the first request to the mobility management network element.

Certainly, it should be understood that, because the serving C-GW of the UE in this embodiment changes in the moving process of the UE, the control plane gateway 1600 is a target C-GW, that is, a serving C-GW used after the UE is moved to the current location area. Further, the processor 1602 should further indicate to a source C-GW via the mobility management network element, to send a data forwarding tunnel establishment request to the source U-GW; and send the routing information of the first U-GW to the source U-GW. The source C-GW is a serving C-GW used before the UE is moved to the current location area, and the source U-GW is a serving U-GW used before the UE is moved to the current location area.

It should be noted that the first request or the second request in this embodiment may be sent using an existing message such as a create indirect data forwarding tunnel request, or a newly defined message. This is not limited in the present disclosure. Further, the first response or the second response in this embodiment may be sent using an existing message such as a create indirect data forwarding tunnel response, or a newly defined message. This is not limited in the present disclosure.

Optionally, in still another embodiment, the at least one forwarding U-GW includes a first U-GW and a second U-GW, the control plane gateway is a serving control plane gateway used after the UE is moved to the current location area, the control plane gateway is different from a serving control plane gateway used before the UE is moved to the current location area, the mobility management network element is a serving mobility management network element used after the UE is moved to the current location area, and the mobility management network element is the same as or different from a serving mobility management network element used before the UE is moved to the current location area.

The processor 1602 is further configured to receive, using the receiver 1604, the routing information of the source U-GW of the UE.

The processor 1602 is further configured to receive, using the receiver 1604, a first request sent by the mobility management network element. The first request carries the routing information of the target base station of the UE.

In a process of establishing, using the transmitter 1601 for the UE, the data forwarding tunnel between the source U-GW serving the UE and the forwarding U-GW, and the data forwarding tunnel between the forwarding U-GW and the target base station of the UE, the processor 1602 is configured to: send a second request to the second U-GW using the transmitter 1601, and send a third request to the third U-GW using the transmitter 1601, where the second request is used to request the second U-GW to establish a data forwarding tunnel between the second U-GW and the target base station, and a data forwarding tunnel between the second U-GW and the third U-GW, the second request carries the routing information of the target base station and routing information of the third U-GW, the third request is used to request the third U-GW to establish the data forwarding tunnel between the third U-GW and the second U-GW, and a data forwarding tunnel between the third U-GW and the source U-GW, and the third request carries routing information of the second U-GW and the routing information of the source U-GW.

It should be understood that in this embodiment, the control plane gateway 1600 is different from the serving C-GW used before the UE is moved to the current location area, that is, the serving C-GW changes in the moving process of the UE. It should be understood that this embodiment is applicable to a scenario in which the serving mobility management network element changes in the moving process of the UE or a scenario in which the serving mobility management network element does not change in the moving process of the UE, that is, the mobility management network element may be the same as or different from a serving mobility management network element used before the UE is moved to the current location area.

Similarly, the control plane gateway 1600 further receives a second response sent by the second U-GW according to the second request, a third response sent by the third U-GW according to the third request, and a fourth response sent by the source U-GW according to the fourth request. The second response is used to acknowledge that the second U-GW allows establishment of the data forwarding tunnel between the second U-GW and the target base station, and the data forwarding tunnel between the second U-GW and the third U-GW. Optionally, the second response may carry the routing information of the second U-GW, such as an IP address and TEID information. The third response is used to acknowledge that the third U-GW allows establishment of the data forwarding tunnel between the third U-GW and the second U-GW, and the data forwarding tunnel between the third U-GW and the source U-GW. Optionally, the third response may carry the routing information of the third U-GW, such as an IP address and TEID information. The fourth response is used to acknowledge that the source U-GW allows establishment of the data forwarding tunnel between the source U-GW and the third U-GW. After receiving the second response, the third response, and the fourth response, the control plane gateway 1600 may send a first response of the first request to the mobility management network element.

Certainly, it should be understood that, because the serving C-GW of the UE in this embodiment changes in the moving process of the UE, the control plane gateway 1600 in this embodiment is a target C-GW, that is, a serving C-GW used after the UE is moved to the current location area. Further, the processor 1602 should further indicate to a source C-GW via the mobility management network element, to send a data forwarding tunnel establishment request to the source U-GW; and send the routing information of the third U-GW to the source U-GW. The source C-GW is a serving C-GW used before the UE is moved to the current location area, and the source U-GW is a serving U-GW used before the UE is moved to the current location area.

It should be noted that the first request, the second request, or the third request in this embodiment may be sent using an existing message such as a create indirect data forwarding tunnel request, or a newly defined message. This is not limited in the present disclosure. Further, the first response, the second response, or the third response in this embodiment may be sent using an existing message such as a create indirect data forwarding tunnel response, or a newly defined message. This is not limited in the present disclosure.

Optionally, in the foregoing four embodiments of FIG. 16, when the at least one forwarding U-GW is the first U-GW, the processor 1602 is further configured to send, using the transmitter 1601, routing information of a target U-GW to the target base station via the mobility management network element.

Optionally, in the foregoing four embodiments of FIG. 16, when the at least one forwarding U-GW is the first U-GW, the processor 1602 is further configured to send the routing information of the first U-GW to the target base station via the mobility management network element.

Optionally, in the foregoing four embodiments of FIG. 16, when the at least one forwarding U-GW is the second U-GW and the third U-GW, the processor 1602 is further configured to send the routing information of the second U-GW to the target base station via the mobility management network element.

Optionally, in the foregoing four embodiments of FIG. 16, the processor 1602 is further configured to send a create session request to the target U-GW using the transmitter 1601, where the create session request is used to create, on the target U-GW for the UE, a bearer context for user plane data transmission, each created bearer context includes routing information of the target U-GW, and the target U-GW is a serving U-GW corresponding to the current location area of the UE. It may be understood that the target U-GW is generally a serving U-GW that provides an optimal data transmission path for the UE in the current location area. Further, the processor 1602 is further configured to send the routing information of the target U-GW to the target base station via the mobility management network element.

Optionally, in the foregoing four embodiments of FIG. 16, when the at least one forwarding U-GW is the first U-GW, the first U-GW is further a serving U-GW selected by the control plane gateway for the UE according to the current location information of the UE. That is, the first U-GW is a target U-GW. In this case, the target D-GW can directly communicate with the source D-GW, that is, the target U-GW also plays a role of the forwarding U-GW. It may be understood that, when the target U-GW cannot directly communicate with the source D-GW, the forwarding U-GW selected by the C-GW is different from the target U-GW.

The control plane gateway 1600 may further perform the method shown in FIG. 2, and implements the functions of the C-GW in the embodiments shown in FIG. 2 to FIG. 4, FIG. 7, and FIG. 8, and functions of the target C-GW in the embodiment shown in FIG. 5 or FIG. 6A and FIG. 6B. Details are not described in this embodiment of the present disclosure again.

Figure 17:
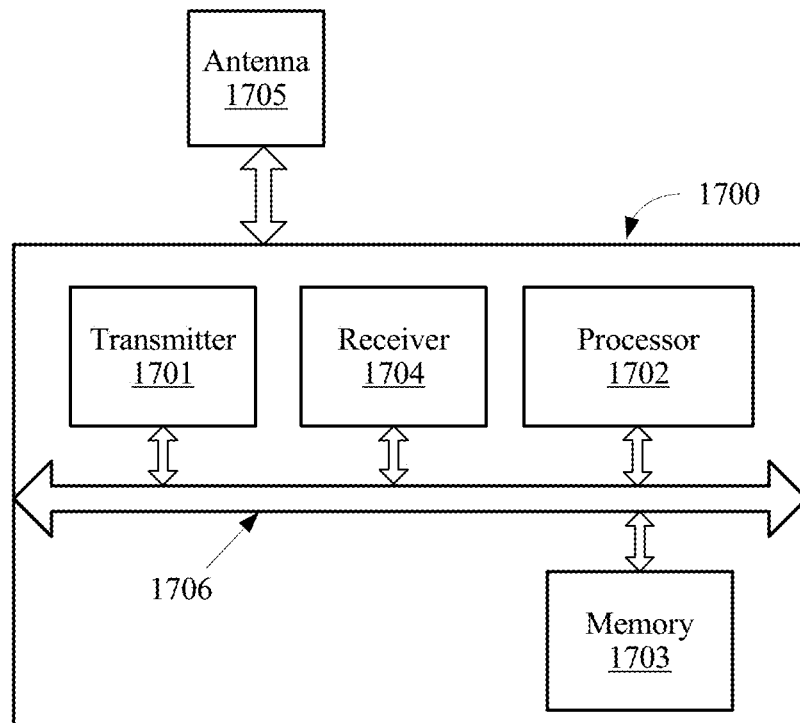
FIG. 17 is another schematic structural diagram of a mobility management network element according to an embodiment of the present disclosure.

FIG. 17 is a schematic structural diagram of a mobility management network element 1700 according to an embodiment of the present disclosure. The mobility management network element 1700 may include a processor 1702, a memory 1703, a transmitter 1701, and a receiver 1704.

The receiver 1704, the transmitter 1701, the processor 1702, and the memory 1703 are connected to each other using a bus 1706. The bus 1706 may be an ISA bus, a PCI bus, an EISA bus, or the like. The bus may be classified into an address bus, a data bus, a control bus, and the like. For ease of representation, in FIG. 17, the bus 1706 is indicated using only one double-headed arrow. However, it does not indicate that there is only one bus or only one type of bus.

In an application, the transmitter 1701 and the receiver 1704 may be coupled to an antenna 1705.

The memory 1703 is configured to store a program. Specifically, the program may include program code, and the program code includes a computer operation instruction. The memory 1703 may include a read-only memory and a random access memory, and provides an instruction and data for the processor 1702. The memory 1703 may include a high-speed RAM memory, and may further include a non-volatile memory, for example, at least one magnetic disk memory.

The processor 1702 executes the program stored in the memory 1703 and is configured to perform the following operations: receiving, using the receiver 1704, a forwarding relocation request sent by a source mobility management network element serving UE, where the forwarding relocation request carries current location information of the UE; selecting a target C-GW of the UE according to the current location information of the UE; sending the current location information of the UE to the C-GW using the transmitter 1701, such that the C-GW determines a forwarding U-GW of the UE according to the current location information of the UE; and sending a data forwarding tunnel establishment request to the target control plane gateway using the transmitter 1701, where the data forwarding tunnel establishment request is used to request the target C-GW to establish, for the UE, a data forwarding tunnel between the forwarding U-GW and a source U-GW serving the UE, and a data forwarding tunnel between the forwarding U-GW and a target base station serving the UE.

The foregoing method that is performed by the mobility management network element disclosed in the embodiment shown in FIG. 9 of the present disclosure or that is performed by the target MME disclosed in the embodiment shown in FIG. 5 or FIG. 6A and FIG. 6B may be applied to the processor 1702, or may be implemented by the processor 1702. The processor 1702 may be an integrated circuit chip and has a signal processing capability. In an implementation process, the steps in the foregoing method may be completed by means of an integrated logic circuit of hardware in the processor 1702 or an instruction in a form of software. The processor 1702 may be a general purpose processor, including a CPU, a NP, and the like, or may be a DSP, an ASIC, a FPGA, another programmable logical device, a discrete gate or transistor logic device, or a discrete hardware component. The processor 1702 may implement or perform the methods, steps, and logical block diagrams disclosed in the embodiments of the present disclosure. The general purpose processor may be a microprocessor, or the processor may be any conventional processor, or the like. The steps of the method disclosed with reference to the embodiments of the present disclosure may be directly performed and completed using a hardware decoding processor, or performed and completed by combining hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1703. The processor 1702 reads information in the memory 1703, and completes the steps of the foregoing method in combination with hardware of the processor 1702.

In this embodiment of the present disclosure, after the UE is moved out of a service range of the source mobility management network element, the mobility management network element 1700 determines the target C-GW of the UE according to the current location information of the UE, and further establishes a data forwarding tunnel between the source U-GW and the target base station of the UE for the UE using the target C-GW, in order to ensure service continuity in a moving process of the UE, and improve user service experience.

Optionally, the target control plane gateway is different from a serving control plane gateway used before the UE is moved to the current location area (that is, the serving C-GW changes in a moving process of the UE). The processor 1702 is further configured to send a change notification message to the source mobility management network element using the transmitter 1701. The change notification message is used to indicate that a serving control plane gateway of the UE changes to the target control plane gateway.

Further, the processor 1702 is further configured to receive, using the receiver 1704, an acknowledgment message sent by the source mobility management network element according to the change notification message. The acknowledgment message carries routing information of the source U-GW of the UE.

The mobility management network element 1700 may further perform the method in FIG. 9 and implement functions of the target MME in the embodiment shown in FIG. 5 or FIG. 6A and FIG. 6B. Details are not described in this embodiment of the present disclosure again.

Figure 18:
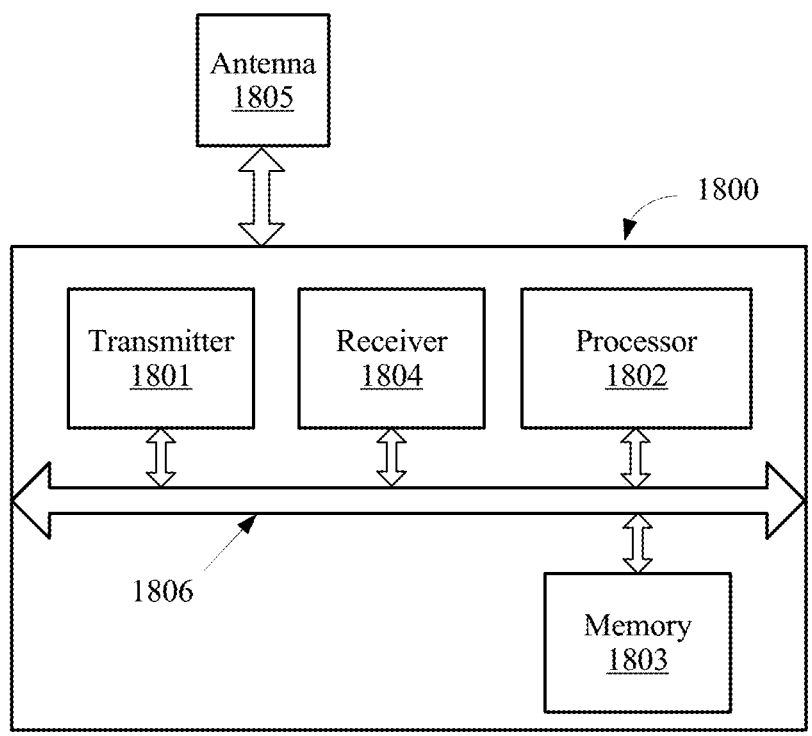
FIG. 18 is still another schematic structural diagram of a control plane gateway according to an embodiment of the present disclosure.

FIG. 18 is a schematic structural diagram of a control plane gateway 1800 according to an embodiment of the present disclosure. The control plane gateway 1800 may include a processor 1802, a memory 1803, a transmitter 1801, and a receiver 1804.

The receiver 1804, the transmitter 1801, the processor 1802, and the memory 1803 are connected to each other using a bus 1806. The bus 1806 may be an ISA bus, a PCI bus, an EISA bus, or the like. The bus may be classified into an address bus, a data bus, a control bus, and the like. For ease of representation, in FIG. 18, the bus 1806 is indicated using only one double-headed arrow. However, it does not indicate that there is only one bus or only one type of bus. In an application, the transmitter 1801 and the receiver 1804 may be coupled to an antenna 1805.

The memory 1803 is configured to store a program. Specifically, the program may include program code, and the program code includes a computer operation instruction. The memory 1803 may include a read-only memory and a random access memory, and provides an instruction and data for the processor 1802. The memory 1803 may include a high-speed RAM memory, and may further include a non-volatile memory, for example, at least one magnetic disk memory.

The processor 1802 executes the program stored in the memory 1803 and is configured to perform the following operations: receiving, using the receiver 1804, current location information of the UE sent by a mobility management network element; selecting a target U-GW for the UE according to the current location information of the UE; and sending, using the transmitter 1801, a request message to the mobility management network element, where the request message is used to request the mobility management network element to release a first bearer context and indicate to the UE to send a setup request for a second bearer context, the first bearer context is a bearer context of the UE that is established on a source U-GW of the UE, and the second bearer context is a bearer context that is reestablished by the UE on the target U-GW according to the first bearer context.

It should be understood that in this embodiment of the present disclosure, the location update notification message is used to notify the C-GW that the current location area of the UE changes. For the location update notification, an existing message may be reused, such as a create session request message, a modify bearer request message, or a modify access bearer request message; or a new message may be defined. This is not limited in the present disclosure.

The foregoing method that is performed by the C-GW disclosed in any embodiment in FIG. 10 and FIG. 11 of the present disclosure may be applied to the processor 1802, or may be implemented by the processor 1802. The processor 1802 may be an integrated circuit chip and has a signal processing capability. In an implementation process, the steps in the foregoing method may be completed by means of an integrated logic circuit of hardware in the processor 1802 or an instruction in a form of software. The processor 1802 may be a general purpose processor, including a CPU, a NP, and the like, or may be a DSP, an ASIC, a FPGA, another programmable logical device, a discrete gate or transistor logic device, or a discrete hardware component. The processor 1802 may implement or perform the methods, steps, and logical block diagrams disclosed in the embodiments of the present disclosure. The general purpose processor may be a microprocessor, or the processor may be any conventional processor, or the like. The steps of the method disclosed with reference to the embodiments of the present disclosure may be directly performed and completed using a hardware decoding processor, or performed and completed by combining hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1803. The processor 1802 reads information in the memory 1803, and completes the steps of the foregoing method in combination with hardware of the processor 1802.

In this embodiment of the present disclosure, before the UE changes from an idle mode to a connected mode and sends user plane data, the control plane gateway 1800 determines, according to the current location information of the UE, whether the serving U-GW needs to change, triggers a bearer context deactivation procedure, and adds a reactivation request indication during the bearer context deactivation procedure to request the UE to immediately initiate a bearer context reestablishment procedure, to recreate bearer resources on the target U-GW, ensure service continuity of subsequent user plane data transmission, and ensure user service experience.

Optionally, in an embodiment, the request message is a delete bearer request message, the delete bearer request message carries a reactivation request indication, and the reactivation request indication is used via the mobility management network element to indicate to the UE to initiate the setup request for the second bearer context after the first bearer context is deleted.

It should be understood that both the MME and the UE record the first bearer context created by the UE on the source U-GW. After receiving the delete bearer request message, the MME deletes the first bearer context on the MME, and indicates to the UE to delete the first bearer context on the UE. When the delete bearer request message carries the reactivation request indication, the MME further sends the reactivation request indication to the UE, to indicate to the UE to resend a setup request for a bearer context according to content of the first bearer context after the first bearer context is deleted, and request to create the second bearer context. The second bearer context is a bearer context created on the target U-GW based on the first bearer context.

The control plane gateway 1800 may further perform the method in FIG. 10 and implement functions of the C-GW in the embodiment shown in FIG. 11. Details are not described in this embodiment of the present disclosure again.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
 sending, by a mobility management network element, location information of a user equipment to a control plane gateway;
 receiving, by the control plane gateway, the location information of the user equipment from the mobility management network element;
 selecting, by the control plane gateway, a first user plane gateway for the user equipment according to the location information of the user equipment;
 sending, by the mobility management network element to the control plane gateway, a first request for establishing a data forwarding tunnel, wherein the first request carries routing information of a target base station;
 receiving, by the control plane gateway, the first request from the mobility management network element;
 sending, by the control plane gateway to the first user plane gateway, a second request for establishing the data forwarding tunnel, wherein the second request carries the routing information of the target base station; and
 sending, by the control plane gateway to a source user plane gateway, a third request for establishing the data forwarding tunnel, wherein the third request carries second routing information of the first user plane gateway, and wherein the data forwarding tunnel is for transmitting downlink user plane data of the user equipment.

2. The communication method according to claim 1, wherein the data forwarding tunnel passes through the source user plane gateway, the first user plane gateway, and the target base station.

3. The communication method according to claim 1, further comprising determining, by the control plane gateway according to the location information of the user equipment, that the user equipment has moved out of a service area of the source user plane gateway.

4. The communication method according to claim 1, wherein the location information of the user equipment comprises a tracking area identity (TAT).

5. The communication method according to claim 1, wherein the location information of the user equipment comprises serving base station information.

6. The communication method according to claim 1, further comprising:

receiving, by the first user plane gateway, the downlink user plane data of the user equipment from the source user plane gateway through the data forwarding tunnel; and sending, by the first user plane gateway, the downlink user plane data of the user equipment to the target base station through the data forwarding tunnel.

7. The communication method according to claim 1, further comprising sending, by the first user plane gateway, the second routing information of the first user plane gateway to the control plane gateway.

8. The communication method according to claim 1, further comprising determining, by the control plane gateway, the first user plane gateway as a serving user plane gateway for the user equipment after a service switchover is finished.

9. The communication method according to claim 1, further comprising selecting, by the control plane gateway, a target user plane gateway for the user equipment according to the location information of the user equipment, wherein the target user plane gateway is a serving user plane gateway for the user equipment after a service switchover is finished.

10. The communication method according to claim 9, wherein the target user plane gateway is the first user plane gateway.

11. The communication method according to claim 9, wherein the target user plane gateway is different from the first user plane gateway.

12. The communication method according to claim 11, further comprising:
sending, by the control plane gateway, a fourth request to the target user plane gateway;
receiving, by the control plane gateway, third routing information of the target user plane gateway from the target user plane gateway; and
sending, by the control plane gateway, the third routing information of the target user plane gateway to the target base station via the mobility management network element.

13. The communication method according to claim 1, wherein the routing information of the target base station comprises an address of the target base station and a tunnel identifier of the target base station.

14. The communication method according to claim 1, wherein the second routing information of the first user plane gateway comprises an address of the first user plane gateway and a tunnel identifier of the first user plane gateway.

15. A communication system, comprising:
a mobility management network element configured to:
send location information of a user equipment; and
send a first request for establishing a data forwarding tunnel, wherein the first request carries routing information of a target base station; and
a control plane gateway configured to:
receive the location information of the user equipment from the mobility management network element;
select a first user plane gateway for the user equipment according to the location information of the user equipment;
receive the first request from the mobility management network element;
send, to the first user plane gateway, a second request for establishing the data forwarding tunnel, wherein the second request carries the routing information of the target base station; and send, to a source user plane gateway, a third request for establishing the data forwarding tunnel, wherein the third request carries routing information of the first user plane gateway, and wherein the data forwarding tunnel is for transmitting downlink user plane data of the user equipment.

16. The communication system according to claim 15, wherein the data forwarding tunnel passes through the source user plane gateway, the first user plane gateway, and the target base station.

17. The communication system according to claim 15, wherein the control plane gateway is further configured to determine, according to the location information of the user equipment, that the user equipment has moved out of a service area of the source user plane gateway.

18. The communication system according to claim 15, wherein the location information of the user equipment comprises a tracking area identity (TAI).

19. The communication system according to claim 15, wherein the location information of the user equipment comprises serving base station information.

20. The communication system according to claim 15, further comprising the first user plane gateway, wherein the first user plane gateway is configured to:
receive the downlink user plane data of the user equipment from the source user plane gateway through the data forwarding tunnel; and
send the downlink user plane data of the user equipment to the target base station through the data forwarding tunnel.

21. The communication system according to claim 15, further comprising the first user plane gateway, wherein the first user plane gateway is configured to send the second routing information of the first user plane gateway to the control plane gateway.

22. The communication system according to claim 15, wherein the control plane gateway is further configured to determine the first user plane gateway as a serving user plane gateway for the user equipment after a service switchover is finished.

23. The communication system according to claim 15, wherein the control plane gateway is further configured to select a target user plane gateway for the user equipment according to the location information of the user equipment, wherein the target user plane gateway is a serving user plane gateway for the user equipment after a service switchover is finished.

24. The communication system according to claim 23, wherein the target user plane gateway is the first user plane gateway.

25. The communication system according to claim 23, wherein the target user plane gateway is different from the first user plane gateway.

26. The communication system according to claim 25, wherein the control plane gateway is further configured to:
send a fourth request to the target user plane gateway;
receive third routing information of the target user plane gateway from the target user plane gateway; and
send the third routing information of the target user plane gateway to the target base station via the mobility management network element.

27. The communication system according to claim 15, wherein the routing information of the target base station comprises an address of the target base station and a tunnel identifier of the target base station.

28. The communication system according to claim 15, wherein the second routing information of the first user plane gateway comprises an address of the first user plane gateway and a tunnel identifier of the first user plane gateway.

\* \* \* \* \*

UNITED STATES PATENT AND TRADEMARK OFFICE
CERTIFICATE OF CORRECTION

PATENT NO. : 10,827,543 B2
APPLICATION NO. : 16/731701
DATED : November 3, 2020
INVENTOR(S) : Lin Shu et al.

It is certified that error appears in the above-identified patent and that said Letters Patent is hereby corrected as shown below:

In the Claims

Claim 4, Column 64, Line 62: "identity (TAT)" should read "identity (TAI)"

Signed and Sealed this
Fifth Day of January, 2021

Andrei Iancu
*Director of the United States Patent and Trademark Office*